(12) United States Patent
Preslar et al.

(10) Patent No.: US 11,278,023 B2
(45) Date of Patent: Mar. 22, 2022

(54) COMPOSITIONS FOR CONTROLLED RELEASE OF ACTIVE INGREDIENTS AND METHODS OF MAKING SAME

(71) Applicant: Hazel Technologies, Inc., Chicago, IL (US)

(72) Inventors: Adam Truett Preslar, London (GB); Aidan R. Mouat, Chicago, IL (US)

(73) Assignee: Hazel Technologies, Inc., Chicago, IL (US)

( * ) Notice: Subject to any disclaimer, the term of this patent is extended or adjusted under 35 U.S.C. 154(b) by 0 days.

(21) Appl. No.: 16/578,045

(22) Filed: Sep. 20, 2019

(65) Prior Publication Data

US 2020/0029556 A1 Jan. 30, 2020

Related U.S. Application Data

(62) Division of application No. 15/999,302, filed as application No. PCT/US2017/018542 on Feb. 19, 2017.

(Continued)

(51) Int. Cl.
*A01N 25/18* (2006.01)
*A01N 25/04* (2006.01)
(Continued)

(52) U.S. Cl.
CPC ............. *A01N 25/18* (2013.01); *A01N 25/04* (2013.01); *A01N 27/00* (2013.01); *A01N 31/02* (2013.01);
(Continued)

(58) Field of Classification Search
CPC ..................................................... A01N 25/18
See application file for complete search history.

(56) References Cited

U.S. PATENT DOCUMENTS

| 3,426,011 A | 2/1969 | Parmerter et al. |
| 3,879,188 A | 4/1975 | Fritz et al. |

(Continued)

FOREIGN PATENT DOCUMENTS

| CL | 2018-2371 | 9/2019 |
| CN | 1346594 A | 5/2002 |

(Continued)

OTHER PUBLICATIONS

CB Watkins. "The use of 1-methylcyclopropene (1-MCP) on fruits and vegetables." Biotechnology Advances, vol. 24, 2006, pp. 389-409. (Year: 2006).*

(Continued)

*Primary Examiner* — Isaac Shomer
(74) *Attorney, Agent, or Firm* — Wolf, Greenfield & Sacks, P.C.

(57) ABSTRACT

Compositions for controlled release of active ingredients and methods of making same are generally provided. In some embodiments, the composition comprises an active ingredient and a delivery material. In some embodiments, the composition comprises a volatile or gaseous active ingredient useful for applications in at least one of agriculture, pest control, odor control, and food preservation. In some embodiments, the active ingredient is a cyclopropene. In some embodiments, the active ingredient is an essential oil, a terpene, or a terpenoid. In some embodiments, the delivery material is a carbon material or a silicate material.

30 Claims, 7 Drawing Sheets

Related U.S. Application Data

(60) Provisional application No. 62/367,093, filed on Jul. 26, 2016, provisional application No. 62/353,016, filed on Jun. 21, 2016, provisional application No. 62/347,914, filed on Jun. 9, 2016, provisional application No. 62/338,709, filed on May 19, 2016, provisional application No. 62/328,556, filed on Apr. 27, 2016, provisional application No. 62/307,357, filed on Mar. 11, 2016, provisional application No. 62/297,782, filed on Feb. 19, 2016.

(51) Int. Cl.
- *C01B 32/30* (2017.01)
- *A01N 27/00* (2006.01)
- *A01N 31/02* (2006.01)
- *A01N 35/02* (2006.01)
- *A01N 65/00* (2009.01)

(52) U.S. Cl.
CPC ............ *A01N 35/02* (2013.01); *A01N 65/00* (2013.01); *C01B 32/30* (2017.08); *Y02A 40/22* (2018.01); *Y02P 60/21* (2015.11)

(56) References Cited

U.S. PATENT DOCUMENTS

| | | | |
|---|---|---|---|
| 4,380,626 A | 4/1983 | Szejtli et al. | |
| 4,888,364 A | 12/1989 | Graiver et al. | |
| 4,891,388 A | 1/1990 | Graiver et al. | |
| 4,891,389 A | 1/1990 | Graiver et al. | |
| 4,923,853 A | 5/1990 | Szejtli et al. | |
| 5,100,462 A | 3/1992 | Sisler et al. | |
| 5,102,564 A | 4/1992 | Gardlik et al. | |
| 5,165,943 A | 11/1992 | Patel et al. | |
| 5,234,611 A | 8/1993 | Trinh et al. | |
| 5,321,014 A | 6/1994 | Janz et al. | |
| 5,324,616 A | 6/1994 | Sacripante et al. | |
| 5,472,954 A | 12/1995 | Loftsson | |
| 5,518,988 A * | 5/1996 | Sisler | A01N 3/02 504/114 |
| 5,653,971 A | 8/1997 | Badin et al. | |
| 5,958,490 A * | 9/1999 | Solar | A23B 7/144 426/312 |
| 6,017,849 A * | 1/2000 | Daly | A01N 43/90 504/114 |
| 6,048,736 A | 4/2000 | Kosak | |
| 6,153,559 A | 11/2000 | Heiman | |
| 6,194,350 B1 | 2/2001 | Sisler | |
| 6,313,068 B1 | 11/2001 | Daly et al. | |
| 6,365,549 B2 | 4/2002 | Sisler | |
| 6,372,220 B1 | 4/2002 | Shukla | |
| 6,375,999 B1 | 4/2002 | Forsythe et al. | |
| 6,426,319 B1 | 7/2002 | Kostansek | |
| 6,444,619 B1 | 9/2002 | Kostansek | |
| 6,452,060 B2 | 9/2002 | Jacobson | |
| 6,541,425 B1 | 4/2003 | Ernst et al. | |
| 6,541,560 B1 | 4/2003 | Rozynov et al. | |
| 6,548,448 B2 | 4/2003 | Kostansek | |
| 6,562,758 B1 | 5/2003 | Evans et al. | |
| 6,762,153 B2 | 7/2004 | Kostansek et al. | |
| 6,770,600 B1 | 8/2004 | La et al. | |
| 6,821,928 B2 | 11/2004 | Ruskin | |
| 6,897,185 B1 | 5/2005 | Chang et al. | |
| 6,953,540 B2 | 10/2005 | Chong et al. | |
| 7,041,625 B2 | 5/2006 | Jacobson et al. | |
| 7,138,130 B2 | 11/2006 | Davis et al. | |
| 7,271,259 B1 | 9/2007 | Lambert et al. | |
| 7,497,623 B2 | 3/2009 | Thomas et al. | |
| 7,741,245 B2 | 6/2010 | Jacobson et al. | |
| 7,915,438 B1 | 3/2011 | Lambert et al. | |
| 7,939,091 B2 | 5/2011 | Coats et al. | |
| 8,087,827 B2 | 1/2012 | Mir | |
| 8,093,430 B2 | 1/2012 | Sisler | |
| 8,163,244 B2 | 4/2012 | Yoo | |
| 8,192,504 B2 | 6/2012 | Baxter et al. | |
| 8,247,459 B2 | 8/2012 | Kostansek | |
| 8,314,051 B2 | 11/2012 | Yoo | |
| 8,343,261 B2 | 1/2013 | Leung et al. | |
| 8,431,744 B2 | 4/2013 | Leung et al. | |
| 8,461,086 B2 | 6/2013 | Chang et al. | |
| 8,541,344 B2 | 9/2013 | Kostansek et al. | |
| 8,552,189 B2 | 10/2013 | Park et al. | |
| 8,569,407 B2 | 10/2013 | Leung et al. | |
| 8,580,140 B2 | 11/2013 | Jacobson et al. | |
| 8,603,524 B2 | 12/2013 | Baier et al. | |
| 8,691,728 B2 | 4/2014 | Kostansek et al. | |
| 8,802,140 B2 | 8/2014 | Mir | |
| 8,822,382 B2 | 9/2014 | Mir | |
| 8,960,199 B2 | 2/2015 | Zhuang et al. | |
| 9,005,657 B2 | 4/2015 | Mir | |
| 9,055,741 B2 | 6/2015 | Bardella et al. | |
| 9,155,299 B2 | 10/2015 | Jacobson et al. | |
| 9,210,938 B2 | 12/2015 | Chan et al. | |
| 9,265,268 B2 | 2/2016 | Mir et al. | |
| 9,282,736 B2 | 3/2016 | Kostansek et al. | |
| 9,320,288 B2 | 4/2016 | Wood et al. | |
| 9,353,282 B2 | 5/2016 | Wood et al. | |
| 9,394,216 B2 * | 7/2016 | Mir | C07C 7/10 |
| 9,992,995 B2 | 6/2018 | Ghosh | |
| 2002/0018743 A1 | 2/2002 | Katsuro et al. | |
| 2002/0198107 A1 * | 12/2002 | Kostansek | A01N 25/34 504/209 |
| 2003/0149157 A1 | 8/2003 | Tomlinson et al. | |
| 2003/0220201 A1 | 11/2003 | Kostansek et al. | |
| 2004/0072694 A1 | 4/2004 | Jacobson et al. | |
| 2004/0077502 A1 | 4/2004 | Jacobson et al. | |
| 2004/0081727 A1 | 4/2004 | Kelly et al. | |
| 2005/0250649 A1 | 11/2005 | Jacobson et al. | |
| 2005/0260907 A1 | 11/2005 | Chang et al. | |
| 2005/0261131 A1 | 11/2005 | Basel et al. | |
| 2005/0261132 A1 * | 11/2005 | Kostansek | A01N 3/00 504/353 |
| 2006/0003057 A1 | 1/2006 | Kelly et al. | |
| 2006/0154822 A1 | 7/2006 | Toivonen et al. | |
| 2006/0160704 A1 | 7/2006 | Basel et al. | |
| 2006/0188572 A1 * | 8/2006 | Sjogren | A01N 49/00 424/468 |
| 2007/0021300 A1 * | 1/2007 | Farant | B01J 20/28023 502/430 |
| 2007/0093392 A1 | 4/2007 | Vavra et al. | |
| 2007/0105722 A1 | 5/2007 | Basel et al. | |
| 2007/0117720 A1 | 5/2007 | Jacobson et al. | |
| 2007/0265167 A1 | 11/2007 | Edgington et al. | |
| 2008/0206823 A1 | 8/2008 | Jacobson et al. | |
| 2008/0216978 A1 | 9/2008 | Baxter et al. | |
| 2008/0318775 A1 | 12/2008 | Basel et al. | |
| 2009/0088323 A1 | 4/2009 | Basel et al. | |
| 2009/0118492 A1 | 5/2009 | Jacobson | |
| 2010/0144533 A1 | 6/2010 | Baier et al. | |
| 2011/0034335 A1 | 2/2011 | Daly et al. | |
| 2011/0092369 A1 | 4/2011 | Chang et al. | |
| 2011/0143004 A1 | 6/2011 | Wood et al. | |
| 2011/0150995 A1 | 6/2011 | Joshi | |
| 2011/0152375 A1 | 6/2011 | Trscher et al. | |
| 2011/0190137 A1 | 8/2011 | Jacobson et al. | |
| 2012/0004108 A1 | 1/2012 | Zhen | |
| 2012/0107459 A1 | 5/2012 | Wood et al. | |
| 2012/0142534 A1 | 6/2012 | Dahmer et al. | |
| 2012/0258220 A1 | 10/2012 | Jacobson | |
| 2012/0272572 A1 * | 11/2012 | Jacobson | A01N 25/28 47/66.6 |
| 2012/0322662 A1 * | 12/2012 | Yoo | A01N 31/14 504/354 |
| 2012/0328749 A1 | 12/2012 | Forsythe et al. | |
| 2013/0004634 A1 | 1/2013 | McCaskey et al. | |
| 2013/0074402 A1 | 3/2013 | Versteylen et al. | |
| 2013/0129880 A1 | 5/2013 | Edington et al. | |
| 2013/0216657 A1 | 8/2013 | Kusuura | |
| 2013/0225413 A1 | 8/2013 | Fowler et al. | |
| 2013/0280611 A1 | 10/2013 | Alkordi et al. | |
| 2013/0345060 A1 | 12/2013 | Becker et al. | |
| 2014/0011679 A1 | 1/2014 | Mir | |

(56) References Cited

U.S. PATENT DOCUMENTS

| | | |
|---|---|---|
| 2014/0017134 A1 | 1/2014 | Yoo et al. |
| 2014/0066310 A1 | 3/2014 | Edgington et al. |
| 2014/0080710 A1 | 3/2014 | Zhang et al. |
| 2014/0080711 A1 | 3/2014 | Zhang et al. |
| 2014/0080712 A1 | 3/2014 | Lao et al. |
| 2014/0116900 A1 | 5/2014 | Machado |
| 2014/0121110 A1* | 5/2014 | Dhingra .......... A01N 3/00 504/188 |
| 2014/0154370 A1 | 6/2014 | Wood et al. |
| 2014/0326620 A1 | 11/2014 | Mir |
| 2014/0342910 A1 | 11/2014 | Mir |
| 2015/0087520 A1 | 3/2015 | Ghosh |
| 2015/0208679 A1 | 7/2015 | Mir et al. |
| 2015/0272115 A1 | 10/2015 | Green |
| 2015/0282479 A1 | 10/2015 | Basel et al. |
| 2015/0375521 A1 | 12/2015 | Wood et al. |
| 2017/0275076 A1 | 9/2017 | Edgington et al. |
| 2019/0037839 A1 | 2/2019 | Preslar et al. |
| 2020/0396993 A1 | 12/2020 | Mouat et al. |

FOREIGN PATENT DOCUMENTS

| | | | |
|---|---|---|---|
| CN | 1348331 A | 5/2002 | |
| CN | 100340172 C | 10/2007 | |
| CN | 101243788 A | 8/2008 | |
| CN | 101297659 A | 11/2008 | |
| CN | 101926387 A | 12/2010 | |
| CN | 101971875 A | 2/2011 | |
| CN | 102119718 A | 7/2011 | |
| CN | 102119719 A | 7/2011 | |
| CN | 102440237 A * | 5/2012 | ............ A01N 27/00 |
| CN | 102440237 A | 5/2012 | |
| CN | 102726377 A | 10/2012 | |
| CN | 102862361 A | 1/2013 | |
| CN | 102964615 A | 3/2013 | |
| CN | 202807462 U | 3/2013 | |
| CN | 102440237 B | 6/2014 | |
| CN | 104822750 A | 8/2015 | |
| CN | 104936447 A | 9/2015 | |
| EP | 0 180 468 A2 | 5/1986 | |
| EP | 0 514 578 A1 | 11/1992 | |
| EP | 0 572 743 A1 | 12/1993 | |
| EP | 1 192 858 A1 | 4/2002 | |
| EP | 2 100 661 A2 | 9/2009 | |
| EP | 2 296 171 A2 | 3/2011 | |
| EP | 2 508 071 A1 | 10/2012 | |
| GB | 2 449 876 A | 12/2008 | |
| JP | S50-58226 A | 5/1975 | |
| JP | H05-051301 A | 3/1993 | |
| JP | H06-170213 A | 6/1994 | |
| JP | 2002-179508 A | 6/2002 | |
| JP | 2002-356401 A | 12/2002 | |
| JP | 2005-307120 A | 11/2005 | |
| JP | 4254097 B2 | 4/2009 | |
| JP | 2009-155400 A | 7/2009 | |
| KR | 2010 0004516 A | 1/2010 | |
| TW | 1445500 B | 7/2014 | |
| WO | WO 96/13162 A1 | 5/1996 | |
| WO | WO 99/42264 A1 | 8/1999 | |
| WO | WO 00/10386 A1 | 3/2000 | |
| WO | WO 01/72129 A1 | 10/2001 | |
| WO | WO 03/039251 A1 | 5/2003 | |
| WO | WO 2004/068945 A1 | 8/2004 | |
| WO | WO 2005/110592 A1 | 11/2005 | |
| WO | WO 2007/041272 A2 | 4/2007 | |
| WO | WO 2007/058473 A1 | 5/2007 | |
| WO | WO 2008/149232 A2 | 12/2008 | |
| WO | WO 2014/056035 A1 | 4/2014 | |
| WO | 2014/085518 | 6/2014 | |
| WO | WO 2014/172900 A1 | 10/2014 | |
| WO | WO 2015/006671 A1 | 1/2015 | |
| WO | WO 2015/047897 A1 | 4/2015 | |
| WO | WO 2016/037043 A1 | 3/2016 | |
| WO | WO-2016037043 A1 * | 3/2016 | ............ A23L 19/03 |
| WO | WO 2017/064704 A1 | 4/2017 | |
| WO | 2017/091096 A2 | 6/2017 | |
| WO | WO 2017/143311 A1 | 8/2017 | |
| WO | WO 2019/133076 A1 | 7/2019 | |

OTHER PUBLICATIONS

Dictionary Definition of "Pest." https://www.dictionary.com/browse/pest?s=t accessed Oct. 21, 2019, pp. 1-7. (Year: 2019).*

Bidyut B. Saha, Khairul Habib, Ibrahim I. El-Sharkawy Shigeru Koyama. "Adsorption characteristics and heat of adsorption measurements of R-134a on activated carbon." International Journal of Refrigeration, vol. 32, 2009, pp. 1563-1569. (Year: 2009).*

US Patent and Trademark Office, Patent Trial and Appeal Board. "*UPL Ltd.*, Petitioner, v. *AGROFRESH Inc*, Patent Owner." Case IPR2017-01919, Final Written Decision, dated Mar. 6, 2019, pp. 1-51. (Year: 2019).*

Google Patents. English Translation of CN 102440237A. https://patents.google.com/patent/CN102440237A/en?oq=1-methylcyclopropene+zeolite accessed Jan. 16, 2019. Originally published in Chinese on May 9, 2012, 8 printed pages. (Year: 2012).*

Yonsuk S. Lee, Randy Beaudry, Jai N. Kim, and Bruce R. Harte. "Development of a 1-Methylcyclopropene (1-MCP) Sachet Release System." Journal of Food Science, vol. 71, No. 1, 2006, pages C1-C6. (Year: 2006).*

United States Court of Appeals of the Federal Circuit. "*Abbvie* v. *Janssen*" Appeal No. 2013-1338, -1346, decided Jul. 1, 2014, pp. 1-34 and 1-4 (38 total pages). (Year: 2014).*

United States Court of Appeals of the Federal Circuit. "*Ariad Pharmaceuticals Inc.* v. *Eli Lilly and Company*." Case 2008-1248, Decided Mar. 22, 2010, 72 total pages. (Year: 2010).*

Roop Chand Bansal and Meenakshi Goyal. "Activated Carbon Adsorption." Taylor and Francis Group, 2005, ISBN-10: 0-8247-5344-5, pp. 1-472 and additional sheets in the beginning (487 total sheets). (Year: 2005).*

Victor Ntuli, Innocent Hapazari. "Sustainable waste management by production of activated carbon from agroforestry residues." South African Journal of Science, vol. 109, No. 1/2, Jan./Feb. 2013, pp. 1-6. (Year: 2013).*

United States Court of Appeals for the Federal Circuit. "*The Regents of the University of California* v. *Eli Lilly and Company*." Appeal # 96-1175, Decided Jul. 22, 1997, 21 printed pages. (Year: 1997).*

United States Court of Appeals for the Federal Circuit. *Enzo Biochem, Inc.* v. *Gen-Probe Incorporated*, Appeal No. 01-1230, 296 F .3d 1316 (2002), 8 printed pages. (Year: 2002).*

Office Acommunication dated Oct. 10, 2019 for U.S. Appl. No. 15/999,302.

International Search Report and Written Opinion for PCT/US2017/018542 dated May 15, 2017.

International Preliminary Report on Patentability (Chapter II) for PCT/US2017/018542 dated May 24, 2018.

Office Communication for ES App. No. 2 711 980 dated May 13, 2019.

Ahmaruzzaman, Adsorption of phenolic compounds on low-cost adsorbents: A review. Advances in Colloid and Interface Science. 2008;143:48-67. Epub Jul. 22, 2008.

Bernardos et al., Antifungal effect of essential oil components against Aspergillus niger when loaded into silica mesoporous supports. J. Sci. Food. Agric. 2015;95:2824-31. Epub Nov. 26, 2014.

Bozkurt et al., Effect of vaporized ethyl pyruvate as a novel preservation agent for control of postharvest quality and fungal damage of strawberry and cherry fruits. LWT—Food Science and Technology. 2016;65:1044-9. Epub Sep. 30, 2015.

Breslow et al., Very Strong Binding of Appropriate Substrates by Cyclodextrin Dimers. J. Am. Chem. Soc. 1989;111:8296-7.

Campos-Requena et al., The synergistic antimicrobial effect of carvacrol and thymol in clay/polymer nanocomposite films over strawberry gray mold. Food Science and Technology. 2015;64:390-6. Epub Jun. 14, 2015.

(56) References Cited

OTHER PUBLICATIONS

Donsi et al., Essential oil nanoemulsions as antimicrobial agents in food. Journal of Biotechnology. 2016;233:106-20. Epub Jul. 11, 2016.

Farzaneh et al., Chemical composition and antifungal effects of three species of Satureja (*S. hortensis*, *S. spicigera*, and *S. khuzistanica*) essential oils on the main pathogens of strawberry fruit. Postharvest Biology and Technology. 2015;109:145-51. Epub Jul. 13, 2015.

Fujita et al., Fully Collaborative Guest Binding by a Double Cyclodextrin Host. J. Chem. Soc., Chem. Commun. 1984:1277-8.

Hossain et al., Evidence for synergistic activity of plant-derived essential oils against fungal pathogens of food. Food Microbiology. 2016;53:24-30. Epub Aug. 18, 2015.

Lee et al., Development of a 1-Metylcyclopropene (1-MCP) Sachet Release System. Journal of Food Science. 2006;71(1):C1-C6. Epub Jan. 6, 2006.

Neoh et al., Kinetics of Molecular Encapsulation of 1-Methylcyclopropene into (alpha)-Cyclodextrin. Journal of Agricultural and Food Chemistry. 2007;55:11020-6.

Otoni et al., Trends in antimicrobial food packaging systems: Emitting sachets and absorbent pads. Food Research International. 2016;83:60-73. Epub Feb. 23, 2016.

Peretto et al., Increasing strawberry shelf-life with carvacrol and methyl cinnamate antimicrobial vapors released from edible films. Postharvest Biology and Technology. 2014;89:11-8.

Perez-Alfonso et al., The effects of essential oils carvacrol and thymol on growth of Penicillium digitatum and P. italicum involved in lemon decay. International Journal of Food Microbiology. 2012;158:101-6. Epub Jul. 10, 2012.

Snyder, Adsorption from Solution. IV. Aromatic Hydrocarbons on Silica. J. Phys. Chem. Dec. 1963;67:2622-8.

Teixeira et al., Chemical composition and bioactivity of different oregano (*Origanum vulgare*) extracts and essential oil. J. Sci. Food Agric. 2013;93:2707-14. Epub Feb. 4, 2013.

Wilson et al., Postharvest handling and cooling of fresh fruit, vegetables, and flowers for small farms. North Carolina Cooperative Extension Service. North Carolina Cooperative Extension Service. 1999. 12 pages.

Bersier et al., Electrochemistry of Cyclodextrins and Cyclodextrin Inclusion Complexes. Electroanalysis. 1991;3:443-55.

Carter et al., Review of the Chemistry of Cyclopropene Compounds. Chem. Rev. Sep. 1964;64(5):497-525.

Cramer et al., Inclusion Compounds. XIX. The Formation of Inclusion Compounds of α-Cyclodextrin in Aqueous Solutions. Thermodynamics and Kinetics. Journ. Amer. Chem. Soc. Jan. 1967;89(1):14-20.

Cramer et al., Einschlussverbindungen der Cyclodestrine mit Gasen. Angew Chem. 1956;20:649.

Cramer et al., Über Einschlußverbindungen, XII. Verbindungen von α-Cyclodextrin mit Gasen. Chemische Berichte. Nov. 1957;90(11):2572-5.

Davis, Zeolites and molecular sieves: not just ordinary catalysts. Ind. Eng. Chem. Res. Aug. 1991;30(8):1675-83.

Diederich et al., Inclusion Complexes between a Macrocyclic Host Molecule and Aromatic Hydrocarbons in Aqueous Solution. Angew. Chem. Int. Ed. Engl. 1983;22(9):715-6.

Duchene et al., Industrial Uses of Cyclodextrins and Their Derivatives. J. Coord. Chem. 1992;27:223-36.

Fisher et al., Synthesis of 1-Methylcycloprpene. J. Org. Chem. Jun. 1965;30(6):2089-90.

Gardner et al., The Polarographic Reduction of Organic Compounds. Reviews of Pure and Applied Chemistry. 1953;3(5):134-78.

Gelb et al., Cyclohexaamylose complexation with organic solvent molecules. J. Am. Chem. Soc. 1982;104(23):6283-8.

Heyes et al., 1-methylcyclopropene extends Cymbidium orchid vaselife and prevents damaged pollinia from accelerating senescence. New Zealand Journal of Crop and Horticultural Science. 1998;26:319-24.

Kemp et al., The microwave spectrum, structure, and bonding, and barrier to internal rotation in 1-methylcyclopropene. JACS. Jul. 1, 1967;89(15):3925-6.

Kniel et al., Ethylene: Keystone to the Petrochemical Industry. Marcel Dekker, Inc. New York, NY. 1980:2-3, 36-7, 48-50.

Kościelski et al., Cyclodextrin as a tool for separating cis- and trans-decalin by gas-liquid chromatography. Journal of Chromotography. 1986;351:512-7.

Kościelski et al., Separation Processes in Gas-Liquid Chromatography Based on Formation of α-Cyclodextrin—Chiral Hydrocarbons Inclusion Complexes. Journal of Inclusion Phenomena. 1987;5:69-72.

Mattheis, How 1-Methylcyclopropene Has Altered the Washington State Apple Industry. HortScience Feb. 2008;43(1):99-101.

Nanthachai et al., Adsorption of 1-MCP by fresh produce. Postharvest Biology and Technology. Mar. 2007;43(3):291-7.

Perry's Chemical Engineering Handbook, Sixth Edition, McGraw-Hill. 1984. pp. 14-1, 14-2, 14-7, 18-1, 18-2, 18-3, 18-57, 18-61, 18-62.

Qi et al., Use of Cyclodextrins for Flavors. Flavor Technology, Chapter 18. American Chemical Society. Washington, DC. 1995:231-43.

Rao et al., Modification of Photochemical Reactivity by Cyclodextrin Complexation: A Remarkable Effect on the Photobehavior of α-Alkyldibenzyl Ketones. J. Org,. Chem. 1987;52:5517-21.

Reichenbach et al., Oxidative Stability and Nuclear Magnetic Resonance Analyses of Linolec Acid Encapsulated in Cyclodextrins. JAOCS. 1997;74(10):1329-33.

Saenger, Cyclodextrin Inclusion Compounds in Research and Industry, Angew. Chem. Int. Ed. Engl. 1980;19:344-62.

Sanemasa et al., Association of Some Polynuclear Aromatic Hydrocarbons with Cyclodextrins in Aqueous Medium. Bull. Chem. Soc. Jpn. 1989;62(10):3098-102.

Sanemasa et al., Preparation of Cyclodextrin Precipitates with Volatile Hydrocarbons in Aqueous Media, and Determination of Hydrocarbon/Cyclodextrin Molar Ratios in the Precipitates, Bull. Chem. Soc. Jpn. 1993;66(5):1424-9.

Serek et al., Novel Gaseous Ethylene Binding Inhibitor Prevents Ethylene Effects in Potted Flowering Plants.J. Amer. Soc. Hort. Sci. 1994; 119(6):1230-3.

Shahidi et al., Encapsulation of food ingredients, Critical Reviews in Food Science & Nutrition. 1993;33(6):501-47.

Sisler et al., Comparison of cyclopropene, 1-methylcyclopropene, and 3,3-dimethylcyclopropene as ethylene antagonists in plants. Plant Growth Regulation. 1996; 18:169-74.

Sisler et al., Inhibitors of ethylene responses in plants at the receptor level: Recent developments. Physiologia Plantarum. Jul. 1997;100(3):577-82.

Stella et al., Mechanisms of drug release from cyclodextrin complexes, Advanced Drug Delivery Reviews. 1999;36:3-16.

Szejtli, Chapter 8: Molecular Entrapment and Release Properties of Drugs by Cyclodextrins, Controlled Drug Bioavailability, vol. 3, John Wiley & Sons, Inc. 1985;3:365-420.

Szejtli, Introduction and General Overview of Cyclodextrin Chemistry. Chem. Rev. Jun. 1998;98(5):1743-53.

Szente et al., Formulation of Insect Controlling Agents with β-Cyclodextrin. Pestic. Sci. 1990;28:7-16.

Szente et al., Long Term Storage Stability Studies on Flavour β-Cyclodextrin Complexes, Proceedings of the Fourth International Symosium on Cyclodextrins. 1988:545-9.

Szente et al., Tea Aromatization with Beta-Cyclodextrin Complexed Flavours. Acta Alimentaria. 1988;17:193-99.

Szente, Stable, Controlled-Release Organophosphorous Pesticides Entrapped in β-Cyclodextrin, I. Solid State Characteristics. Journal of Thermal Analysis. 1998;51:957-63.

Té tényi et al., Prolongation of Ethylene Effect by Cyclodestrin Complexation of 2-Chloroethanephosphonic Acid, Acta Agronomica, Academiae Scientarium Hungaricae, Tomus. 1984;33(3-4):345-8.

Uekama et al., Improvement of Disslolution and Suppository Release Characteristics of Flurbiprofen by Inclusion Complexation with Heptakis (2,6-di-O-methyl)-β-cyclodextrin, J. Pharm. Sc. Aug. 1985;74(8):841-5.

(56) References Cited

OTHER PUBLICATIONS

Uemasu et al., Capture of Volatile Chlorinated Hydrocarbons by Aqueous Solutions of Branched Cyclodextrins, J. Szejtli and L. Szente (eds.), Proceedings of the Eighth International Symposium on Cyclodextrons. 1996:597-600.
Uemasu et al., Emission control of volatile chlorinated hydrocarbons using cyclodextrins.Shigen to Kankyo. Jan. 1997;6(1):39-46. Abstract Only.
Wilhelm et al., Low-Pressure Solubility of Gases in Liquid Water. Chemical Reviews. 1977;77(2): 219-62.
Yoshihisa et al., Binding Forces Contributing to the Association of Cyclodextrin with Alcohol in an Aqueous Solution. Bulletin of the Chemical Society of Japan. 1979;52(10):2808-14.
Wanyika et al., Mesoporous Silica Nanoparticles Carrier for Urea: Potential Applications in Agrochemical Delivery Systems. Journal of Nanoscience and Nanotechnology. 2012;12:2221-8.
Office Communication dated Sep. 4, 2019 for CL App. No. 2018-2371.
Office Communication dated Oct. 10, 2019 for U.S. Appl. No. 15/999,302.
Wills and Golding, Advances in Postharvest Fruit and Vegetable Technology. CRC Press. Boca Raton. 2015:391 pages.
Office Communication dated Jan. 20, 2020 for ES App. No. 201890053.
Complete file history for U.S. Appl. No. 14/726,004, filed May 29, 2015 as of Mar. 19, 2020. 551 pages.
[No Author Listed], Decco/ESSENTIV Announce US EPA Registration of TruPick for Postharvest Freshness Management. Press Release. Decco Worldwide. Jul. 11, 2016. 1 page.
Ahmad et al., Elemental distribution and porosity enhancement in advanced nano bimetallic catalyst. Powder Technology. Aug. 2015;280:42-52.
Alvarez et al., The structure of the Aluminum Fumarate Metal—Organic Framework A520. Angewandte Chemie Int Ed. 2015;127:3735-9.
Banerjee et al., A Calcium Coordination Framework Having Permanent Porosity and High CO2/N2 Selectivity. Crystal Growth Des. 2012;12:2162-5. Epub Mar. 15, 2012.
Biencinto et al., Performance model and annual yield comparison of parabolic-trough solar thermal power plants with either nitrogen or synthetic oil as heat transfer fluid. Energy Conversion and Management. Nov. 2014;87:238-49. Epub Jul. 26, 2014.
Blankenship et al., 1-Methylcyclopropene: a review. Postharvest Biology and Technology. 2003;28:1-25.
Bloch et al., Hydrocarbon Separations in a Metal-Organic Framework with Open Iron(II) Coordination Sites. Science. Mar. 2012;335:1606-10.
Burtch et al., Water Stability and Adsorption in Metal—Organic Frameworks. Chem Rev. 2014;114:10575-612. Epub Sep. 29, 2014.
Chen et al., A two-dimensional zeolitic imidazolate framework with a cushion-shaped cavity for $CO_2$ adsorption. Chem Commun (Camb). Oct. 21, 2013;49(82):9500-2. doi: 10.1039/c3cc44342f.
Chopra et al., Metal-organic frameworks have utility in adsorption and release of ethylene and 1-methylcyclopropene in fresh produce packaging. Postharvest Biology and Technology. 2017;130:48-55.
Cozmuta et al., Gas Sorption and Barrier Properties of Polymeric Membranes from Molecular Dynamics and Monte Carlo Simulations. J. Phys. Chem. B. 2007;111:3151-66. Epub Mar. 8, 2007.
Dinca et al., Strong $H_2$ binding and selective gas adsorption within the microporous coordination solid $Mg_3(O_2$—$C_{10}H_6$—$CO_2)_3$. J Am Chem Soc. Jul. 6, 2005;127(26):9376-7.
Getman et al., Review and Analysis of Molecular Simulations of Methane, Hydrogen, and Acetylene Storage in Metal-Organic Frameworks. Chem Rev. 2012;112(2):703-23. Epub Dec. 21, 2011.
Hartmann et al., Adsorptive Separation of Isobutene and Isobutane on $Cu_3(BTC)_2$. Langmuir. 2008;24:8634-42. Epub Jul. 9, 2008.
Ho et al., Encapsulation of gases in powder solid matrices and their applications: A review. Powder Technology. 2014;259:87-108. Epub Mar. 28, 2014.
Horcajada et al., Metal—Organic Frameworks in Biomedicine. Chem Rev. 2012; 112:1232-68. Epub Dec. 14, 2011.
Kopel et al., Complexes of iron(III) salen and saloph Schiff bases with bridging dicarboxylic and tricarboxylic acids. Transition Met. Chem. 1998;23:139-42.
Krungleviciute et al., Argon adsorption on $Cu_3$(benzene-1,3,5-tricarboxylate)$_2$(H2O)$_3$ metal-organic framework. Langmuir. Mar. 13, 2007;23(6):3106-9. Epub Feb. 6, 2007.
Lan et al., RPM3: A Multifunctional Microporous MOF with Recyclable Framework and high H2 Binding Energy. Inorg. Chem. 2009;48:7165-73. Epub Jul. 2, 2009.
Loiseau et al., A rationale for the large breathing of the porous aluminum terephthalate (MIL-53) upon hydration. Chemistry. Mar. 19, 2004;10(6):1373-82.
Mir et al., Harvest Maturity, Storage Temperature, and 1-MCP Application Frequency Alter Firmness Retention and Chlorophyll Fluorescence of Redchief Delicious Apples. J. Amer. Soc. Hort. Sci. 2001;126(5):618-24.
Pan et al., RPM-1: a recyclable nanoporous material suitable for ship-in-bottle synthesis and large hydrocarbon sorption. Angew Chem Int Ed Engl. Feb. 3, 2003;42(5):542-6.
Pan et al., RPM-2: a recyclable porous material with unusual adsorption capability: self assembly via structural transformations. Chem Commun (Camb). Apr. 7, 2003;(7):854-5.
Qian et al., Hydrothermal synthesis of zeolitic imidazolate framework-67 (ZIF-67) nanocrystals. Material Letters. Sep. 2012;82:220-3.
Rood et al., Synthesis, Structural Characterization, Gas Sorption and Guest-Exchange Studies of the Lightweight, Porous Metal-Organic Framework $\alpha$-[$Mg_3(O_2CH)_6$]. Inorganic Chemistry. 2006;45:5521-8. Epub Jun. 7, 2006.
Rossin et al., Phase Transitions and CO2 Adsorption Properties of Polymeric Magnesium Formate. Crystal Growth & Design. 2008;8(9):3302-8. Epub Aug. 16, 2008.
Vakkalanka et al., Emerging packaging technologies for fresh produce. Emerging Food Packaging Technologies. 2012:109-33. Epub Mar. 27, 2014.
Wang et al., Stability and hydrogen adsorption of metal—organic frameworks prepared via different catalyst doping methods. Journal of Catalysis. Oct. 2014;318:128-42.
Yin et al., Fabrication and performance of microencapsulated phase change materials with hybrid shell by in situ polymerization in Pickering emulsion. Polymers for Advanced Technologies. Jun. 2015;26(6):613-9.
U.S. Appl. No. 16/957,794, filed Jun. 25, 2020, Mouat et al.
CL 2371-2018, dated Jun. 30, 2020, Office Communication.
EP 17708128.8, dated Jul. 10, 2020, Office Communication.
ES P201890053, dated Jul. 3, 2020, Office Action.
IL 261176, dated Sep. 6, 2020, Office Action.
IN 201817035167, dated Jun. 24, 2020, First Examination Report.
PCT/US2018/047826, dated Jul. 9, 2020, International Preliminary Report on Patentability.
Office Communication for CN 201780012196.8 dated Sep. 27, 2020.
Office Communication for CL Application No. 2371-2018 dated Jun. 30, 2020.
Office Communication for EP Application No. 17708128.8 dated Jul. 10, 2020.
Office Action for ES Application No. P201890053 dated Jul. 3, 2020.
Office Communication for IL 261176 dated Sep. 6, 2020.
First Examination Report for IN 201817035167 dated Jun. 24, 2020.
Office Communication dated May 19, 2020 for U.S. Appl. No. 15/999,302.
International Preliminary Report on Patentability for International Application No. PCT/US2018/047826 dated Jul. 9, 2020.
Office Communication for U.S. Appl. No. 15/999,302 dated Jan. 7, 2021.
Decision to Grant for ES Application No. 201890053 dated Feb. 2, 2021 and Allowed Claims.
ES 201890053, dated Feb. 2, 2021, Decision to Grant and Allowed Claims.
Office Communication JP Application No. 2018-563383 dated Oct. 23, 2020.
Office Communication for ES Application No. P202050001 dated Jun. 9, 2021.

(56) References Cited

OTHER PUBLICATIONS

Office Communication for CL Application No. 0925-2020 dated May 19, 2021.
Office Communication for CL Application No. 0926-2020 dated May 19, 2021.
Office Communication for CL Application No. 0927-2020 dated May 19, 2021.
Office Communication for IN Application No. 201817035167 dated Jul. 6, 2021.
Office Communication for U.S. Appl. No. 15/999,302 dated Jul. 14, 2021.
Office Communication for CN Application No. 201780012196.8 dated Jun. 30, 2021.
Office Communication for IN Application No. 201817035167 dated Aug. 2, 2021.
Notice of Allowance for JP Application No. 2018-563383 dated Aug. 3, 2021.
Office Communication for BR Application No. BR112018016570-0 dated Sep. 20, 2021.
Office Action for CR Application No. 2018-0451 dated Sep. 1, 2021.
[No Author Listed], Mesh to Micron Conversation Chart. 2021. http://www.filtersolutions.com/pdf/mesh%20to%20micron%20conversion%20chart.pdf [last accessed Jun. 25, 2021].
Lee et al., Sorption Behavior of 1-Methylcyclopropene on Adsorbing Agents for Use in Extending the Freshness of Postharvest Food Products. Food Sci Biotechnol. Aug. 2006;15(4):572-77.
Sanli et al., Carvone Containing Essential Oils as Sprout Suppressants in Potato (*Solanum tuberosum* L.) Tubers at Different Storage Temperatures. Potato Res. Mar. 21, 2019;62:345-60.
IL 261176, dated Dec. 30, 2021, Office Action.
Office Action for IL Application No. 261176 dated Dec. 30, 2021.

* cited by examiner

COMPOSITIONS FOR CONTROLLED RELEASE OF ACTIVE INGREDIENTS AND METHODS OF MAKING SAME

RELATED APPLICATIONS

The present application is a divisional of U.S. patent application Ser. No. 15/999,302, filed Aug. 17, 2018, and entitled "Compositions for Controlled Release of Active Ingredients and Methods of Making Same," which is incorporated herein by reference in its entirety for all purposes. U.S. patent application Ser. No. 15/999,302 is a U.S. National Stage patent application based on International Patent Application No. PCT/US2017/018542, filed Feb. 19, 2017, and entitled "Compositions for Controlled Release of Active Ingredients and Methods of Making Same," which claims priority under 35 U.S.C. § 119(e) to U.S. Provisional Patent Application No. 62/297,782, filed on Feb. 19, 2016, entitled "Compositions and Methods for Controlled Release of Active Ingredients," U.S. Provisional Patent Application No. 62/307,357, filed on Mar. 11, 2016, entitled "Compositions and Methods for Controlled Release of Active Ingredients," U.S. Provisional Patent Application No. 62/328,556, filed on Apr. 27, 2016, entitled "Compositions and Methods for Controlled Release of Active Ingredients," U.S. Provisional Patent Application No. 62/338,709, filed on May 19, 2016, entitled "Compositions and Methods for Controlled Release of Active Ingredients," U.S. Provisional Patent Application No. 62/347,914, filed on Jun. 9, 2016, entitled "Carbon Based Compositions for Controlled Release of Active Ingredients and Methods of Making Same," U.S. Provisional Patent Application No. 62/353,016, filed on Jun. 21, 2016, entitled "Carbon Based Compositions for Controlled Release of Active Ingredients and Methods of Making Same," and U.S. Provisional Patent Application No. 62/367,093, filed on Jul. 26, 2016, entitled "Compositions and Methods for Controlled Release of Active Ingredients," each of which is incorporated herein by reference in its entirety.

FIELD OF THE INVENTION

Compositions for controlled release of active ingredients and methods of making same are generally provided.

BACKGROUND

Produce waste throughout the supply chain decreases agricultural productivity and reduces the availability of nutritious food sources. Produce ages and eventually spoils due to, for example, one or more of the plant hormone ethylene, bacteria, microbes, fungus, and other pathogens. Volatile or gaseous active ingredients including, but not limited to cyclopropenes, essential oils, terpenes, and terpenoids can be used to control produce spoilage, but their inherent volatility in the gas and vapor phase limit their usefulness. Accordingly, improved composition and methods are needed.

SUMMARY OF THE INVENTION

Compositions for controlled release of active ingredients and methods of making same are generally provided.

In some embodiments, a composition is provided comprising a delivery material selected from among the group consisting of carbon materials and silicate materials; and a volatile or gaseous active ingredient useful for applications in at least one of agriculture, pest control, odor control, and food preservation present in the composition in at least about 0.01 wt % versus the total weight of the composition, wherein the composition is configured to control release the volatile or gaseous active ingredient.

In some embodiments, a composition is provided comprising a delivery material selected from the group consisting of carbon materials and silicate materials; and a cyclopropene present in the composition in at least about 0.05 wt % versus the total weight of the composition.

In some embodiments, a composition is provided comprising a silicate delivery material; and a cyclopropene present in the composition in at least about 0.01 wt % versus the total weight of the composition.

In some embodiments, a composition is provided comprising a delivery material selected from the group consisting of carbon materials and silicate materials; and a cyclopropene, wherein the composition is configured to control release the cyclopropene.

In some embodiments, a composition is provided comprising a cyclopropene, wherein the composition control releases the cyclopropene at a release rate of at least 0.0005 µL/g composition/hr at hour 22.

In some embodiments, a composition is provided comprising a cyclopropene, wherein a release rate of the cyclopropene from the composition at hour 22 is at least 0.1% of the release rate at hour 1.

In some embodiments, a composition is provided comprising a silicate material comprising a surface area greater than about 1 $m^2/g$; and at least one active ingredient selected from the group consisting of essential oils, terpenes, terpenoids, carvone, thymol, hexanal, carvacrol, oregano oil, and thyme oil, and combinations thereof.

In some embodiments, a method is provided comprising exposing a composition as described herein to produce.

In some embodiments, a method for controlled release of a cyclopropene is provided comprising exposing produce to a composition or matrix comprising a cyclopropene associated with a delivery material, wherein the delivery material is selected from the group consisting of a carbon based material and a silicate material, and wherein the composition comprises between about 0.01-30 wt % cyclopropene versus the total weight of the composition.

In some embodiments, a method of making a composition as described herein is provided, wherein the method comprises modifying at least one of the hydrophobicity, hydrophilicity, chemical potential, zeta-potential, acidity, basicity, surface functionalization, and surface functional group density of a carbon material to make a delivery material; and associating the at least one active ingredient with the delivery material.

BRIEF DESCRIPTION OF THE DRAWINGS

These and other objects and advantages of the invention will become apparent upon reading the detailed description and upon referring to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

DETAILED DESCRIPTION

Figure 1:
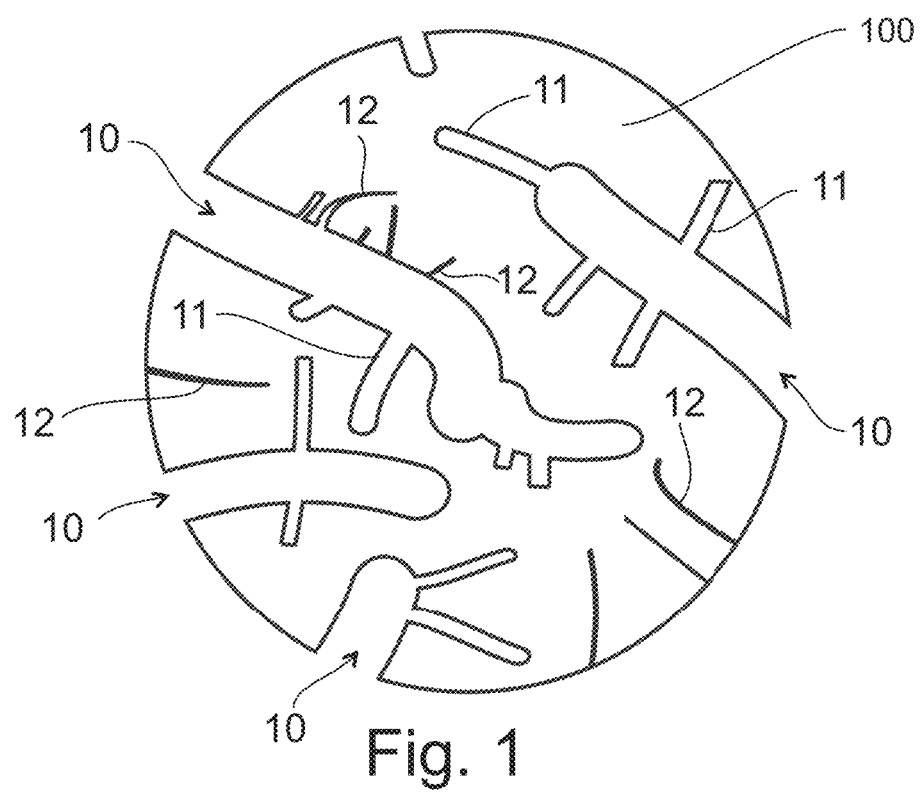
FIG. 1 is a cross-section of a delivery material in accordance with a non-limiting embodiment.

In the following description and accompanying figures, the same numerical references refer to similar elements throughout the figures and text. Furthermore, for the sake of simplicity and clarity, namely so as not to unduly burden the figures with several reference numbers, only certain figures have been provided with reference numbers, and components and features of the invention illustrated in other figures can be easily inferred therefrom. The embodiments, geometrical configurations, and/or dimensions shown in the figures are preferred for exemplification purposes only. Various features, aspects and advantages of the embodiments will become more apparent from the following detailed description.

Compositions, the use of compositions, and methods of making such compositions, for the release or controlled-release delivery of active ingredients are generally provided. In some embodiments, a composition is provided comprising a delivery material and at least one active ingredient. The composition may be configured to control release the active ingredient. The active ingredient may be useful for applications in at least one of agriculture, pest control, odor control, and food preservation. In some embodiments, the active ingredient is a volatile or gaseous active ingredient. Additional details regarding each of the components of the composition and related methods will now be described in detail.

An "active ingredient" as used herein generally refers to a chemical, biological, or other function that helps directly in achieving a desired performance objective. In some embodiments, the active ingredient has sufficient volatility to be present in detectable concentrations (e.g. ≥1 ppb) in the atmosphere surrounding the composition (e.g. the composition comprising the active ingredient and a delivery material) during (and often after) release of the active ingredient from the composition. In some embodiments, the compositions, the use of compositions, and methods of making compositions as described herein relate to the release or controlled-release delivery of vapor-phase or gas-phase active ingredients from a delivery material. A "vapor-phase active ingredient" or "gas-phase active ingredient" is an active ingredient that is in the vapor-phase or gas phase, respectively, at the desired conditions (e.g. ambient room temperature (about 23° C.-25° C.) and atmospheric pressure).

In some embodiments, an active ingredient may extend the shelf life of an agricultural product, and improve the overall quality of the agricultural product, and/or may provide control over the product ripeness. Examples of active ingredients include, but are not limited to: ethylene inhibitors for the improvement of quality and shelf life in produce; ethylene production stimulating compounds for control over produce ripeness; phospholipase-D inhibitors for improving the shelf-life and quality of post-harvest produce; essential oils (e.g. natural or synthetic) and other compounds which may have antibacterial, antiviral, antifungal, or pesticidal applications for resistance to pathogens and pests in, for instance, post-harvest produce, animals, or humans; antioxidants for improving the shelf-life, odor, and color of, for instance, post-slaughter packaged meat products; antioxidants for improving color retention in, for instance, cut fruits, vegetables, and other agricultural products; antioxidants with potential health benefits for biological targets, for instance, pets and humans; perfumes, fragrances, improving the scent of or reducing the odor of, for instance, spaces, animals, or humans. Active ingredients may include natural compositions, synthetic compositions, or a combination of both.

In some embodiments, the composition may comprise a single active ingredient. In other embodiments, the composition may comprise more than one active ingredient, for example, two active ingredients, three active ingredients, four active ingredients, or more. The composition may comprise any suitable amount of the active ingredient. In some cases, the active ingredient is present in the composition in at least about 0.01 wt %, at least about 0.1 wt %, at least about 0.5 wt %, at least about 1 wt %, at least about 1.5 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, or more, versus the total weight of the composition (e.g., the composition comprising the delivery material and the active ingredient). In other words, in non-limiting embodiments, the composition comprises active ingredient in a weight percent of at least about 0.01 wt %, at least about 0.05 wt %, at least about 0.1 wt %, at least about 0.5 wt %, at least about 1 wt %, at least about 1.5 wt %, at least about 2 wt %, at least about 3 wt %, at least about 4 wt %, at least about 5 wt %, at least about 6 wt %, at least about 7 wt %, at least about 8 wt %, at least about 9 wt %, at least about 10 wt %, or more, of the total weight of the composition (e.g., the composition comprising the delivery material and the active ingredient). In some embodiments, the active ingredient is present in the composition at between about 0.01 wt % and about 30 wt %, between about 0.05 wt % and about 30 wt %, between about 0.1 wt % and about 30 wt %, between about 0.5 wt % and about 30 wt %, between about 1 wt % and about 30 wt %, between about 1.5 wt % and about 30 wt %, between about 2 wt % and about 30 wt %, or between about 5 wt % and about 30 wt %, between about 0.01 wt % and about 15 wt %, between about 0.01 wt % and about 10 wt %, between about 0.01 wt % and about 5 wt %, between about 0.1 wt % and about 10 wt %, between about 0.1 wt % and about 5 wt %, between about 1 wt % and about 5 wt %, between about 1 wt % and about 10 wt %, between about 1 wt % and about 15 wt %, between about 2 wt % and about 10 wt %, between about 2% and about 7 wt %, between about 5 wt % and about 10 wt % versus the total weight of the composition (e.g., the composition comprising the delivery material and the active ingredient).

Compositions described herein may also be referred to as matrices (or a matrix). In an embodiment a matrix comprises a delivery material and an active ingredient. In an embodiment a matrix comprises a delivery material and an active ingredient, the active ingredient contained within the delivery material. In a non-limiting embodiment illustrated by FIG. 2, a matrix may be a composition comprising an active ingredient 20 and a delivery material 100. In an embodiment, the matrix is configured for controlled release of an active ingredient. In an embodiment, the active ingredient is in the vapor phase or gas phase.

In some embodiments, the release characteristics of an active ingredient from a composition can be assessed by measuring release of an active ingredient from the composition over time beginning at an hour zero. In a non-limiting embodiment, "hour zero" is defined as the instant a matrix is exposed to a non-equilibrium condition. A non-equilibrium condition occurs at all temperatures and pressures at which the active ingredient has vapor pressure. In an non-limiting example, the exposure of a matrix containing an active ingredient to an atmosphere containing zero (0) ppm of that active ingredient will trigger the release of the active ingredient until an equilibrium concentration of that active ingredient is reached between the composition and the atmosphere. In a non-limiting embodiment, a non-equilibrium condition occurs when a composition comprising an active ingredient is exposed to an atmosphere containing zero (0) ppm of that active ingredient. In a non-limiting embodiment, a non-equilibrium condition occurs when a composition comprising an active ingredient is exposed to an atmosphere containing about one (1) ppb or less of the active ingredient. In a non-limiting embodiment, a non-equilibrium condition occurs when a composition comprising an active ingredient is exposed to an atmosphere containing about one (1) ppm or less of the active ingredient. In a non-limiting embodiment, a non-equilibrium condition occurs when a composition comprising an active ingredient is exposed to an atmosphere containing about ten (10) ppm or less of the active ingredient. In a non-limiting embodiment, a non-equilibrium condition occurs when a composition comprising an active ingredient is exposed to an atmosphere containing about fifty (50) ppm or less of the active ingredient. In a non-limiting embodiment, a non-equilibrium condition occurs when a composition comprising an active ingredient is exposed to an atmosphere containing about one hundred (100) ppm or less of the active ingredient. In a non-limiting embodiment, a non-equilibrium condition occurs when a composition comprising an active ingredient is exposed to an atmosphere containing about one thousand (1000) ppm or less of the active ingredient. In a non-limiting embodiment, a non-equilibrium condition occurs when a composition comprising an active ingredient is exposed to an atmosphere containing about ten thousand (10,000) ppm or less of the active ingredient. In a non-limiting embodiment, a non-equilibrium condition occurs when a composition comprising an active ingredient is exposed to an atmosphere containing about one (1) ppb-ten (10) ppm. In a non-limiting embodiment, a non-equilibrium condition occurs when a composition comprising an active ingredient is exposed to an atmosphere containing about one (1) ppb-one hundred (100) ppm. In a non-limiting embodiment, a non-equilibrium condition occurs when a composition comprising an active ingredient is exposed to an atmosphere containing about one (1) ppb-one thousand (1000) ppm. In a non-limiting embodiment, an active ingredient is released from the matrices described herein at all temperatures from 0° C.-40° C. at atmospheric pressure.

Non-limiting examples of "hour zero" (e.g. when a matrix is exposed to a non-equilibrium condition) include: immediately after the matrix material has been charged with active ingredient and exposed to a non-equilibrium condition, immediately after the matrix material has been removed from a low temperature (for example −4° C. or lower) and transferred to a higher temperature (such as ambient room temperature) and a non-equilibrium condition, immediately after the matrix material has been removed from a very low temperature (for example −20° C. or lower) and transferred to a higher temperature (such as ambient room temperature) and a non-equilibrium condition, immediately after the matrix material is incorporated, sealed, or packaged in an structure or form factor and is exposed to a non-equilibrium condition, immediately after the structure or form factor containing the matrix is removed from a further outer packaging and exposed to a non-equilibrium condition, immediately after the matrix material has been removed from a hermetically sealed or gas impermeable container and exposed to a non-equilibrium condition, immediately after the matrix material is exposed to produce in a non-equilibrium condition.

The controlled release parameters of the matrices described herein are, unless otherwise stated, reported in relation to 1) the amount of active ingredient (e.g. as a volume or mass) released per gram of matrix per unit time, and/or 2) the percentage of the rate of release as compared to the rate of release at a particular time point (e.g. hour one (1)). The control release parameters set forth below for the matrices described herein are, unless otherwise stated, given for conditions of matrix exposure at "hour zero" to a non-equilibrium condition. Example non-equilibrium conditions for the controlled release parameters are matrix exposure to ambient room temperature (approximately 23-25° C.) and atmospheric pressure, with no active ingredient detected in the atmosphere prior to commencement of the release test. It should be understood that throughout the duration of the release test, temperature and atmospheric pressure around the matrix material has been kept substantially constant. It should be further understood that the atmospheric concentration of the active ingredient may vary throughout the duration of the release test as the active ingredient is released from the matrix into the surrounding atmosphere.

In some embodiments, controlled release can be quantified as a rate, which may be reported as an amount of active ingredient (e.g. a volume or mass) released per gram of matrix per unit time. Equivalent to the amount of active ingredient (e.g. a volume or mass) released per gram of matrix per unit time is the amount of active ingredient (e.g. a volume or mass) released per gram of composition (e.g. the composition comprising a delivery material and the active ingredient) per unit time. In a non-limiting embodiment, the rate of release is reported on a per hour basis. The rate of release of active ingredient per gram of composition per hour may be determined for a particular hour (e.g. hour 22) by measuring the amount of active ingredient released from the composition over a period of time (e.g. sixty (60) minutes) immediately preceding the particular hour (e.g. hour 22) at which the rate is reported. For example, the release rate on a per hour basis reported for hour 22 may be calculated based on the amount (e.g. as a volume or mass) of active ingredient released from a composition (e.g. comprising a delivery material and the active ingredient) during the sixty (60) minutes which commences at hour 21 and ending at hour 22. The amount of active ingredient released from the composition (e.g. calculated as a volume or a mass of active ingredient released during that period of sixty (60) minutes) is then divided by the total mass of the composition (e.g. as measured in grams immediately prior to hour zero of the release test) to arrive at a release rate as an amount of active ingredient released per gram of matrix per hour.

A non-limiting example of how to measure the release rate of an active ingredient from a composition (e.g. the composition comprising a delivery material and the active ingredient) at hour 1 is as follows. The mass of the composition to be studied is measured (e.g. in grams). The release study commences at hour zero when the matrix is exposed to a non-equilibrium condition, as discussed above. The active ingredient released from the composition over the subsequent sixty (60) minutes is collected (e.g. in a sealed vial) and sampled (e.g. using conventional headspace methodologies) at hour 1, which occurs sixty (60) minutes after hour zero. The sample of the active ingredient collected is then measured (e.g. using a gas chromatograph (GC)). The amount (e.g. as a volume or mass) of active ingredient released as calculated from the GC measurement is then divided by the total mass of the composition (e.g. in grams) as initially measured. The resulting numerical figure is the amount (e.g. as a volume or mass) of active ingredient released per gram matrix per hour at hour 1. A non-limiting example of how to measure the release rate of an active ingredient from the same composition (e.g. during the same release test) at hour 22 is as follows. After the active ingredient collected over the sixty (60) minutes commencing at hour zero and ending at hour 1 is sampled at hour 1, the vial is left open to allow the active ingredient to escape. At sixty (60) minutes prior to the next sample time (e.g. hour 22 in this case) the vial is again sealed to allow the active ingredient to collect for one hour. In other words, the vial is sealed at hour 21 in anticipation of a measurement sample to be taken at hour 22. The active ingredient released from the composition during the sixty (60) minutes from hour 21 to hour 22 is collected and promptly sampled (e.g. using conventional headspace methodologies) at hour 22. The sample of the active ingredient collected is then measured using GC analysis. The amount (e.g. as a volume or mass) of active ingredient released as calculated from the GC measurement is then divided by the mass of the composition as initially measured (e.g. the same matrix mass used in the calculation for hour 1). The resulting numerical figure is the amount (e.g. as a volume or mass) of active ingredient released per gram matrix per hour at hour 22.

Those with ordinary skill in the art will be aware of conventional headspace methodologies that use, for example, gas chromatography (GC). A non-limiting example of a method that uses headspace analysis to measure controlled release of an active ingredient is provided as follows. A sample of the matrix comprising the active ingredient, may be placed in a vial for analysis (e.g. at hour zero), and the vial may be sealed. The rate of release may be calibrated based on the number of hours that the active ingredient is permitted to build up in the vial while the vial is sealed. For a period of time (e.g. one (1) hour) prior to each sampling timepoint, the vapor/gas phase active ingredient may be permitted to build up in the vial. At all other times, the vial may be left open to allow the active ingredient to escape. Doing so may reduce and/or eliminate any effects of equilibrium adsorption. Depending on the length of time the active ingredient is permitted to build-up while the vial is sealed, the rate of release at a given timepoint can be calculated by sampling the headspace of the vial and injecting a sample volume (e.g. 100 µL to 300 µL) in a GC in accordance with methods known to those of ordinary skill in the art. The area of the GC peak may be calibrated by comparison against an internal standard. For example, for calculating the controlled release of 1-methylcyclopropene (1-MCP) from a matrix, the area of the GC peak may be calibrated against known quantities of 1-MCP released from ETHYLBLOC™ (FLORALIFE®; Walterboro, S.C.). 1-MCP in the form of ETHYLBLOC™ is obtainable as a 0.14 wt % solid powder. In a non-limiting embodiment, the release of an essential oil active ingredient may be calculated based on headspace sampling of its component terpene(s) during a release test.

As discussed above, controlled release may be quantified as rate, which may be reported as an amount of active ingredient (as a volume or mass, for example) released per gram of matrix per hour (µL active ingredient/g matrix/hr). Equivalent to that rate is the amount of active ingredient (e.g. as a volume or mass) released per gram of composition (e.g. the composition comprising a delivery material and the active ingredient) per hour. In some embodiments, the rate that is reported is the amount (e.g. as a volume or mass) of active ingredient released per gram of matrix during the hour (e.g. sixty (60) minutes) leading up to the sample timepoint. In some embodiments, the rate of release of active ingredient at hour 22 is at least about 0.0005 µL/g matrix/hr. In some embodiments, the rate of release of active ingredient at hour 22 is at least about 0.001 µL/g matrix/hr. In some embodiments, the rate of release of active ingredient at hour 22 is at least about 0.1 µL/g matrix/hr. In some embodiments, the rate of release of active ingredient at hour 22 is at least about 1 µL/g matrix/hr. In some embodiments, the rate of release of active ingredient at hour 22 is at least about 5 µL/g matrix/hr. In some embodiments, the rate of release of active ingredient at hour 22 is at least about 10 µL/g matrix/hr. In some embodiments, the rate of release of active ingredient at hour 22 is at least about 25 µL/g matrix/hr. In some embodiments, the rate of release of active ingredient at hour 22 is between about 0.0005 µL/g matrix/hr and about 25 µL/g matrix/hr. In some embodiments, the rate of release of active ingredient at hour 22 is between about 0.001 µL/g matrix/hr and about 25 µL/g matrix/hr. In some embodiments, the rate of release of active ingredient at hour 22 is between about 0.1 µL/g matrix/hr and about 25 µL/g matrix/hr. In some embodiments, the rate of release of active ingredient at hour 22 is between about 1 µL/g matrix/hr and about 22 µL/g matrix/hr. In some embodiments, the rate of release of active ingredient at hour 22 is between about 3 µL/g matrix/hr and about 22 µL/g matrix/hr. In some embodiments, the rate of release of active ingredient at hour 22 is between about 5 µL/g matrix/hr and about 22 µL/g matrix/hr. In some embodiments, the rate of release of active ingredient at hour 24 is at least about 0.001 µL/g matrix/hr. In some embodiments, the rate of release of active ingredient at hour 24 is at least about 0.1 µL/g matrix/hr. In some embodiments, the rate of release of active ingredient at hour 24 is at least about 1 µL/g matrix/hr. In some embodiments, the rate of release of active ingredient at hour 24 is at least about 5 µL/g matrix/hr. In some embodiments, the rate of release of active ingredient at hour 24 is at least about 10 µL/g matrix/hr. In some embodiments, the rate of release of active ingredient at hour 24 is at least about 20 µL/g matrix/hr. In some embodiments, the rate of release of active ingredient at hour 24 is at least about 30 µL/g matrix/hr. In some embodiments, the rate of release of active ingredient at hour 24 is at least about 35 µL/g matrix/hr. In some embodiments, the rate of release of active ingredient at hour 24 is between about 0.0005 µL/g matrix/hr and about 35 µL/g matrix/hr. In some embodiments, the rate of release of active ingredient at hour 24 is between about 0.001 µL/g matrix/hr and about 35 µL/g matrix/hr. In some embodiments, the rate of release of active ingredient at hour 22 is between about 0.1 µL/g matrix/hr and about 35 µL/g matrix/hr. In some embodiments, the rate of release of active ingredient at hour 24 is between about 1 µL/g matrix/hr and about 25 µL/g matrix/hr. In some embodiments, the rate of release of active ingredient at hour 24 is between about 3 µL/g matrix/hr and about 35 µL/g matrix/hr. In some embodiments, the rate of release of active ingredient at hour 24 is between about 5 µL/g matrix/hr and about 35 µL/g matrix/hr. In some embodiments, the rate of release of active ingredient at hour 48 is greater than zero µL/g matrix/hr. In some embodiments, the rate of release of active ingredient at hour 48 is at least about 0.01 µL/g matrix/hr. In some embodiments, the rate of release of active ingredient at hour 48 is at least about 0.1 µL/g matrix/hr. In some embodiments, the rate of release of active ingredient at hour 48 at least about 1 µL/g matrix/hr. In some embodiments, the rate of release of active ingredient at hour 48 at least about 5 µL/g matrix/hr. In some embodiments, the rate of release of active ingredient at hour 48 at least about 10 µL/g matrix/hr. In some embodiments, the rate of release of active ingredient at hour 48 at least about 20 µL/g matrix/hr. In some embodiments, the rate of release of active ingredient at hour 48 at least about 25 µL/g matrix/hr. In some embodiments, the rate of release of active ingredient at hour 48 at least about 30 µL/g matrix/hr. In some embodiments, the rate of release of active ingredient at hour 48 is between about 0.1 µL/g matrix/hr and about 4 µL/g matrix/hr. In some embodiments, the rate of release of active ingredient at hour 48 is between about 1 µL/g matrix/hr and about 5 µL/g matrix/hr. In some embodiments, the rate of release of active ingredient at hour 48 is between about 0.01 µL/g matrix/hr and about 30 µL/g matrix/hr. In some embodiments, the rate of release of active ingredient at hour 48 is between about 1 µL/g matrix/hr and about 30 µL/g matrix/hr. In some embodiments, the rate of release of active ingredient at hour 72 is greater than zero µL/g matrix/hr. In some embodiments, the rate of release of active ingredient at hour 72 is at least about 0.01 µL/g matrix/hr. In some embodiments, the rate of release of active ingredient at hour 72 is at least about 0.1 µL/g matrix/hr. In some embodiments, the rate of release of active ingredient at hour 72 is at least about 1 µL/g matrix/hr. In some embodiments, the rate of release of active ingredient at hour 72 is at least about 3 µL/g matrix/hr. In some embodiments, the rate of release of active ingredient at hour 72 is at least about 5 µL/g matrix/hr. In some embodiments, the rate of release of active ingredient at hour 72 is at least about 10 µL/g matrix/hr. In some embodiments, the rate of release of active ingredient at hour 72 is at least about 15 µL/g matrix/hr. In some embodiments, the rate of release of active ingredient at hour 72 is between about 0.01 µL/g matrix/hr and about 3 µL/g matrix/hr. In some embodiments, the rate of release of active ingredient at hour 72 is between about 0.1 µL/g matrix/hr and about 3 µL/g matrix/hr. In some embodiments, the rate of release of active ingredient at hour 72 is between about 1 µL/g matrix/hr and about 3 µL/g matrix/hr. In some embodiments, the rate of release of active ingredient at hour 72 is between about 0.01 µL/g matrix/hr and about 15 µL/g matrix/hr. In some embodiments, the rate of release of active ingredient at hour 72 is between about 0.1 µL/g matrix/hr and about 15 µL/g matrix/hr. In some embodiments, the rate of release of active ingredient at hour 72 is between about 1 µL/g matrix/hr and about 15 µL/g matrix/hr. In some embodiments, the rate of release of active ingredient at hour 96 is greater than zero µL/g matrix/hr. In some embodiments, the rate of release of active ingredient at hour 96 is at least about 0.01 µL/g matrix/hr. In some embodiments, the rate of release of active ingredient at hour 96 is at least about 0.1 µL/g matrix/hr. In some embodiments, the rate of release of active ingredient at hour 96 is at least 1 µL/g matrix/hr. In some embodiments, the rate of release of active ingredient at hour 96 is at least about 2 µL/g matrix/hr. In some embodiments, the rate of release of active ingredient at hour 96 is between about 0.01 µL/g matrix/hr and about 2 µL/g matrix/hr. In some embodiments, the rate of release of active ingredient at hour 96 is between about 0.1 µL/g matrix/hr and about 2 µL/g matrix/hr. In some embodiments, the rate of release of active ingredient at hour 96 is between about 1 µL/g matrix/hr and about 2 µL/g matrix/hr. In some embodiments, the rate release of active ingredient at hour 120 is greater than zero µL/g matrix/hr. In some embodiments, the rate of release of active ingredient at hour 120 is at least about 0.01 µL/g matrix/hr. In some embodiments, the rate of release of active ingredient at hour 120 is at least about 0.1 µL/g matrix/hr. In some embodiments, the rate of release of active ingredient at hour 120 is at least about 1 µL/g matrix/hr. In some embodiments, the rate of release of active ingredient at hour 120 is between about 0.01 µL/g matrix/hr and about 1 µL/g matrix/hr. In some embodiments, the rate of release of active ingredient at hour 120 is between about 0.1 µL/g matrix/hr and about 1 µL/g matrix/hr. In some embodiments, the rate release of active ingredient at hour 240 is greater than zero µL/g matrix/hr. In some embodiments, the rate release of active ingredient at hour 120 is greater than zero µL/g matrix/hr. In some embodiments, the rate of release of active ingredient at hour 168 is at least about 0.01 µL/g matrix/hr. In some embodiments, the rate of release of active ingredient at hour 168 is at least about 0.1 µL/g matrix/hr. In some embodiments, the rate of release of active ingredient at hour 168 is at least about 0.5 µL/g matrix/hr. In some embodiments, the rate of release of active ingredient at hour 168 is at least about 2 µL/g matrix/hr. In some embodiments, the rate of release of active ingredient at hour 168 is at least about 5 µL/g matrix/hr. In some embodiments, the rate of release of active ingredient at hour 168 is at least about 10 µL/g matrix/hr. In some embodiments, the rate of release of active ingredient at hour 168 is between about 0.01 µL/g matrix/hr and about 0.5 µL/g matrix/hr. In some embodiments, the rate of release of active ingredient at hour 168 is between about 0.01 µL/g matrix/hr and about 3 µL/g matrix/hr. In some embodiments, the rate of release of active ingredient at hour 168 is between about 0.01 µL/g matrix/hr and about 5 µL/g matrix/hr. In some embodiments, the rate of release of active ingredient at hour 168 is between about 0.5 µL/g matrix/hr and about 13 µL/g matrix/hr. In some embodiments, the rate release of active ingredient at hour 240 is greater than zero µL/g matrix/hr. In some embodiments, the rate of release of active ingredient at hour 240 is at least about 0.01 µL/g matrix/hr. In some embodiments, the rate of release of active ingredient at hour 240 is at least about 0.1 µL/g matrix/hr. In some embodiments, the rate of release of active ingredient at hour 240 is at least about 1 µL/g matrix/hr. In some embodiments, the rate of release of active ingredient at hour 240 is at least about 1.5 µL/g matrix/hr. In some embodiments, the rate of release of active ingredient at hour 240 is between about 0.01 µL/g matrix/hr and about 1 µL/g matrix/hr. In some embodiments, the rate of release of active ingredient at hour 240 is between about 0.1 µL/g matrix/hr and about 1 µL/g matrix/hr. In some embodiments, the rate of release of active ingredient at hour 240 is between about 0.1 µL/g matrix/hr and about 1.5 µL/g matrix/hr. In some embodiments, the rate release of active ingredient at hour 336 is greater than zero µL/g matrix/hr. In some embodiments, the rate of release of active ingredient at hour 336 is at least about 0.01 µL/g matrix/hr. In some embodiments, the rate of release of active ingredient at hour 336 is at least about 0.1 µL/g matrix/hr. In some embodiments, the rate of release of active ingredient at hour 336 is at least about 1 µL/g matrix/hr. In some embodiments, the rate of release of active ingredient at hour 336 is between about 0.01 µL/g matrix/hr and about 1 µL/g matrix/hr. In some embodiments, the rate of release of active ingredient at hour 336 is between about 0.1 µL/g matrix/hr and about 1 µL/g matrix/hr. In some embodiments, the rate of release of active ingredient sustained between hour 1 and hour 216 is at least about 1 µL/g matrix/hr. In some embodiments, the rate of release of active ingredient sustained between hour 22 and hour 120 is at least about 1 µL/g matrix/hr. In some embodiments, the rate of release of active ingredient sustained between hour 22 and hour 120 is at least about 2 µL/g matrix/hr. In some embodiments, the rate of release of active ingredient sustained between hour 22 and hour 96 is at least about 1 µL/g matrix/hr. In some embodiments, the rate of release of active ingredient sustained between hour 22 and hour 96 is at least about 2 µL/g matrix/hr. In some embodiments, the rate of release of active ingredient sustained between hour 22 and hour 72 is at least about 1 µL/g matrix/hr. In some embodiments, the rate of release of active ingredient sustained between hour 22 and hour 72 is at least about 4 µL/g matrix/hr. In some embodiments, the rate of release of active ingredient sustained between hour 22 and hour 72 is at least about 10 µL/g matrix/hr. In some embodiments, the rate of release of active ingredient sustained between hour 22 and hour 72 is at least about 15 µL/g matrix/hr. In some embodiments, the rate of release of active ingredient sustained between hour 22 and hour 168 is at least about 5 µL/g matrix/hr. In some embodiments, the rate of release of active ingredient sustained between hour 22 and hour 168 is at least about 10 µL/g matrix/hr. In some embodiments, the release rate of the active ingredient between hour 22 and hour 120 is sustained within a range of about 0.1 and about 2 µL/g matrix/hr. In some embodiments, a release rate of the active ingredient between hour 22 and hour 120 is sustained within a range of about 1 and about 15 µL/g matrix/hr. In some embodiments, the release rates discussed above occur at ambient room temperature (approximately 23-25° C.) and at atmospheric pressure. In some embodiments, the release rates above relate to the release of ethylene inhibitor active ingredients, for example, cyclopropenes from a matrix. In a non-limiting embodiment, the controlled release parameters above relate to the release of at least one of an essential oil, a hexanal, a terpene and a terpenoid from a matrix.

Controlled release may alternatively be quantified as a percentage of the rate of release as compared to the rate of release at hour one (1), for example. In a non-limiting embodiment, the rate of release of active ingredient at hour 22 is at least 0.1% of the release rate at hour 1. In some embodiments, the rate of release of active ingredient at hour 22 is at least 1% of the release rate at hour 1. In some embodiments, the rate of release of active ingredient at hour 22 at least 2.5% of the release rate at hour 1. In some embodiments, the rate of release of active ingredient at hour 22 is at least 10% of the release rate at hour 1. In some embodiments, the release of active ingredient at hour 22 is at least 20% of the rate of release at hour 1. In some embodiments, the rate of release of active ingredient at hour 48 is at least 0.1% of the release rate at hour 1. In some embodiments, the release of active ingredient at hour 48 is at least 1% of the release rate at hour 1. In some embodiments, the rate of release of active ingredient at hour 48 is at least 2% of the release rate at hour 1. In some embodiments, the rate of release of active ingredient at hour 48 is at least 10% of the release rate at hour 1. In some embodiments, the rate of release of active ingredient at hour 72 is at least 0.1% of the release rate at hour 1. In some embodiments, the rate of release of active ingredient at hour 72 is at least 1% of the rate of release at hour 1. In some embodiments, the rate of release of active ingredient at hour 72 is at least 10% of the release rate at hour 1. In some embodiments, the rate of release of active ingredient at hour 96 is at least 0.1% of the release rate at hour 1. In some embodiments, the rate of release of active ingredient at hour 96 is at least 1% of the release rate at hour 1. In some embodiments, the rate of release of active ingredient at hour 96 is at least 5% of the release rate at hour 1. In some embodiments, the rate of release of active ingredient at hour 168 is at least 0.1% of the rate of release at hour 1. In some embodiments, the rate of release of active ingredient at hour 168 is at least 1% of the release rate at hour 1. In some embodiments, the rate of release of active ingredient at hour 168 is at least 4% of the release rate at hour 1. In some embodiments, the rate of release of active ingredient at hour 240 is at least 0.1% of the rate of release at hour 1. In some embodiments, the rate of release of active ingredient at hour 240 is at least 1% of the release rate at hour 1. In some embodiments, the rate of release of active ingredient at hour 336 is at least 0.1% of the rate of release rate at hour 1. In some embodiments, the rate of release of active ingredient at hour 336 is at least 1% of the release rate at hour 1. In some embodiments, the rate of release of active ingredient at hour 48 is at least 1% of the rate of release at hour 24. In some embodiments, the rate of release of active ingredient at hour 48 is at least 10% of the rate of release at hour 24. In some embodiments, the rate of release of active ingredient at hour 48 is at least 20% of the rate of release at hour 22. In some embodiments, the rate of release of active ingredient at hour 48 is at least 50% of the rate of release at hour 22. In some embodiments, the rate of release of active ingredient at hour 48 is at least 60% of the rate of release at hour 22. In some embodiments, the rate of release of active ingredient at hour 48 is at least 75% of the rate of release at hour 22. In some embodiments, the rate of release of active ingredient at hour 48 is at least 90% of the rate of release at hour 22. In some embodiments, the rate of release of active ingredient at hour 48 is at least 95% of the rate of release at hour 22. In some embodiments, the rate of release of active ingredient at hour 72 is at least 1% of the rate of release at hour 22. In some embodiments, the rate of release of active ingredient at hour 72 is at least 10% of the rate of release at hour 22. In some embodiments, the rate of release of active ingredient at hour 72 is at least 20% of the rate of release at hour 22. In some embodiments, the rate of release of active ingredient at hour 72 is at least 30% of the rate of release at hour 22. In some embodiments, the rate of release of active ingredient at hour 72 is at least 50% of the rate of release at hour 22. In some embodiments, the rate of release of active ingredient at hour 72 is at least 60% of the rate of release at hour 22. In a non-limiting embodiment, the rate of release of active ingredient at hour 1 is between about 10 µL/g matrix/hr and about 1500 µL/g matrix/hr. In a non-limiting embodiment, the rate of release of active ingredient at hour 1 is between about 30 µL/g matrix/hr and about 1500 µL/g matrix/hr. In a non-limiting embodiment, the rate of release of active ingredient at hour 1 is between about 100 µL/g matrix/hr and about 1500 µL/g matrix/hr. In a non-limiting embodiment, the rate of release of active ingredient at hour 1 is between about 30 µL/g matrix/hr and about 500 µL/g matrix/hr. In a non-limiting embodiment, the rate of release of active ingredient at hour 1 is between about 30 μL/g matrix/hr and about 1500 μL/g matrix/hr. In some embodiments, the release profiles discussed above occur at ambient room temperature (approximately 23-25° C.) and at atmospheric pressure. In a non-limiting embodiment, the controlled release parameters above relate to the release of cyclopropenes from a matrix. In a non-limiting embodiment, the controlled release parameters above relate to the release of at least one of an essential oil, a hexanal, a terpene and a terpenoid from a matrix.

In a non-limiting embodiment, the use of compositions described herein can be used to improve the quality and shelf life of produce. The quality and shelf life of produce may be improved, for example, by inhibiting the effects of ethylene, promoting the effects of ethylene, enhancing or maintaining shelf life, color, firmness, weight, sweetness, flavor, heat or chill temperature tolerance, resistance to microbes, fungi, or other pathogens, and/or humidity tolerance. The products and processes described herein may be applied to either pre-harvest or post-harvest produce.

"Produce" as used herein and above means agricultural and horticultural products, including pre- and post-harvest unprocessed and processed agricultural and horticultural products. Examples of produce include, but are not limited to, fruits, vegetables, flowers, ornamental plants, herbs, grains, seeds, fungi (e.g. mushrooms) and nuts. Processed produce refers to produce that has been altered by at least one mechanical, chemical, or physical process that modify the natural state or appearance of the produce. Mashed, cut, peeled, diced, squeezed, and chopped produce are non-limiting examples of processed produce. Produce also can refer to hydroponically-grown plants.

In a non-limiting embodiment, produce comprises berries. A composition comprising a delivery material and at least one active ingredient may be used, for example, to extend the shelf life of berries, including but not limited to strawberries, raspberries, blueberries, blackberries, elderberries, gooseberries, golden berries, grapes, champagne grapes, Concord grapes, red grapes, black grapes, green grapes, and globe grapes. In an embodiment, the active ingredient in the vapor phase extends the shelf life of berries by optionally slowing or inhibiting the growth of, or optionally reducing the physical, physiological, biological, or cosmetic symptoms caused by, the action of one or more viruses, fungi, microbes, bacteria, pathogens, pests, or insects on the berries.

In a non-limiting embodiment, produce comprises vegetables. Examples of vegetables that may be treated by the compositions described herein include, but are not limited to, leafy green vegetables such as lettuce (e.g., *Lactuea sativa*), spinach (*Spinaca oleracea*) and cabbage (*Brassica oleracea*; various roots such as potatoes (*Solanum tuberosum*), carrots (*Daucus*); snapbeans (*Phaseolus vulgaris*), bulbs such as onions (*Allium* sp.); herbs such as basil (*Ocimum basilicum*), oregano (*Origanum vulgare*) and dill (*Anethum graveolens*); as well as soybean (*Glycine max*), lima beans (*Phaseolus limensis*), peas (*Lathyrus* sp.), corn (*Zea mays*), broccoli (*Brassica oleracea italica*), cauliflower (*Brassica oleracea botrytis*) and asparagus (*Asparagus officinalis*).

In a non-limiting embodiment, produce comprises fruit. Examples of fruits that may be treated by the compositions described herein include, but are not limited to, tomatoes (*Lycopersicon esculentum*), apples (*Malus domestica*), bananas (*Musa sapientum*), cherries (*Prunus avium*), grapes (*Vitis vinifera*), pears (*Pyrus communis*), papaya (*Carica papaya*), mangoes (*Mangifera indica*), peaches (*Prunus persica*), apricots (*Prunus armeniaca*), nectarines (*Prunus persica nectarina*), oranges (*Citrus* sp.), lemons (*Citrus limonia*), limes (*Citrus aurantifolia*), grapefruit (*Citrus paradisi*), tangerines (*Citrus nobilis deliciosa*), kiwi (*Actinidia. chinenus*), melons such as cantaloupes (*C. cantalupensis*) and musk melons (*C. melo*), honeydew, pineapples (*Aranae comosus*), persimmon (*Diospyros* sp.) and raspberries (e.g., *Fragaria* or *Rubus ursinus*), blueberries (*Vaccinium* sp.), green beans (*Phaseolus vulgaris*), members of the genus *Cucumis* such as cucumber (*C. sativus*), starfruit, and avocados (*Persea americana*).

In a non-limiting embodiment, produce comprises cut flowers or ornamental plants. Examples of ornamental plants that may be treated by the compositions described herein include, but are not limited to, potted ornamentals and cut flowers. Potted ornamentals and cut flowers which may be treated with the methods of the present invention include azalea (*Rhododendron* spp.), hydrangea (*Macrophylla hydrangea*), hibiscus (*Hibiscus rosasanensis*), snapdragons (*Antirrhinum* sp.), poinsettia (*Euphorbia pulcherima*), cactus (e.g., *Cactaceae schlumbergera truncata*), begonias (*Begonia* sp.), roses (*Rosa* sp.), tulips (*Tulipa* sp.), daffodils (*Narcissus* sp.), petunias (*Petunia hybrida*), carnation (*Dianthus caryophyllus*), lily (e.g., *Lilium* sp.), gladiolus (*Gladiolus* sp.), Alstroemeria (*Alstroemaria brasiliensis*), anemone (e.g., *Anemone* bland), columbine (*Aquilegia* sp.), aralia (e.g., *Aralia chinesis*), aster (e.g., *Aster carolinianus*), bougainvillea (*Bougainvillea* sp.), camellia (*Camellia* sp.), bellflower (*Campanula* sp.), cockscomb (*Celosia* sp.), falsecypress (*Chamaecyparis* sp.), chrysanthemum (*Chrysanthemum* sp.), clematis (*Clematis* sp.), cyclamen (*Cyclamen* sp.), freesia (e.g., *Freesia refracta*), and orchids of the family Orchidaceae.

In a non-limiting embodiment, produce comprises plants. Examples of plants that may be treated by the compositions described herein include, but are not limited to, cotton (*Gossypium* spp.), pecans (*Carva illinoensis*), coffee (*Cofffea arabica*), and weeping fig (*Ficus benjamina*), as well as dormant seedlings such as various fruit trees including apple, ornamental plants, shrubbery, and tree seedlings. In addition, shrubbery which may be treated with the compositions described herein include, but are not limited to, privet (*Ligustrum* sp.), photinea (*Photina* sp.), holly (*Ilex* sp.), ferns of the family Polypodiaceae, schefflera (*Schefflera* sp.), aglaonema (*Aglaonema* sp.), cotoneaster (*Cotoneaster* sp.), barberry (*Berberris* sp.), waxmyrtle (*Myrica* sp.), abelia (*Abelia* sp.), acacia (*Acacia* sp.), and bromeliades of the family Bromeliaceae.

In some embodiments, one or more active ingredients may be delivered to produce using the compositions described herein. The active ingredient(s) may improve quality and/or extend shelf life of the produce. Produce aging, a process called senescence, negatively impacts the quality and shelf life of produce. Senescence occurs, in part, due to a response to ethylene gas. Ethylene activity causes wilting, erosion of flavor and aesthetics, and ultimately leads to spoilage of produce. Senescence in produce can be slowed by the use of an ethylene inhibitor. Ethylene inhibitors protect produce from ethylene damage, improving produce quality and shelf life, for example preserving texture, flavor, and aroma.

Ethylene inhibitors block the ethylene receptor sites in produce. Known ethylene inhibitors useful for embodiments disclosed herein include, but are not limited to, cyclopentadiene, cyclopropene, diazocyclopentadiene, 1-methylcyclopropene (1-MCP), 3,3-dimethycyclopropene, methylenecyclopropane, trans-cyclooctene, cis-cyclooctene, 2,5-norbornadiene, 3,3-dipentylcyclopropene, 1-pent-2-enyl-2- pentyl-cyclopropene, 1-pent-2-enyl-3,3-dipentylcyclopropene, 4-(1-cyclopropenyl)-2-methylbutan-2-ol, 1-(n-amyl)-cyclopropene, 1-(5,5,5-trifluoropentyl)-cyclopropene, and 1,2-dipentyl-cyclopropene, and derivatives thereof, for example, those disclosed in the following references, U.S. Pat. Nos. 8,603,524, 6,017,849, 6,313,068, 6,426,319, 6,444,619, 6,548,448, 6,762,153, 6,770,600. The U.S. patents mentioned in this paragraph are incorporated by reference in their entirety. In some embodiments, the active ingredient is 1-methylcyclopropene (1-MCP).

In some embodiments, the active ingredient may be a cyclopropene compound. As used herein, a cyclopropene compound, also referred to herein as a cyclopropene, is any compound with the formula

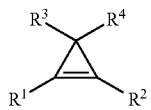

where each $R^1$, $R^2$, $R^3$ and $R^4$ is independently selected from the group consisting of H and a chemical group of the formula:

$-(L)_n-Z$.

where n is an integer from 0 to 12, each is a bivalent radical, and Z is a monovalent radical. Non-limiting examples of L groups include radicals containing one or more atoms selected from H, B, C, N, O, P, S, Si, or mixtures thereof. The atoms within an L group may be connected to each other by single bonds, double bonds, triple bonds, or mixtures thereof. Each L group may be linear, branched, cyclic, or a combination thereof. In any one R group (e.g., any one of $R^1$, $R^2$, $R^3$ and $R^4$) the total number of heteroatoms (e.g., atoms that are neither H nor C) is from 0 to 6. Independently, in any one R group the total number of non-hydrogen atoms is 50 or less. Non-limiting examples of Z groups are hydrogen, halo, cyano, nitro, nitroso, azido, chlorate, bromate, iodate, isocyanato, isocyanido, isothiocyanato, pentafluorothio, and a chemical group G, wherein G is a 3 to 14 membered ring system.

The $R^1$, $R^2$, $R^3$, and $R^4$ groups are independently selected from the suitable groups. Among the groups that are suitable for use as one or more of $R^1$, $R^2$, $R^3$, and $R^4$ are, for example, aliphatic groups, aliphatic-oxy groups, alkylphosphonato groups, cycloaliphatic groups, cycloalkylsulfonyl groups, cycloalkylamino groups, heterocyclic groups, aryl groups, heteroaryl groups, halogens, silyl groups, other groups, and mixtures and combinations thereof. Groups that are suitable for use as one or more of $R^1$, $R^2$, $R^3$, and $R^4$ may be substituted or unsubstituted.

Among the suitable $R^1$, $R^2$, $R^3$, and $R^4$ groups are, for example, aliphatic groups. Some suitable aliphatic groups include, for example, alkyl, alkenyl, and alkynyl groups. Suitable aliphatic groups may be linear, branched, cyclic, or a combination thereof. Independently, suitable aliphatic groups may be substituted or unsubstituted.

As used herein, a chemical group of interest is said to be "substituted" if one or more hydrogen atoms of the chemical group of interest is replaced by a substituent.

Also among the suitable $R^1$, $R^2$, $R^3$, and $R^4$ groups are, for example, substituted and unsubstituted heterocyclyl groups that are connected to the cyclopropene compound through an intervening oxy group, amino group, carbonyl group, or sulfonyl group; examples of such $R^1$, $R^2$, $R^3$, and $R^4$ groups are heterocyclyloxy, heterocyclylcarbonyl, diheterocyclylamino, and diheterocyclylaminosulfonyl.

Also among the suitable $R^1$, $R^2$, $R^3$, and $R^4$ groups are, for example, substituted and unsubstituted heterocyclic groups that are connected to the cyclopropene compound through an intervening oxy group, amino group, carbonyl group, sulfonyl group, thioalkyl group, or aminosulfonyl group; examples of such $R^1$, $R^2$, $R^3$, and $R^4$ groups are diheteroarylamino, heteroarylthioalkyl, and diheteroarylaminosulfonyl.

Also among the suitable $R^1$, $R^2$, $R^3$, and $R^4$ groups are, for example, hydrogen, fluoro, chloro, bromo, iodo, cyano, nitro, nitroso, azido, chlorato, bromato, iodato, isocyanato, isocyanido, isothiocyanato, pentafluorothio; acetoxy, carboethoxy, cyanato, nitrato, nitrito, perchlorato, allenyl, butylmercapto, diethylphosphonato, dimethylphenylsilyl, isoquinolyl, mercapto, naphthyl, phenoxy, phenyl, piperidino, pyridyl, quinolyl, triethylsilyl, trimethylsilyl; and substituted analogs thereof.

As used herein, the chemical group Gi is a 3 to 14 membered ring system. Ring systems suitable as chemical group G may be substituted or unsubstituted; they may be aromatic (including, for example, phenyl and naphthyl) or aliphatic (including unsaturated aliphatic, partially saturated aliphatic, or saturated aliphatic); and they may be carbocyclic or heterocyclic. Among heterocyclic G groups, some suitable heteroatoms are, for example, nitrogen, sulfur, oxygen, and combinations thereof. Ring systems suitable as chemical group G may be monocyclic, bicyclic, tricyclic, polycyclic, spiro, or fused; among suitable chemical group G ring systems that are bicyclic, tricyclic, or fused, the various rings in a single chemical group G may be all the same type or may be of two or more types (for example, an aromatic ring may be fused with an aliphatic ring).

In one embodiment, one or more of $R^1$, $R^2$, $R^3$, and $R^4$ is hydrogen or $(C_1-C_{10})$ alkyl. In another embodiment, each of $R^1$, $R^2$, $R^3$, and $R^4$ is hydrogen or $(C_1-C_8)$ alkyl. In another embodiment, each of $R^1$, $R^2$, $R^3$, and $R^4$ is hydrogen or $(C_1-C_4)$ alkyl. In another embodiment, each of $R^1$, $R^2$, $R^3$, and $R^4$ is hydrogen or methyl. In another embodiment, $R^1$ is $(C_1-C_4)$ alkyl and each of $R^2$, $R^3$, and $R^4$ is hydrogen. In another embodiment, $R^1$ is methyl and each of $R^2$, $R^3$, and $R^4$ is hydrogen, and the cyclopropene compound is known herein as 1-methylcyclopropene or "1-MCP."

Other ethylene inhibitors useful for embodiments disclosed herein may also include: phosphonic acid compounds and derivatives thereof, for example, those disclosed in U.S. Pat. Nos. 3,879,188 and 6,562,758; diazocyclopentadiene and derivatives thereof, for example, those disclosed in U.S. Pat. No. 5,100,462; cyclopropene, [1.1.1]propellane, and derivatives thereof, for example, those disclosed in U.S. Pat. No. 5,518,988; and silver thiosulfate and derivatives thereof. The U.S. patents mentioned in this paragraph are incorporated by reference in their entirety.

In some embodiments, cyclopropenes comprise organic compounds containing any unsubstituted or substituted three-carbon cyclic ring with an unsaturated or olefinic bond (of the root formula $C_3H_x$), or any organic compound containing a cyclopropene moiety. The simplest example of this class of molecules is cyclopropene, the simplest cycloalkene. The cyclopropene unit has a triangular structure. Cyclopropenes also include cyclopropene derivatives, such as 1-methylcyclopropene (1-MCP; molecular formula $C_4H_6$), or other cyclopropene derivatives (including, but not limited to borirenes, phosphirenes, and silirenes, which are boron-, phosphorus-, and silicon-substituted cyclopropenes respectively).

Other active ingredients useful for embodiments disclosed herein may include, for example, inhibitors of ethylene biosynthesis, including aminoethoxyvinylglycine, alpha-amino isobutyric acid, (aminooxy) acetic acid, methoxyvinylglycine, salicylic acid, acetylsalicylic acid, L-trans-2-amino-4-(2-acetamidoethoxy)-3-butenoic acid, among others, as disclosed in U.S. Pat. Nos. 8,603,524 and 6,153,559. Additional preservatives useful for embodiments disclosed herein may include agents that prevent the ripening of fruits and vegetables or the browning of cut fruits and vegetables, including inhibitors of fruit and vegetable membrane degrading phospholipases. Inhibitors of fruit and vegetable membrane degrading phospholipases may include hexanal, lysophosphatidylethanolamine, and their derivatives. Inhibitors of fruit and vegetable membrane degrading phospholipases may also include, for example, cytokines, such as N-(2-chloro-4-pyrridinyl)N-phenyl urea, as disclosed in U.S. Pat. No. 8,603,524. The U.S. patents mentioned in this paragraph are incorporated by reference in their entirety.

In a non-limiting embodiment, the active ingredient includes additional volatile plant hormones known to effect plant biological processes for the purpose of improving crop yield, quality, taste, or extending produce shelf-life, including but not limited to methyl salicylate, methyl jasmonate, (Z)-3 hexenyl acetate, (z)-3-hexenal, (E)-beta-farnesene, (E)-beta-caryophyllene, (E)-beta-ocimene, Linalool, (E)-4,8-dimethyl-1,3,7-nonatriene, and (E,E)-4,8,12-trimethyl-1,3,7,11-tridecatetraene.

In some embodiments, the active ingredient is another preservative for edible substances or foods to extend their freshness, shelf life, or suitability for consumption by living organisms. These preservatives may include either natural or synthetic compositions that have anti-bacterial, anti-fungal, anti-viral, or other preventative or curative properties, such as having insecticidal and insect repellent properties. In a non-limiting embodiment, the preservatives include essential oils or botanical extracts that have anti-bacterial, anti-fungal, anti-algae, anti-viral, mold inhibitors, or other preventative or curative properties such as having insecticidal and insect repellent properties. In a non-limiting embodiment, the preservatives may include natural or synthetic compositions with anti-oxidant properties. These preservatives may be suitable for applications such as the packaging and preservation of perishable substances such as produce, meat products, dairy products, edible substances, non-edible substances, and other perishable substances.

Other active ingredients that can be incorporated into the matrices of the present application include, but are not limited to, limonene, proteases, xylanases, alpha-amylases, cellulases, β-glucanases, α-galactosidases, beta-mannases, polygalacturonases, arabinases, galactanases, arabinofuranosidases, feroyl esterases, and glucosidases, proteinase inhibitors, cryptoxanthin and derrivatives thereof, oregano oil and caprylic acid, aflatoxin B1, ochratoxin A (OTA), zearalenone, mycophenolic acid, cyclopiazonic acid, Fumonisin B 1, T-2 and patulin, vitamins A, C, and E, beta-carotene, hydroxylase phytases, lutein, zeaxanthin, beta-carotene, retinoids, retinal, retinaldehyde, and meso-zeaxanthin, extracts of *Lactobacillus*, for example *lactobacillus Johnsonii* D115, alkylpyridinium, tetra-alkylammonium, and alkylalicyclic ammonium salts, ferulic acid esterase, fumaric acid, citric acid, gallic acid, sorbic acid, succinic acid, and tannic acid, propionic acid, acetic acid, benzoic acid, sorbic acid rosmarinic acid, green or black tea extracts, mint extracts, ednoperoxides, gallic acid, derivative of gallic acid, gallotannins and hydrolysable tannins, carvacrol, thymol, lecithins, lycopene, extracts of physalis alkekengi, amylase, for example, α-amylase, ellulase, xylanase, beta-glucanase, pectinase, mannanase and alpha-galactosidase, sauce oil, olive oil, soybean oil, rapeseed oil, salad oil, and medium chain triglycerides, benzoic acid, safflower oil, chia seed mucilage, tocopherols, tocotrienol, organic and inorganic selenium compounds, the surfactants include propylene glycol, lecithin, lysolecithin, and mono- and diglycerides; synthetic and natural antioxidants, for example, TBHQ, citric acid, BHT, BHA, tocopherols, rosemary extracts, and fenugreek extracts.

In a non-limiting embodiment, the active ingredient is a compound or multiple compounds with efficacy in applications as an antiviral, antifungal, antimicrobial, antibacterial, antipathogenic, biocidal, pesticidal, or biopesticidal agent or agent(s). The active ingredient may slow or inhibit the growth of one or more viruses, fungi, microbes, bacteria, pathogens, pests, or insects. The active ingredient may reduce the spore count of produce by slowing or inhibiting the growth of one or more viruses, fungi, microbes, bacteria, pathogens, pests, or insects. The active ingredient may reduce the physical, physiological, biological, or cosmetic symptoms caused by the action of one or more viruses, fungi, microbes, bacteria, pathogens, pests, or insects. The active ingredient may extend the shelf life of produce by slowing or inhibiting the growth of, or optionally reducing the physical, physiological, biological, or cosmetic symptoms caused by, the action of one or more viruses, fungi, microbes, bacteria, pathogens, pests, or insects on the produce.

In a non-limiting embodiment, an active ingredient comprises an essential oil. In some embodiments, essential oils have detectable concentrations of terpenes and/or terpenoids that provide antibacterial and/or antifungal properties. In a non-limiting embodiment, an active ingredient is a terpene or a terpenoid. Non-limiting examples of terpenes include acyclic and cyclic terpenes, monoterpenes, diterpenes, oligoterpenes, and polyterpenes with any degree of substitution In a non-limiting embodiment, an active ingredient is an essential oil comprising an extract from, for example, an herb, a plant, a trees, or a shrub. In a non-limiting embodiment, an essential oil comprises at least one of a terpene, a terpenoid, a phenol, or a phenolic compounds. Non-limiting examples of essential oils and essential oil extracts include, thymol, curcumin, carvacrol, bay leaf oil, lemongrass oil, clove oil, peppermint oil, *acacia* oil, eucalyptol, limonene, eugenol, menthol, farnesol, carvone, hexanal, thyme oil, dill oil, oregano oil, neem oil, orange peel oil, lemon peel oil, rosemary oil, or cumin seed extract. In a non-limiting embodiment, an active ingredient is at least one of oregano oil, thyme oil, hexanal, carvacrol, and thymol. In a non-limiting embodiment, compositions comprise one or more terpenes and/or terpenoids. For example, in some embodiments, the composition comprises an active ingredient selected from the group consisting of oregano oil, thyme oil, hexanal, carvacrol, and thymol, and combinations thereof. A person skilled in the art will appreciate other essential oils and/or terpenes and terpenoids that may be incorporated into the compositions described herein.

In a non-limiting embodiment, an active ingredient comprises hydrogen peroxide in any concentration from 0.001%-100% by weight. In a non-limiting embodiment, an active ingredient comprises phenol.

In some embodiments, the active ingredient is an ethylene production stimulating agent. Ethylene generating agents, such as ethephon, may be used to promote ripening, fruit coloring, and other known effects of ethylene.

Active ingredients, including ethylene inhibiting active ingredients, compounds that inhibit or promote the ethylene response in produce, compounds that inhibit ethylene biosynthesis, phospholipase inhibitors, other compounds known to promote membrane or plant cell wall integrity, and other various preservatives may be used alone, or in combinations of two or more, in the compositions and structures described herein.

In a non-limiting embodiment, the composition comprises a delivery material. The delivery material may be used to store and/or release the active ingredient. Many of the above-described active ingredients may be in the vapor phase or gaseous, including cyclopropenes such as 1-MCP. Complexes may be formed between the above-described active ingredients and a delivery material to overcome instability, handling, and shelf-life issues, among others. 1-MCP, for example, is a gas at room temperature and room pressure, and may be stabilized by complexation with a delivery material. In another example, the terpenoid carvacrol is a liquid at ambient room temperature and atmospheric pressure with a boiling point >250° C. However, described herein, carvacrol may be stored in a solid material and delivered in the vapor phase using a solid carrier. In some embodiments, the delivery material is a solid having a high surface area, as described in more detail herein. In some embodiments, the delivery material is porous. In some embodiments, the delivery material is nanoporous. Non-limiting examples of porous materials are macroporous, mesoporous, and microporous materials. In some embodiments, the porous and/or nanoporous delivery material comprises one or more of macropores, mesopores, and micropores. In a non-limiting embodiment, macropores are pores having a diameter greater than 50 nm. For example, macropores may have diameters of between 50 and 1000 nm. In a non-limiting embodiment, mesopores are pores having a diameter between 2 nm and 50 nm. In a non-limiting embodiment, micropores are pores having a diameter of less than 2 nm. For example, micropores may have diameters of between 0.2 and 2 nm. This comprising the delivery material and the active ingredient can be transported, for example, in hermetically sealed packing.

In some embodiments, the active ingredient (e.g., shown generally as active ingredient 20), may be stabilized by, associated with, or impregnated in a delivery material by: i) covalent binding, dative binding, electrostatic binding, van der Waals binding, or chelative binding of an appropriate active ingredient at or within a moiety or chemically functionalized site immobilized on the internal and/or external chemical surface of the delivery material, ii) encapsulation of the active ingredient (the "guest") using a chemical functionalization ("the host" in "host-guest" chemistry) that mimics an enzymatic site, "lock-and-key" structure, or other chelative interaction in which the chemical structure of the host holds a specific affinity for the chemical structure of the guest, iii) nonspecific physicochemical interactions with the inert internal and/or external chemical surface of the delivery material, in such a way as to manipulate adsorption/desorption equilibrium, or iv) a combination of various forms of adsorption/desorption equilibrium manipulations with optionally one or more of the following covalent binding, dative binding, electrostatic binding, van der Waals binding, chelative binding, encapsulation, complexation, host-guest chemistry, lock-and-key chemistry, and adsorption/desorption equilibrium manipulations. Unique combinations of chemical interactions and adsorption/desorption manipulations leading to unique loading and release parameters may be achieved by varying the concentration and chemical identity of immobilized functional groups in the delivery material, varying the hydrophobicity or hydrophilicity of the inert internal and/or external surface of the delivery material, varying the crystallinity of the delivery material, varying the pore dimensions and volume of the delivery material, and varying the total chemical surface area of the material.

In a non-limiting embodiment, the delivery material is a carbon material, also referred to herein as a carbon based delivery material. A carbon material may be of various geometries and formations including, but not limited to, macroporous, mesoporous, and microporous carbon materials, monolithic carbon materials, extruded or pelletized carbon materials, steam-activated carbon materials, oxidized carbon materials, or acid- or base-treated carbon materials. FIG. 1 shows a cross-section of an illustrative embodiment of a delivery material 100. In a non-limiting embodiment, delivery material 100 is a carbon based delivery material. In the illustrative embodiment of FIG. 1, delivery material 100 contains at least one macropore 10, at least one mesopore 11, and at least one micropore 12. In other embodiments, a porous delivery material 100 contains only either one or both of macropores 10 and mesopores 11. In yet other embodiments, a porous material does not contain internal micropores or mesopores, limiting the porosity to the macropores 10.

In some embodiments, a carbon delivery material may be a commercially available carbon material which is offered in a wide array of states with respect to surface areas, porosities, degrees of surface functionalization, degree of oxidation, acidity, basicity, and other chemical and physicochemical features. As such, in some embodiments, the following commercial carbon materials may be used as delivery material for the compositions matrices described herein: carbon black (e.g. such as generally indicated by CAS No.: 1333-86-4) or lampblack carbon; activated carbon or activated charcoal (e.g. such as generally indicated by CAS No.: 7440-44-0); carbon in powder, granule, film, or extrudate form; optionally, carbon mixed with one or more adjuvants or diluents; carbon sold as DARCO® carbon (Sigma-Aldrich), ELORIT® (Cabot Corporation), HYDRODARCO® (Cabot Corporation), NORIT® carbon (Cabot Corporation), PETRODARCO® carbon (Cabot Corporation), BENTONORIT® carbon (Cabot Europe), SORBONORIT® carbon (Cabot Corporation), and the like; carbon sold as OXPURE™ carbon (Oxbow Activated Carbon); carbon derived from coconut, coal, wood, anthracite, or sand (Carbon Activated Corporation) and the like; reactivated carbon; ash, soot, char, charcoal, coal, or coke; vitreous carbon; glassy carbon; bone charcoal. Each of those carbons, whether commercially acquired or manufactured by hand as known in the art can be further modified to form other delivery materials 100 by operations including, but not limited to heat treating materials, oxidation, and/or acid- or base-treatment to arrive at other delivery materials and matrices described herein. Therefore, any carbons derived from: carbon black or lampblack carbon, activated carbon or activated charcoal, carbon in powder, granule, film, or extrudate form, any carbon sold as DARCO®, ELORIT®, HYDRODARCO®, NORIT®, PETRODARCO®, BENTONORIT®, SORBONORIT®, OXPURE™, reactivated carbon, ash, soot, char, charcoal, coal, or coke, vitreous carbon, glassy carbon, or bone charcoal through the modification of the parent carbon with, for example, adsorption-modifying functionalities, one or more acids, bases, oxidants, hydrolyzing reagents, or a combination thereof is within the scope of this invention to form the compositions described herein.

Without limiting the delivery materials herein to any particular theory or mechanism, it is contemplated that the delivery materials described herein combine chemical interactions between the delivery material and active ingredient with an adsorption/desorption equilibrium at the material surface. Characteristics of the delivery material can be modified to provide deliberately accelerated or deliberately decelerated release of the active ingredient as compared to the release rate of an active ingredient from a matrix comprising an unmodified delivery material. For example, hydrolyzing or oxidizing the hydrophobic carbon surface with adsorption-modifying functionalities to increase the polarity of the carbon surface can modify the hydrophobicity or hydrophilicity of a carbon material. Without limiting the action of delivery material modification to any particular theory or mechanism, it is contemplated that the van der Waals interactions between a hydrophobic active ingredient and a modified, polar or hydrophilic carbon material is thus altered from the interactions between the active ingredient and the purely hydrophobic carbon, resulting in an accelerated rate of release. An advantage of modifiable delivery materials as disclosed herein is that the total rate of release of an active ingredient is unique to the chemical and physicochemical composition of the delivery material.

Figure 3:
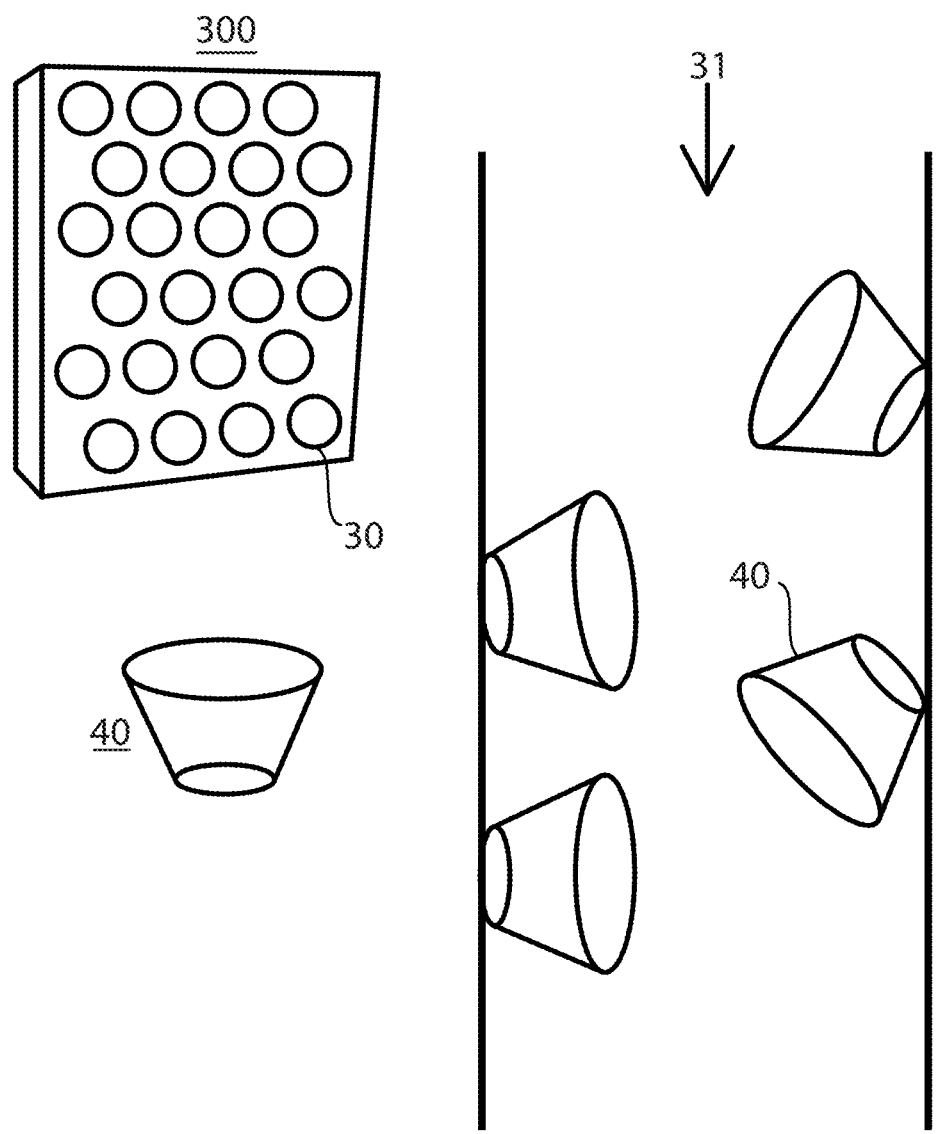
FIG. 3 is a perspective view of a delivery material in accordance with a non-limiting embodiment.

FIG. 3 illustrates a non-limiting embodiment of a portion of another delivery material 300. Delivery material 300 comprises a plurality of pores 30. While pores 30 are shown in FIG. 3 to have a regular distribution in delivery material 300, regularity in pore distribution is not necessary. Delivery material 300 may have pores 30 that are different sizes and/or are irregularly distributed in delivery material 300. Delivery material 300 optionally comprises one or more complexing agents 40. FIG. 3 shows an example of an internal view of a pore 31 of delivery material 300 of delivery material 300 that comprises complexing agents 40.

In some embodiments, the delivery material may be a silicate material, also referred to herein as a silica based material. In some embodiments, a delivery material comprising a silicate material comprises silica. Silicate materials are available from commercial sources in a wide array of states with respect to surface areas, porosities, degrees of surface functionalization, acidity, basicity, and other chemical and physicochemical features. Commercial silicates may be in the form of powder, granules, nanoscale particles, and porous particles. In some embodiments, delivery material 300 comprises silica gel. In some embodiments, delivery material 300 comprises one or more of macropores, mesopores, and micropores. In some embodiments, delivery material 300 comprises one or more of macroporous, mesoporous, and microporous silica. In some embodiments delivery material 300 comprises precipitated, crystalline-free silica gel (such as generally indicated by CAS No.: 112926-00-8). In some embodiments, material 300 comprises amorphous, fumed (crystalline free) silica (such as generally indicated by CAS No. 112945-52-5). In some embodiments, material 300 comprises mesostructured amorphous silica (such as generally indicated by CAS No. 7631-86-9). In a non-limiting embodiment, a silicate delivery material comprises one or more of a polysiloxane, polyalkylsiloxane, and polyalkylenesiloxane materials; a polyoxoalkyelene material, metal oxide, and a zeolite.

In a non-limiting embodiment, the delivery material 300 may further comprise a complexing agent 40. In a non-limiting embodiment, the delivery material 300 comprises a porous material and a complexing agent 40, the complexing agent embedded into at least one pore 31 of the porous material. Such a complexing agent may be embedded into the delivery material via de novo synthesis, post-synthetic grafting, intercalation of the complexing agent into the macrostructure, or other techniques yielding immobilized complexing agents on the internal and/or external chemical surface of the delivery material.

Without wishing to be bound by theory, complexing agents 40 may be used to further reduce and/or eliminate instability, handling, low vapor pressure of active ingredients, and/or shelf-life issues of volatile active ingredients. In some embodiments, a plurality of pores 30 may optionally be modified with complexing agents to produce pore 31 of delivery material 300. In a non-limiting embodiment, a complexing agent is a compound that has a lock and key structure, similar to an enzyme, whereby a substrate selectively fits into the encapsulation site. The interaction between an active ingredient and a complexing agent may sometimes be characterized as "host-guest" chemistry, in which the active ingredient is the guest and the complexing agent is the host. The complexing agent may be α-cyclodextrin, β-cyclodextrin, or γ-cyclodextrin. In other embodiments, complexing agents may be mono-, oligo-, or poly-carbohydrates, porphyrins, and phosphazenes. In other embodiments, the complexing agent may be selected from one or more of the following groups of compounds: cyclodextrins, substituted and/or modified cyclodextrins, crown ethers, substituted and/or modified crown ethers, calixarenes, and substituted and/or modified calixarenes. In a non-limiting embodiment, a delivery material comprises more than one type of complexing agent. In a non-limiting embodiment, changing surface area and/or pore size of the delivery material with increasing incorporation of complexing agent, results in a unique storage capacity and rate of release per combination of delivery material and active ingredient. Referring back to FIG. 3, it should be noted that pore 31 of FIG. 3 is illustrative only, and that complexing agents 40 are not required to be present in the delivery materials described herein.

In a non-limiting embodiment, the delivery material comprises a complexing agent in a concentration of 0-50 mol % of the delivery material (as measured determined from the empirical formula units in the ratio moles of complexing agent:moies of unmodified delivery material). In a non-limiting embodiment, the complexing agent is cyclodextrin in a concentration of 0-20 mol % of the delivery material (as measured determined from the empirical formula units in the ratio moles of complexing agent:moles of unmodified delivery material, for example moles of $SiO_2$). In a non-limiting embodiment the complexing agent is α-cyclodextrin in a concentration of 0-20 mol % of the delivery material. In a non-limiting embodiment, the complexing agent is β-cyclodextrin in a concentration of 0-20 mol % of the delivery material. In a non-limiting embodiment, the complexing agent is substituted β-cyclodextrin in a concentration of 0-20 mol % of the delivery material. In a non-limiting embodiment, the complexing agent is silyl-CD 44 (FIG. 4) in a concentration of 0-20 mol % of the delivery material. In a non-limiting embodiment, the complexing agent is allyl-CD 45 (FIG. 5) in a concentration of 0-20 mol % of the delivery material. In a non-limiting embodiment, the complexing agent at 0-20 moil % concentration in the delivery material is embedded in a porous silicate material, the complexing agent together forming the delivery material. In a non-limiting embodiment, the porous silicate material is a templated siliceous material approaching the composition $SiO_2$.

In a non-limiting embodiment, the porous silicate material is also a high surface area material.

In a non-limiting embodiment, a delivery material comprises one of a complexing agent and an adsorption-modifying functionality. In a non-limiting embodiment, a delivery material comprises a complexing agent and, optionally an adsorption-modifying functionality. In a non-limiting embodiment, a delivery material comprises an adsorption-modifying functionality and, optionally a complexing agent. An adsorption-modifying functionality is any chemical functionality that modifies the interaction between an active ingredient and a delivery material, such that the introduction of the chemical functionality (a) increases or decreases the storage capacity of a delivery material (with respect to the storage capacity of the delivery material absent that chemical functionality) for an active ingredient, or (b) accelerates or decelerates the release of an active ingredient from a delivery material (with respect to the release of active ingredient from the delivery material absent that chemical functionality). Such modifiable interactions include, but are not limited to, covalent binding, dative binding, electrostatic binding, van der Waals binding, or chelative binding of an appropriate active ingredient. The interaction between an active ingredient and a matrix comprising a delivery material modified by an adsorption-modifying functionality or a complexing agent may sometimes be referred to herein as ensemble dynamic interactions. Without limiting the compositions herein to a particular theory or mechanism, it is contemplated that ensemble dynamic interactions between the delivery material and the active ingredient allow the (e.g. modified) delivery materials herein to load active ingredient in excess of what would be expected for lock and key or host-guest interactions. Turning to adsorption-modifying functionalities, an example of an adsorption-modifying functionality is one or more hydrophobic groups, for instance trimethylsilyl-functionalities, incorporated in a delivery material via grafting. While the compositions here are not limited to any particular theory or mechanism, it is contemplated that adsorption-modifying functionalities comprising hydrophobic or aliphatic groups in the pore space of the delivery material promote van der Waals interactions with hydrophobic active ingredients to help stabilize the hydrophobic active ingredients by via ensemble dynamic interactions. In a non-limiting embodiment, a delivery material comprises more than one type of adsorption-modifying functionality.

Non-limiting examples of delivery materials and their methods of manufacture are provided below:

A silicate delivery material absent a complexing agent may be prepared in the following manner. A typical synthetic procedure requires a molar ratio of 1.00 silica source to 114 $H_2O$ to 8.0 M $NH_4OH$ (35 wt % in water) to 0.12 cetyltrimethylammonium bromide (CTAB). Tetraethoxysilane (TEOS) and is used as a silica source. CTAB (0.84 g, 2.3 mmol) is added to a solution of $NH_4OH$ (17.72 g, 30 wt %, 0.15 mmol) and deionized water (33.4 g, 1.86 mol), and the solution stirred for 30 minutes in a closed flask. The weight equivalent (4 g) of 19.2 mmols of TEOS is added slowly to the base/surfactant solution with gentle stirring. After stirring for 30 minutes, the solutions are aged at 80° C. for 4 days in a closed flask. The white solid is collected by filtration, washed with water, and dried in an oven at 100° C. Following this procedure, extracting the CTAB surfactant can further modify the surface area and pore size. In such an extraction, 5 g of as-synthesized material is suspended in 170 mL methanol with 30 mL concentrated hydrochloric acid and refluxed with stirring for 48 hours. After extraction, the sample is collected via filtration, washed with methanol or a 0.05 M sodium bicarbonate solution, and dried in an oven at 100° C. The delivery material prepared by this method is sometimes referred to herein as "Delivery Material A".

In another embodiment, a delivery material can be prepared in the following manner. A purely siliceous, periodic, high-surface area porous material is prepared according to the procedure described for Delivery Material A with no complexing agent embedded within it. The surfactant (CTAB) is then removed from the material via calcination at 600° C. for 18 hours to yield a periodic, porous, high-surface-area delivery material. The delivery material prepared by this method is sometimes referred to herein as "Delivery Material B".

Alternatively, a delivery material comprising a complexing agent 40, the complexing agent 40 being β-cyclodextrin (for example) can be prepared in the following manner. A periodic, high-surface area porous material can be prepared from β-cyclodextrin depending on the mol % of content of complexing agent (in this case, β-cyclodextrin) desired. As a non-limiting example, in a sample containing 19.2 mmol Si (obtained solely from TEOS) and optionally β-cyclodextrin, the content β-cyclodextrin can vary, for example, by including 0-20 wt % of β-cyclodextrin. A solution of $NH_4OH$ (17.72 g, 30 wt %, 0.15 mmol), deionized water (33.4 g, 1.86 mol), and β-cyclodextrin (0.4 g, 10 wt %) is prepared and stirred for 30 minutes in a closed flask. TEOS (4 g, 19.2 mmol) is added slowly to the base/surfactant solution with gentle stirring. After stirring for 30 min, the solutions are aged at 80° C. for 4 days in a closed flask. The white solid is collected by filtration, washed with water, and dried in an oven at 100° C. Following this procedure, extracting the CTAB surfactant can further modify the surface area and pore size. In such an extraction, 5 g of as-synthesized material is suspended in 170 mL methanol with 30 mL concentrated hydrochloric acid and refluxed with stirring for 48 hours. After extraction, the sample is collected via filtration, washed with methanol or a 0.05 M sodium bicarbonate solution, and dried in an oven at 100° C.

In another embodiment, a delivery material that comprises a complexing agent 40 can be prepared according to the procedure described for Delivery Material A. A purely siliceous, periodic, high-surface area porous material is prepared absent a complexing agent according to the previous procedure. The surfactant (CTAB) is then extracted from the pores of the material in the manner described previously. A quantity, of this material is suspended in water in which a complexing agent has been dissolved at a desired concentration. As a non-limiting example, 10 g, of the purely siliceous material may be suspended in 2 L of water, in which 1 g of complexing agent β-cyclodextrin (10 wt %) has been dissolved. This solution is then refluxed for 18 hours, during which time the complexing agent diffuses into the pores of the silica material and grafts to the surface. The solid is then isolated by filtration and dried in an oven at 100° C. Complexing agents as described herein may be incorporated into porous commercial silica materials in the same fashion. As one skilled in the art will appreciate, other complexing agents, including but not limited to other cyclodextrins. For example, α-cyclodextrin and γ-cyclodextrin can be substituted in the above methods to form matrices described herein. Some cyclodextrins are available, for example, from Wacker Biochem Inc., Adrian, Mich. as well as other vendors.

Figure 4:
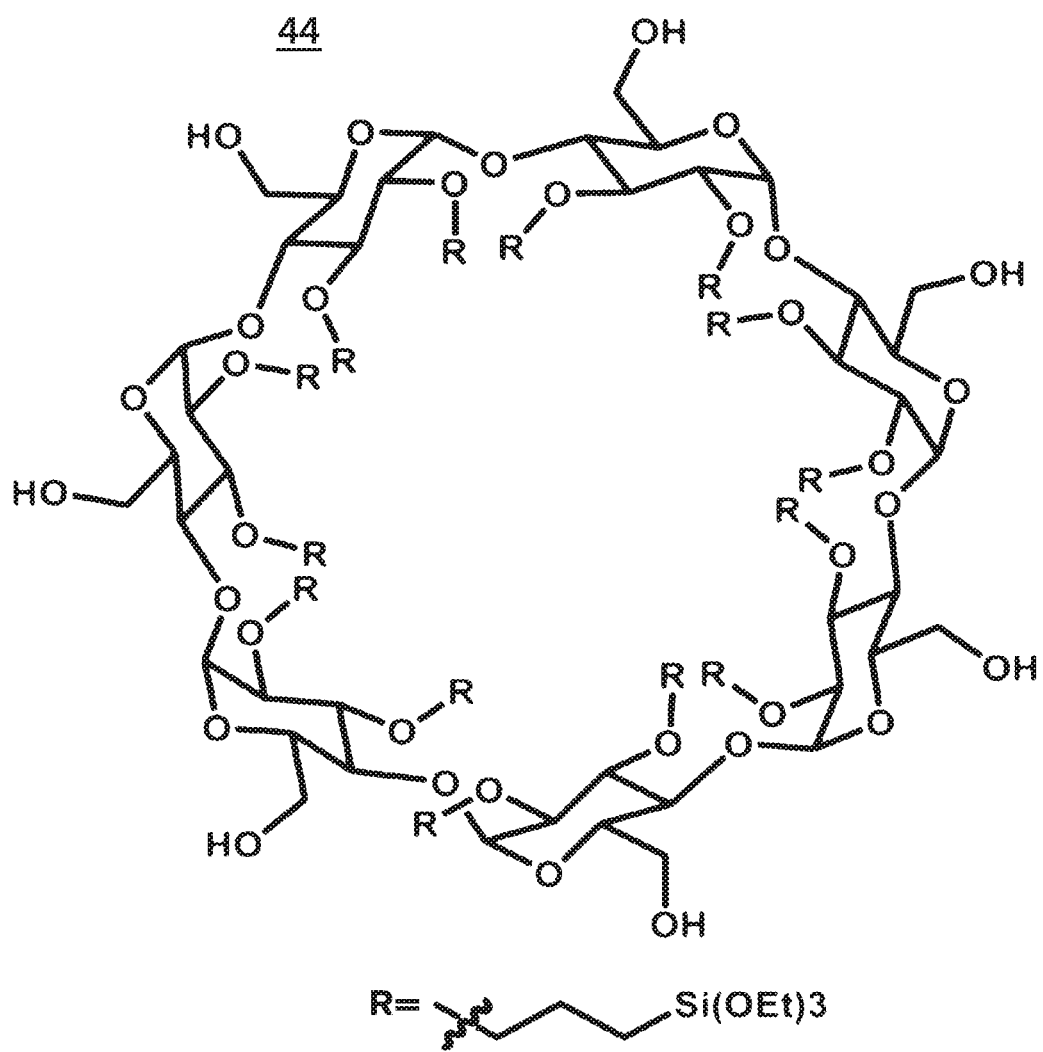
FIG. 4 is a schematic illustration of a complexing agent in accordance with a non-limiting an embodiment.

In another embodiment, a delivery material comprising a complexing agent, the complexing agent being a silyl-modified β-cyclodextrin ("silyl-CD" 44, as illustrated in FIG. 4) may be prepared by the following method, illustrated by FIG. 4. Tetradecakis-2,6-O-allylcycloheptaamylose is prepared from commercial B-cyclodextrin (Alfa-Aesar, 3 g, 2.3 mmole) allowed to react with an excess of allyl bromide, 21 g (0.31 mole), and with barium oxide, 15 g (0.09 mole), barium hydroxide octahydrate 15 g (0.09 mole) in dimethyl sulfoxide, 75 ml and dimethyl formamide, 75 ml, at room temperature for 48 hr under nitrogen. The reaction mixture is cooled, and 60 ml of ammonium hydroxide is added slowly with continual stirring. After 20 minutes this mixture is added to 500 ml of chloroform and the inorganic salts are completely precipitated by addition of hexanes. The organic phase is washed with water 5×50 ml, dried over sodium sulfate; the solvent stripped under vacuum, and the resulting oil applied to a silica gel column, and eluted with ethyl acetate:chloroform (100% CHCl, 20% 40%, 60%; v/v). This produced 3.2 g of a white solid, 71% yield. Tetradecakis-2,6-di-O-(3-triethoxypropyl)cycloheptaamylose (hereafter referred to as "silyl-CD" 44) is prepared by first dissolving 2.57 g of tetradecakis-2,6-O-allylcycloheptaamylose in 50 mL of anhydrous THF and adding to this mixture 51.4 mL of triethoxysilane. To this mixture is added 2 mg of $Cp_2$ $PtCl_2$ catalyst in a 1 mg/mL solution in THF. The resulting solution is refluxed under nitrogen for 72 hours, and silyl-CD 44 is recovered by concentrating the reaction mixture in vacuo until no triethoxysilane remains. The resulting colorless oil silyl-CD 44 (illustrated in FIG. 4) is recovered in quantitative yield and used directly without further purification.

A periodic, high-surface area porous material can then be prepared from silyl-CD in the following a manner depending on the mol % of content of silyl-CD desired. A typical synthetic procedure requires a molar ratio of 1.00 silica source to 114 $H_2O$ to 8.0 M $NH_4OH$ (35 wt % in water) to 0.12 cetyltrimethylammonium bromide (CTAB). Tetraethoxysilane and silyl-CD are used as silica sources. Delivery materials are prepared with TEOS to silyl-CD in Si mole ratios of 1/0, 0.9/0.1, 0.75/0.25, 0.50/0.50, and 0.25/0.75. CTAB (0.84 g, 2.3 mmol) is added to a solution of $NH_4OH$ (17.72 g, 30 wt %, 0.15 mmol) and deionized water (33.4 g, 1.86 mol), and the solution stirred for 30 minutes in a closed flask. A mixture of TEOS and silyl-CD corresponding to the appropriate mole fraction, with a total of 19.2 mmol of Si (for examples, 3 g (14.4 mmol) of TEOS and 1.47 g (4.8 mmol) of silyl-CD for 0.75/0.25 ratio) is added slowly to the base/surfactant solution with gentle stirring. After stirring for 30 minutes, the solutions are aged at 80° C. for 4 days in a closed flask. The white solid is collected by filtration, washed with water, and dried in an oven at 100° C. Following this procedure, the surface area and pore size can be further modified by extracting the CTAB surfactant. In such an extraction, 5 g of as-synthesized material is suspended in 170 mL methanol with 30 mL concentrated hydrochloric acid and refluxed with stirring for 48 hours. After extraction, the sample is collected via filtration, washed with methanol or a 0.05 M sodium bicarbonate solution, and dried in an oven at 100° C. The delivery material prepared by this method is sometimes referred to herein as "Delivery Material C".

Figure 5:
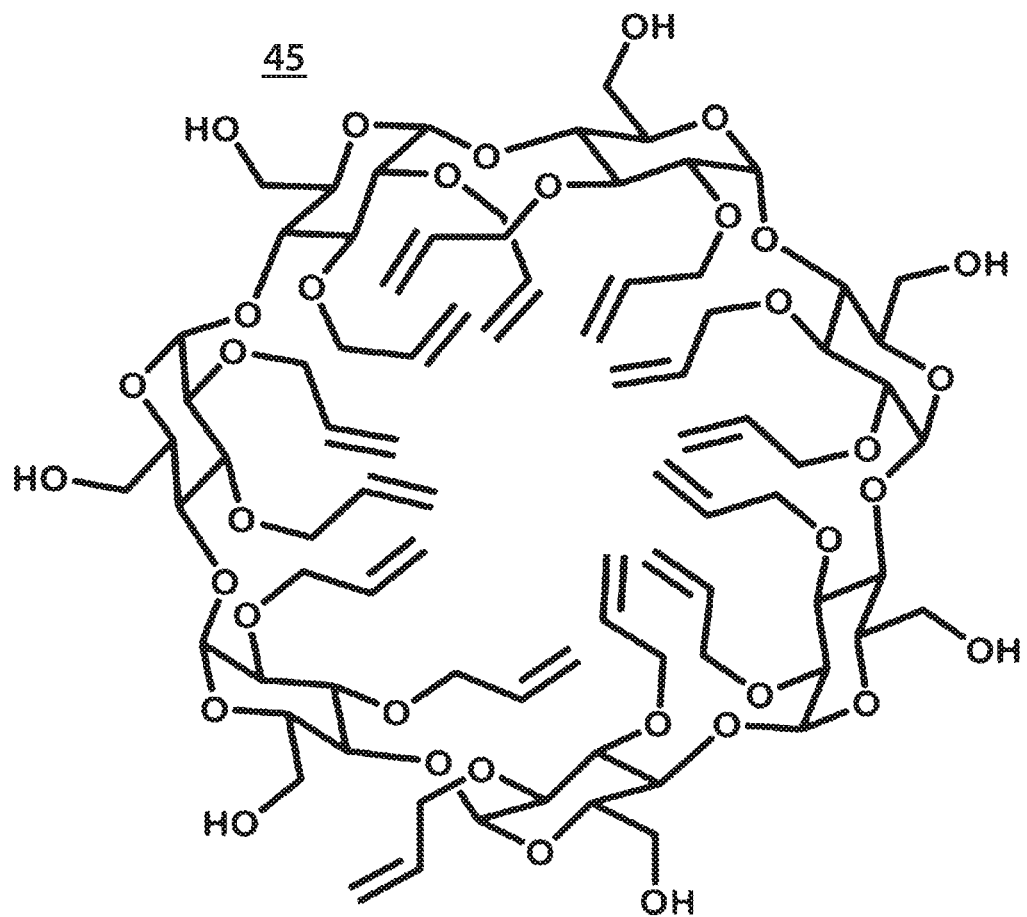
FIG. 5 is schematic illustration of a complexing agent in accordance with a non-limiting embodiment.

In another embodiment, a delivery material that comprises a complexing agent, the complexing agent being an allyl-modified β-cyclodextrin ("allyl-CD" 45 as illustrated in FIG. 5), can be prepared by the following method. Tetradecakis-2,6-O-allylcycloheptaamylose is prepared from commercial β-cyclodextrin by stirring 5.68 g (5 mmol) β-cyclodextrin in 300 mL of a 1:1 mixture of DMF and DMSO with 29.25 mL (350 mmol) allyl bromide, 17.1 g of barium hydroxide (160 mmol) and 15.3 g barium oxide (160 mmol) for 48 hours at room temperature. When the reaction is completed, 100 mL of aqueous $NH_4OH$ is added and stirred for 30 mins with the reaction mixture. To the mixture is added 300 mL of $CHCl_3$ and 100 mL of hexanes. The aqueous phase is separated from the organic phase and the organic phase washed 4× with 250 mL DI water and 2× with 250 mL saturated brine. The organic phase is dried over sodium sulfate for 10 mins and concentrated in vacuo to yield a pale yellow oil. The oil is further purified by column chromatography on a silica column, first flushing with pure $CHCl_3$ and then collecting the pure tetradecakis-2,6-O-allylcycloheptaamylose fraction with 1:1 EtOAc/$CHCl_3$. A yield of 43% of the pure compound is obtained after concentrating the eluent in vacuo. The resulting compound is allyl-CD 45, as illustrated in FIG. 5.

A periodic, high-surface area porous material can then be prepared from allyl-CD 45 in the following a manner depending on the mol % of content of allyl-CD desired. As a non-limiting example, in a sample containing 19.2 mmol Si (obtained solely from TEOS) and optionally allyl-CD, the content of allyl-CD can vary, for example, by including 0 mol %, 2.5 mol % (0.48 mmol), or 10 mol % (1.92 mmol) of allyl-CD. A solution of $NH_4OH$ (17.72 g, 30 wt %, 0.15 mmol) and deionized water (33.4 g, 1.86 mol), is prepared and stirred for 30 minutes in a closed flask. A mixture of TEOS and allyl-CD corresponding to the desired mole fraction, with a total of 19.2 mmol of Si (for example, 4 g (19.2 mmol) of TEOS and 0.81 g (0.48 mmol) of allyl-CD for 2.5 mol % content) is added slowly to the base/surfactant solution with gentle stirring. After stirring for 30 min, the solutions were aged at 80° C. for 4 days in a closed flask. The white solid is collected by filtration, washed with water, and dried in an oven at 100° C. Following this procedure, the surface area and pore size can be further modified by extracting the CTAB surfactant. In such an extraction, 5 g of as-synthesized material is suspended in 170 mL methanol with 30 mL concentrated hydrochloric acid and refluxed with stirring for 48 hours. After extraction, the sample is collected via filtration, washed with methanol or a 0.05 M sodium bicarbonate solution, and dried in an oven at 100° C.

A silica based delivery material comprising adsorption-modifying functionalities can be prepared in the following manner, the adsorption-modifying functionalities being trimethylsilyl functionalities. A purely siliceous, periodic, high-surface area porous material is prepared according to the procedure described for Delivery Material A. The surfactant (CTAB) is then extracted from the pores of the material in the manner described previously. A quantity, 10 g, of this material is suspended in 250 mL of anhydrous toluene in a flask under an inert atmosphere. To this mixture is added 10 mL of trimethylchlorosilane, which may be purchased from Alfa-Aesar. The reaction mixture is refluxed for 18 hours to graft the trimethylsilyl functionalities to the silica. The reaction mixture is then cooled and the solid recovered by filtration, washed with hexanes, and dried in an oven at 100° C. This procedure therefore results in a material with similar pore size and surface area to the parent silica, but aliphatically modified walls, enabling ensemble dynamic interactions (including for example, a modified chemical potential) of the matrix with hydrophobic active ingredients such as 1-MCP as compared to its interaction with the unmodified parent material.

A carbon based delivery material modified with adsorption-modifying functionalities can be prepared in the following manner, resulting in a hydrophilically-modified delivery material. A commercial activated carbon, NORIT A®, may be purchased from Fisher Scientific. As received, the material has a surface area of 1146 m$^2$/g. A quantity, 10 g, of this material is suspended in 100 mL of 70% nitric acid in water. The mixture is then refluxed for 18 hours, during which time reddish-brown gases evolve during the oxidation of the carbon surface. After the reaction is complete the solid is recovered by filtration and washed with water until the pH of the water wash is neutral. The solid is then dried at 100° C. This procedure results in a material with a smaller pore size and surface area than the parent activated carbon, but with hydrophilically modified walls, enabling ensemble dynamic interactions (including for example, a modified chemical potential) of the matrix with hydrophobic active ingredients such as 1-MCP as compared to its interaction with the unmodified parent material. The surface area after such a treatment was measured to be 1001 m$^2$/g.

The delivery material may be comprised of a polymer, inorganic material, organic material, or hybrid thereof. In a non-limiting embodiment, the polymer, inorganic, organic, or hybrid inorganic-organic material comprises 0-99.99 wt % of the matrix. In a non-limiting embodiment, the polymer, inorganic material, organic material, or hybrid material of the matrix may be an inert material, which does not chemically interact with the active ingredient(s) of the matrix. In alternative embodiments, an active ingredient may experience significant physicochemical interactions with the inert chemical surface, internal and/or external, of an inert delivery material. In a non-limiting embodiment, the polymer, inorganic material, organic material, or hybrid material of the matrix may be a chemically active material, which chemically interacts with the active ingredient(s) of the matrix.

Different choices of templating agents or surfactants give variable control over the pore size, pore volume, periodicity, and chemical surface area of the resulting delivery materials. Some templating agents or surfactants of this type include, but are not limited to, any tetraalkylammonium halide compound with alkyl groups from $C_1$-$C_{18}$, in which the halide is Cl, Br, or I; any tetraalkylammonium hydroxide compound with alkyl groups from $C_1$-$C_{18}$; any alkylthiol compounds, typified by sodium dodecyl sulfate (SDS) with a thiol "head" and an alkyl "tail" from $C_1$-$C_{18}$; any carboxylic acid or carboxylate salt, typified by sodium laurate, with a carboxylic acid or carboxylate "head" and an alkyl "tail" from $C_1$-$C_{18}$; any bulky aliphatic amine or ammonium salt, typified by adamantylamomminum hydroxide, containing any cyclic, bicyclic, tricyclic, or spiro-carbon groups from $C_4$-$C_{18}$; any mono-, di-, or triglyceride, typified by tristerin, including an ester "head" and an alkyl, alkene, or alkyne "tail" from $C_1$-$C_{36}$, and any methyl, ester, propyl, or isopropyl ester arising from the esterification or saponification thereof. In comparison to the templating effects of CTAB in constructing a mesoporous, periodic organosilicon-based material, the chemical surface area and pore structure will vary accordingly with the size and agglomerating effects of the individual templating agent or surfactant employed in the syntheses as described above.

In a non-limiting embodiment, the delivery material 100 is a solid material or solid carrier such as that typified by nanoporous, macroporous, mesoporous, and microporous carbon materials, templated organic materials of a type exemplified by mesoporous carbon, extruded or pelletized carbon materials, steam-activated carbon materials, oxidized carbon materials, or acid- or base-treated carbon materials. In a non-limiting embodiment, the delivery material has an elemental composition indistinguishable from that of ash. In a non-limiting embodiment, the delivery material having an elemental composition indistinguishable from that of ash stores and/or releases a vapor or gas. In a non-limiting embodiment, the delivery material has an elemental composition indistinguishable from biochar, flue char, or soot. In a non-limiting embodiment, the delivery material having an elemental composition indistinguishable from that of biochar, flue char, or soot stores and/or releases a vapor or gas. In an alternative embodiment, a delivery material 300 may include, but is not limited to, nanoporous, macroporous, microporous, or mesoporous silicates, or organosilicate hybrids. In a non-limiting embodiment, the delivery material has an elemental composition indistinguishable from that of sand. In a non-limiting embodiment, the delivery material having an elemental composition indistinguishable from that of sand stores and/or releases a vapor or gas. In an alternative embodiments, carbon based delivery materials and silicate delivery materials are combined, for example, by mixing a combination of two or more types of delivery materials.

In a non-limiting embodiment, the delivery materials 100 and 300 are solid materials. In a non-limiting embodiment porous delivery materials 100 and 300 are also high surface area materials. In a non-limiting embodiment, a high-surface area material is a material with a total chemical surface area, internal and external, of at least about 1 m$^2$/g. In some embodiments, a high-surface area material is a material with a total chemical surface area, internal and external, of at least about 10 m$^2$/g. In some embodiments, a high-surface area material is a material with a total chemical surface area, internal and external, of at least about 50 m$^2$/g. In some embodiments, a high-surface area material is a material with a total chemical surface area, internal and external, of at least about 90 m$^2$/g. In some embodiments, a high-surface area material is a material with a total chemical surface area, internal and external, greater than about 400 m$^2$/g. In some embodiments, a high-surface area material is a material with a total chemical surface area, internal and external, of at least about 500 m$^2$/g. In some embodiments, a high-surface area material is a material with a total chemical surface area, internal and external, greater than about 1000 m$^2$/g. In some embodiments, a high-surface area material is a material with a total chemical surface area, internal and external, greater than about 2000 m$^2$/g. The terms "total chemical surface area, internal and external", "chemical surface area" and "surface area" are used interchangeably herein. Those of ordinary skill in the will be aware of methods for determining the total chemical surface area, internal and external, for example, using Brunauer-Emmett-Teller (BET) analysis.

In a non-limiting embodiment, a porous material is a material with a micropore diameter greater than about 0.1 nm. In a non-limiting embodiment, a porous material is a material with a micropore diameter greater than about 1 nm. In a non-limiting embodiment, a porous material is a material with a mesopore diameter between about 2 nm and about 5 nm. In some embodiments, a porous material is a material with an average pore diameter greater than 4 nm. In some embodiments, a porous material is a material with an average pore diameter greater than 6 nm. In a non-limiting embodiment, a porous delivery material is a material with an internal void volume greater than 0.1 cm$^3$/g. In a non-limiting embodiment, a porous delivery material is a material with an internal void volume greater than 0.5 cm$^3$/g. In a non-limiting embodiment, a porous material is a material with an internal void volume greater than 1 cm$^3$/g. In a non-limiting embodiment, a porous material is a material with an internal void volume greater than 1.5 cm$^3$/g. As used herein, the terms "internal void volume" and "pore volume" may be used interchangeably.

In a non-limiting embodiment, a carbon based delivery material comprises one or more of the following properties: a density in the range of 0.1-3 g/cm$^3$; a pore volume in the range of 0.1-1.5 cm$^3$/g; a surface area in the range of 500-4000 m$^2$/g; moisture content in the range of 0-30%; and an iodine number in the range of 0-1200 mg/g. In a non-limiting embodiment, a carbon based delivery material has a density in the range of about 0.1 to about 0.3 g/cm$^3$. In a non-limiting embodiment, a carbon based delivery material has a density in the range of about 0.3 to about 0.6 g/cm$^3$. In a non-limiting embodiment, a carbon based delivery material has a density in the range of about 0.6 to about 1.0 g/cm$^3$. In a non-limiting embodiment, a carbon based delivery material has a density in the range of about 1 to about 3 g/cm$^3$. In a non-limiting embodiment, a carbon based delivery material has a density in the range of about 0.3 to about 1.5 g/cm$^3$. In a non-limiting embodiment, a carbon based delivery material has a density in the range of about 0.05 to about 0.15 g/cm$^3$. In a non-limiting embodiment, a carbon based delivery material has a density in the range of about 0.15 to about 0.3 g/cm$^3$. In a non-limiting embodiment, a carbon based delivery material has a density in the range of about 0.3 to about 0.7 g/cm$^3$. In a non-limiting embodiment, a carbon based delivery material has a density in the range of about 1 to about 1.5 g/cm$^3$. In a non-limiting embodiment, a carbon based delivery material has a density in the range of about 0.5 to about 1.5 g/cm$^3$. In a non-limiting embodiment, a carbon based delivery material has a surface area in the range of about 1 to about 3000 m$^2$/g. In a non-limiting embodiment, a carbon based delivery material has a surface area in the range of about 1 to about 50 m$^2$/g. In a non-limiting embodiment, a carbon based delivery material has a surface area in the range of about 50 to about 500 m$^2$/g. In a non-limiting embodiment, a carbon based delivery material has a surface area in the range of about 100 to about 1500 m$^2$/g. In a non-limiting embodiment, a carbon based delivery material has a surface area in the range of about 500 to about 1500 m$^2$/g. In a non-limiting embodiment, a carbon based delivery material has a surface area in the range of about 1000 to about 1500 m$^2$/g. In a non-limiting embodiment, a carbon based delivery material has a surface area in the range of about 500 to about 2000 m$^2$/g. In a non-limiting embodiment, a carbon based delivery material has a surface area in the range of about 1000 to about 2500 m$^2$/g. In a non-limiting embodiment, a carbon based delivery material has a surface area in the range of about 1000 to about 3000 m$^2$/g. In a non-limiting embodiment, a carbon based delivery material has a surface area in the range of about 800 to about 1200 m$^2$/g. In a non-limiting embodiment, a carbon based delivery material has a surface area in the range of about 800 to about 1500 m$^2$/g. In a non-limiting embodiment, a carbon based delivery material has a moisture content in the range of 0 to about 2%. In a non-limiting embodiment, a carbon based delivery material has a moisture content in the range of 2 to about 5%. In a non-limiting embodiment, a carbon based delivery material has a moisture content in the range of 5 to about 15%. In a non-limiting embodiment, a carbon based delivery material has a moisture content in the range of 15 to about 25%. In a non-limiting embodiment, a carbon based delivery material has a moisture content in the range of 25 to about 50%. In a non-limiting embodiment, a carbon based delivery material has a moisture content in the range of 50 to about 100%. In a non-limiting embodiment, a carbon based delivery material has an iodine number in the range of about 0-500. In a non-limiting embodiment, a carbon based delivery material has an iodine number in the range of about 500-1000. In a non-limiting embodiment, a carbon based delivery material has an iodine number in the range of about 1000-1500. In a non-limiting embodiment, a carbon based delivery material has a pore volume of about 0.1 cm$^3$/g to about 1.5 cm$^3$/g. In a non-limiting embodiment, a carbon based delivery material has a pore volume of about 0.5 cm$^3$/g to about 1.5 cm$^3$/g. In a non-limiting embodiment, a carbon based delivery material has a pore volume of about 0.7 cm$^3$/g to about 1.5 cm$^3$/g. In a non-limiting embodiment, a carbon based delivery material has a pore volume of about 1 cm$^3$/g to about 1.5 cm$^3$/g.

In a non-limiting embodiment a silicate delivery material comprises one or more of the following properties: a particle size of 5 nm to 5 mm, a pore volume of 0.5-5 cm$^3$/g, a surface area of 0.01-2000 m$^2$/g. In a non-limiting embodiment, a silicate delivery material comprises one or more of the following properties: a pore size of 60 Å, a mean particle diameter of 63-200 µm, a pore volume of 0.7-0.85 cm$^3$/g, a surface area of 480 m$^2$/g. In a non-limiting embodiment, a silicate delivery material has a surface area in the range of about 0.01 to about 0.1 m$^2$/g. In a non-limiting embodiment, a silicate delivery material has a surface area in the range of about 0.1 to about 1 m$^2$/g. In a non-limiting embodiment, a silicate delivery material has a surface area in the range of about 1 to about 50 m$^2$/g. In a non-limiting embodiment, a silicate delivery material has a surface area in the range of about 50 to about 2500 m$^2$/g. In a non-limiting embodiment, a silicate delivery material has a surface area in the range of about 50 to about 1500 m$^2$/g. In a non-limiting embodiment, a silicate delivery material has a surface area in the range of about 100 to about 1500 m$^2$/g. In a non-limiting embodiment, a silicate delivery material has a surface area in the range of about 500 to about 1000 m$^2$/g. In a non-limiting embodiment, a silicate delivery material has a surface area in the range of about 1000 to about 1500 m$^2$/g. In a non-limiting embodiment, a silicate delivery material has a surface area in the range of about 1500 to about 2500 m$^2$/g. In a non-limiting embodiment, a silicate delivery material has a surface area in the range of about 100 to about 1500 m$^2$/g. In a non-limiting embodiment, a silicate delivery material has a surface area in the range of about 500 to about 1500 m$^2$/g. In a non-limiting embodiment, a silicate delivery material has a particle size of about 5 nm to about 1000 nm. In a non-limiting embodiment, a silicate delivery material has a particle size of about 5 nm to about 500 nm. In a non-limiting embodiment, a silicate delivery material has a particle size of about 5 nm to about 1000 nm. In a non-limiting embodiment, a silicate delivery material has a particle size of about 50 nm to about 1000 nm. In a non-limiting embodiment, a silicate delivery material has a particle size of about 1 µm to about 10 µm. In a non-limiting embodiment, a silicate delivery material has a particle size of about 10 µm to about 5 mm. In a non-limiting embodiment, a silicate delivery material has a particle size of about 10 µm to about 0.5 mm. In a non-limiting embodiment, a silicate delivery material has a pore volume of about 0.1 cm$^3$/g to about 10 cm$^3$/g. In a non-limiting embodiment, a silicate delivery material has a pore volume of about 0.5 cm$^3$/g to about 5 cm$^3$/g. In a non-limiting embodiment, a silicate delivery material has a pore volume of about 0.5 cm$^3$/g to about 2 cm$^3$/g. In a non-limiting embodiment, a silicate delivery material has a pore volume of about 0.5 cm$^3$/g to about 2 cm$^3$/g. In a non-limiting embodiment, a silicate delivery material has a pore volume of about 0.5 cm$^3$/g to about 10 cm$^3$/g. In a non-limiting embodiment, a silicate delivery material has a D-spacing of about 3.5 Å to 4.05 Å. In a non-limiting embodiment, a silicate delivery material has a D-spacing of about 3.0 Å to 4.5 Å.

In some embodiments, the storage and release parameters of the matrices described herein can be influenced by a combination of chemical and physicochemical interactions between the active ingredient and the delivery material. In a non-limiting embodiment, the storage and release parameters are influenced by chemical interactions between an embedded complexing agent of the delivery material and the active ingredient and/or adsorption/desorption equilibria between the active ingredient and the inert chemical surface, internal or external, of the delivery material. Characteristics of the delivery material can also be modified to allow for different weight loadings of the active ingredient. It is contemplated herein that material properties including, but not limited to the specific chemical surface area, pore diameter, particle size, and pore volume of the delivery material influences and/or controls the weight capacity of matrix storage and rate of release from the matrix of the active ingredient. It is also contemplated herein that hydrophobicity, hydrophilicity, chemical potential, zeta-potential, acidity, basicity, surface functionalization, and surface functional group density of a delivery material influences and/or controls the weight capacity of matrix storage and rate of release from the matrix of the active ingredient. Delivery materials may be selected based on specific chemical surface area, pore diameter, and pore volume of the delivery material in order to control the weight capacity of matrix storage and rate of release from the matrix of the active ingredient. Additionally, changing or modifying the surface area and/or pore size of the delivery material results in other delivery materials, offers a unique storage capacity and rate of release per combination of delivery material and active ingredient. For example, complexing agents embedded in a delivery material may introduce specific chemical interactions between the complexing agent and the active ingredient that retard or accelerate the rate of release of the active ingredient, relative to the rate of release of active ingredient from a matrix comprising the active ingredient and an unmodified delivery material and/or relative to the rate of release of active ingredient from a complex of just the complexing agent and the active ingredient. Alternatively or in addition, adsorption-modifying functionalities in the delivery material can modify the chemical potential of the delivery material (with respect to the chemical potential of a porous and/or high surface area material alone or with respect to the chemical potential of an adsorption-modifying functionality alone) by enabling ensemble dynamic interactions between the adsorption-modifying functionality and the active ingredient. In any of these examples, the sum of chemical and physicochemical interactions within a delivery material, modified or unmodified by either complexing agents or adsorption-modifying functionalities, allows the delivery material to load active ingredient in excess of what would be expected for stoichiometric interactions between a complexing agent and an active ingredient.

Generally, a host-guest molecular interaction of α-cyclodextrin and 1-MCP has a binding constant >>1. These host-guest molecular complexes lock or partially retain the 1-MCP into the cage or cavity structure of the α-cyclodextrin, and cannot control release 1-MCP as do the matrices described herein. Moreover, a host-guest molecular complex of α-cyclodextrin and 1-MCP general has a 1:1 stoichiometry, whereas matrices described herein enable a higher loading capacity than what would be expected of merely a molecular complexation. For matrices comprising complexing agents, for example, the weight capacity for an active ingredient may change with the interaction of (a) and (b), where (a)=varying concentration of complexing agents embedded in a delivery material, and (b)=varying surface area of the delivery material. The modifications of (a) and (b) separately neither predict the weight capacity nor the active ingredient release rate of the matrix a priori. For example, the interaction of at least parameters (a) and (b) allows the advantage of providing a unique weight capacity and release rate of the active ingredient for unique compositions of the delivery material. The delivery material can also be modified in other ways in order to control the storage and release of an active ingredient from the matrices described herein.

Figure 2:
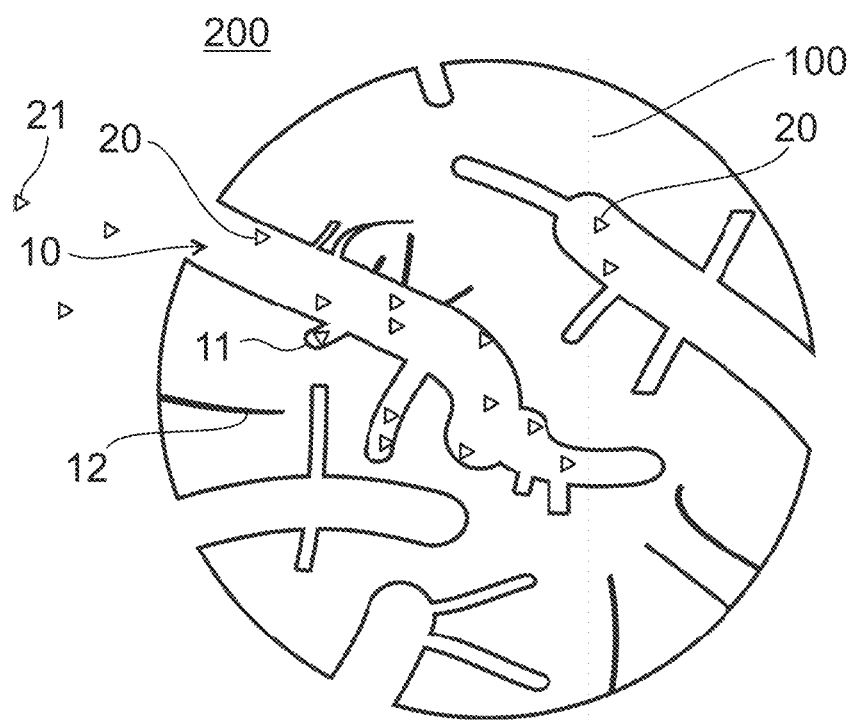
FIG. 2 is a cross-section of a composition in accordance with a non-limiting embodiment.

FIG. 2 shows a cross-section of a non-limiting illustrative embodiment of a matrix 200 comprising an active ingredient 20 and a delivery material 100. As shown in FIG. 2, matrix 200 comprises a porous delivery material 100 and an active ingredient 20. In the embodiment illustrated by FIG. 2, matrix 200 contains at least one macropore 10, at least one mesopore 11, and at least one micropore 12. In a non-limiting embodiment, at least one of the macropore 10, mesopore 11, and micropore 12 stores active ingredient 20. The matrix 200 illustrates active ingredient 20 stored in macropores 10 and mesopores 11 of the matrix 200. Micropores 12 may also store active ingredient 20. As FIG. 2 is a non-limiting example and is not drawn to scale, it should be noted that other storage concentrations of active ingredient 20 in matrix 200 can be achieved by the embodiments of the invention contemplated herein. Moreover, different positions of active ingredient 20 within the pores 10, 11, 12 of matrix 200 are also contemplated. In a non-limiting embodiment, the active ingredient 20 is a cyclopropene. In a non-limiting embodiment, active ingredient 20 is 1-MCP.

FIG. 2 also illustrates active ingredient 21. Active ingredient 21 is the same active ingredient as active ingredient 20; however, active ingredient 21 has been released from matrix 200. As further discussed below, an advantage of the matrix 200 disclosed herein is that it enables and/or can be configured for extended, accelerated, or controlled release of active ingredients.

In a non-limiting embodiment a matrix 200 as described herein comprises a delivery material 100 and an active ingredient 20. The matrices described herein may allow access to new active ingredient release kinetics and increase material capacity for gaseous active ingredients as compared to, for example, previously known host-guest complexes and active ingredient adsorbates. The matrices herein may be configured for controlled release of at least one active ingredient. In a non-limiting embodiment the at least one active ingredient is in the vapor phase or gas phase. Although not illustrated, matrices comprising a delivery material and an active ingredient 20 can also be formed with delivery material 300. In a non-limiting embodiment, the matrix comprises a delivery material 300, the delivery material comprising one or more complexing agents 40 in a concentration of 0-50 mol % of the total delivery material, the matrix further comprising at least one active ingredient 20.

Figure 6:
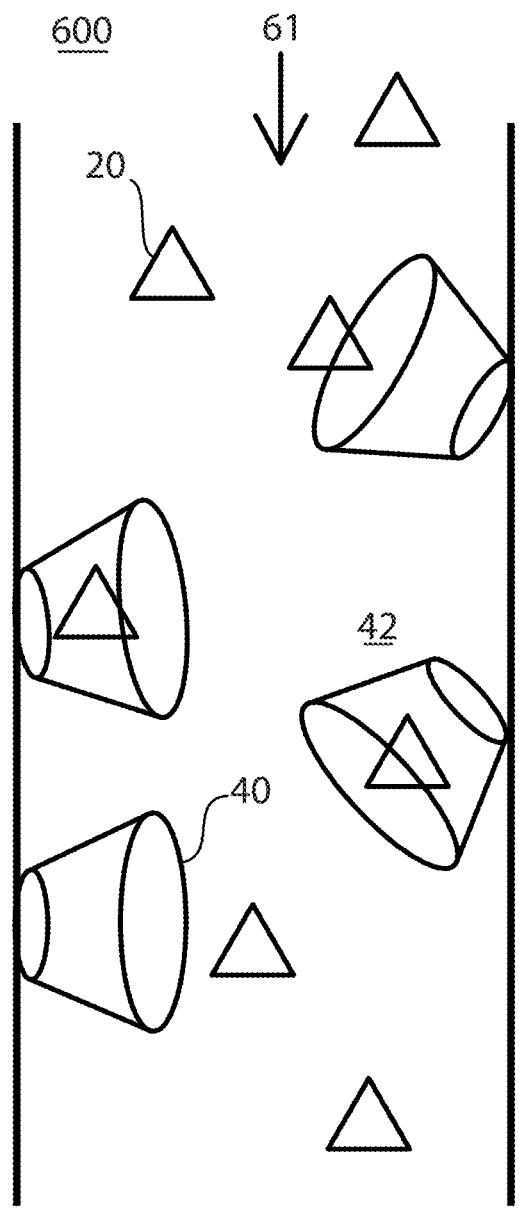
FIG. 6 is a perspective view inside a pore of a composition in accordance with a non-limiting embodiment.

FIG. 6 shows an example of an internal view of a pore 61 of a matrix 600, the matrix comprising a porous delivery material 300 (of FIG. 3, for example), complexing agent 40, and active ingredient 20. A complexing agent 40 encapsulating active ingredient 20 is shown as complex 42. In a non-limiting embodiment, the complexing agent is embedded into the porous delivery material 300. In a non-limiting embodiment, the delivery material 300 comprises a complexing agent 40, a porous and high surface area material, at least one complexing agent 40 embedded onto a pore 61 of the porous and high surface area material. In a non-limiting embodiment, the delivery material 30 is a high-surface area material. Delivery materials comprising complexing agents 40 can combine the molecular host-guest interaction, for example, with an adsorption/desorption equilibrium at the material surface, resulting in unique storage and controllable release parameters. Characteristics of the delivery material, for example, an amount or weight percent of complexing agent comprising the delivery material can be modified to provide deliberately accelerated or deliberately decelerated release of the active ingredient. An advantage of the modifiable delivery material as disclosed herein is that the total rate of release of an active ingredient is unique to the chemical and physicochemical composition of the delivery material. With regard to complexing agents, however, it should be noted that FIG. 6 is illustrative only, and that complexes 42 are not necessarily present in the matrices described herein. In some embodiments, a matrix comprises a delivery material absent a complexing agent, and an active ingredient.

In some embodiments, complexation of an active ingredient 20 with a complexing agent 40 may be accomplished using various clathrates, cage compounds, host-guest complexes, inclusion compounds, intercalation compounds, aromatic groups, aliphatic groups, templating surfactants, and adducts. The clathrates, cage compounds, host-guest complexes, inclusion compounds, intercalation compounds, aromatic groups, templating surfactants, and adducts may be embedded into or onto a porous material such as macroporous, mesoporous, or microporous silica, or non-porous silica particles. Complexes comprising a complexing agent and active ingredient may release an entrapped active ingredient (into the void of pore 61, for example) of above a temperature at which the complex becomes unstable in some embodiments. In some embodiments, complexes may release an entrapped active ingredient (into the void of pore 61 and, possibly eventually out of the matrix, for example) upon dehydration, or when the complex falls below a given concentration of water.

In some embodiments, the active ingredient may be present in the delivery material at up to about 25% by weight of the overall matrix. The storage capacity for an active ingredient or ingredients can be uniquely tailored in the matrices described herein as a function of at least (a) the nature of the active ingredient employed, including, but not limited to hydrophobicity, molecular weight, and boiling point of the active ingredient; (b) the physicochemical characteristics of the delivery material, including but not limited to the hydrophobicity, chemical surface area, crystallinity, and/or pore size and volume within the delivery material; and (c) the chemical characteristics of the delivery material, including, but not limited to, the hydrophobicity or hydrophilicity of the delivery material, the degree of chemical functionalization of the delivery material (for instance by sulfonic, nitric, or carboxylic acid groups), the degree of oxidation of the delivery material, or the degree of aliphatic and aromatic functionalization of the delivery material. For example, delivery materials as described herein comprised of 75-100% carbon and having surface areas of 800-2000 $m^2/g$ can be charged with 0-25 wt % of 1-MCP via contact in either the liquid or gas phase with said active ingredient. In another embodiment, a delivery material with the chemical composition $SiO_2$ and with a chemical surface area of 846 $m^2/g$ may be impregnated with 10 wt % of carvacrol to yield a matrix that delivers the carvacrol in a controlled release fashion over time.

Preparation, loading, or charging of the delivery material with an active ingredient to produce a matrix can be performed by, for example and including, but not limited to, directly contacting the delivery material with the pure liquid active ingredient; directly contacting the delivery material with a solution of any kind containing the active ingredient; directly contacting the delivery material with an active ingredient in pure gas form; directly contacting the delivery material with a gas mixture containing the active ingredient; directly contacting the delivery material with an active ingredient in the vapor phase; directly contacting the delivery material with a gas mixture containing the active ingredient in the vapor phase.

In a non-limiting embodiment the concentration of an active ingredient in the matrix may be controlled via the manner in which the active ingredient is introduced into the matrix. An active ingredient with a high boiling point, for instance >100° C., may be dissolved in a compatible solvent with a low boiling point, for instance <100° C., and slurried with a solid delivery material so as to evenly disperse the active ingredient over the total surface, internal and external, and throughout the total void volume of the delivery material. In a non-limiting embodiment, the volume of a solution containing, for example, about 0.01-30 wt % of the active ingredient, relative to the weight of the delivery material, may equal the total solid volume of the delivery material such that a "wicking" effect draws the active ingredient into pores of the delivery material, effectively distributing it throughout the matrix. Such a technique may sometimes be referred to herein as "incipient wetness impregnation." In this, and other methods in which the active ingredient is loaded into the delivery material via a solution in another solvent, a low-boiling solvent may then be evaporated either through drying, heating, or dynamic vacuum. In a non-limiting embodiment, the active ingredient may be incorporated into the delivery material via chemical grafting. For example, an active ingredient may be dissolved in a compatible solvent in a concentration from 0.01-25 wt %, relative to the delivery material. The delivery material may then be slurried with this solution for a time, during which the active ingredient grafts to chemically available sites on the delivery material. Excess solution may be removed via filtration of the solid matrix, resulting in a matrix with a controlled concentration of the active ingredient. Those with ordinary skill in the art will be aware of other appropriate methods for charging the delivery material with active ingredient to arrive at the compositions described herein.

Treatment of the prepared, loaded, or charged matrix after such a preparation can occur via, but is not limited to, removal of excess active ingredient by vacuum, distillation, evaporation, or blow-off; removal of excess solvent by vacuum, distillation, evaporation, or blow-off; isolation of the matrix under inert atmosphere, for instance nitrogen, to preserve the nature of the active ingredient; isolation of the matrix at low temperatures, for instance −30° C., to preserve the nature of the active ingredient and/or prevent or retard release of the active ingredient from the matrix; steaming the matrix with water at an elevated temperature (20° C. or greater) to accelerate release of the active ingredient; and other methods. While such treatments may increase or decrease the inherent rate of release of the active ingredient from the matrix, these treatments do not destroy the fundamental advantages of the matrix.

The matrices may be incorporated into a structure, for example, non-wovens, wovens, knits, coated substrates, impregnated substrates, various forms of paper, cardboard, paper products, paper derivatives, fabrics, fibers, films, cloths, and coatings. The matrices may also be incorporate into a structure such as wood, metal, clays, pulp, plastics, and other materials commonly used for planting, potting, shipping, harvesting, crating, storing, and supporting produce. The structures may be formed from natural materials, synthetic materials, or a combination thereof. Other structures may include dispersions, froths, foams, powders, flakes, pellets, or the like. In some embodiments, the matrices may be incorporated into a structure through compression molding, extrusion, injection molding, blow molding, dry spinning, melt spinning, wet spinning, solution casting, spray drying, solution spinning, film blowing, calendaring, rotational molding, powder injection molding, thixomolding, and other various methods.

The matrices may be incorporated into a sachet, insert, paint, gel, coating, powder or encased in a capsule, pod, compartment, or container for the purpose of sale and ease of use for application. These means of application may apply to any scale of treatment space or active ingredient application, and may be adapted to the particular compartment or container of target produce. In a non-limiting embodiment, this material may be enclosed in a container, or "pod", which upon breakage of a seal, would serve to release the active ingredient. The pod may be plastic or another suitable material.

In a non-limiting embodiment, the matrix is incorporated into a structure or form factor by being sealed inside the structure or form factor. In a non-limiting embodiment, the structure or form factor is comprised of a material that is one or more of food safe, non-absorptive, air permeable (but not necessarily porous). In a non-limiting embodiment, the one or more of food safe, non-absorptive, air permeable (but not necessarily porous) structure comprises a sachet. In a non-limiting embodiment, the sachet is porous. In an embodiment, the delivery material is charged with active ingredient prior to being deposited and sealed in a sachet. For example, the sachet may be prepared by depositing the composition in the sachet and then sealing the sachet.

In a non-limiting embodiment, a sachet material comprises one of a polypropylene material, polyethylene material (e.g. TYVEK™), and a cellulose based material. In a non-limiting embodiment, the Gurley Hill porosity measurement of a sachet material is 45-60 sec/100 $cm^2$-in. In some embodiments, the structure comprising the matrix or the means of holding, encapsulating, encasing, or enrobing the material may further modulate active ingredient release properties. In some embodiments, the composition and/or the structure containing the matrix therein may be transported in hermetically sealed packaging.

In some embodiments, the compositions herein may be used as soil additives. In a non-limiting embodiment, the matrices discussed herein can be used in or incorporated into refrigeration systems and other cold compartments, refrigeration filtration systems and the like.

The rate of release of the active ingredient(s) from the matrix disclosed herein may be controlled in various manners, some of which are discussed above. The rate of release may also be affected, for example, by varying the concentration of the active ingredient in the matrix. The rate of release may also be affected, for example, by modifying certain characteristics of the delivery material, for example, by varying the size of the delivery material's particles, by introducing a binder, oil, or other manner of encapsulation, including, but not limited to, encapsulation using a hydrogel or polymer, by varying the chemical structure, size, or composition of carbohydrates or other organic molecules that may be grafted into the delivery material, or by varying the nature or ratio of templating surfactants added to the material. The rate of release may also be affected, for example, by mixing a combination of two or more delivery materials with different compositions with respect to any of the above variables.

In some embodiments, the rate of release or amount of release may also be controlled by selecting a desired quantity of the delivery material or composition. For example, in a non-limiting embodiment, a user may select a smaller mass of composition for a smaller release of active ingredient, or a larger mass for a greater release of active ingredient. In some embodiments, the presence of additives may influence the rate of release of active ingredient. For example, adding a diluent material may modify the rate of release, amount of release, or concentration of active ingredient present in the total composition (e.g. including the diluent material). As a non-limiting example, a diluent material is combined, mixed with, or added to an already formed composition (e.g. comprising a delivery material impregnated with active ingredient). In some cases, the diluent material is a different material than the delivery material used in the composition. In some cases, the diluent material may be the same material as the delivery material used in the composition. As a non-limiting example, a diluent material may be a carbon based material which is mechanically mixed with a composition (e.g. comprising a carbon based delivery material impregnated with active ingredient) after the composition has been formed. As another non-limiting example, a diluent material may be an activated carbon which is mixed with a composition (e.g. comprising an activated carbon delivery material impregnated with active ingredient) after the composition has been formed. As another non-limiting example, a diluent material may be an silicate material which is mixed with a composition (e.g. comprising an silicate delivery material impregnated with active ingredient) after the composition has been formed.

In a non-limiting embodiment the release of an active ingredient from the matrix can be accomplished passively, that is, without the addition of external wetting, hydrating, or chemically reactive agents in order to affect the release of the active ingredient from the delivery material. In other embodiments, an initial release of the active ingredient may be obtained within seconds or minutes of the matrix disclosed herein contacting water. In some embodiments, the release of an active ingredient from the matrix occurs as a function of temperature. For example, delayed release may be accomplished by storing the matrix at very low temperatures (e.g. approximately −20° C. or lower) until release is required. In some embodiments, an initial release of the active ingredient may be delayed for several hours. In other embodiments, an initial release of the active ingredient may be delayed for several days, weeks, or months. In a non-limiting embodiment, the active ingredient is liberated from the delivery material without the use of a solvent. In a non-limiting embodiment, after delayed release and once release is desired, the active ingredient is liberated from the delivery material without the use of a solvent. In an embodiment, the active ingredient 1-MCP is liberated from the delivery material without the use of a solvent at temperatures between 0° C. and ambient room temperature, the release beginning essentially instantaneously after the delivery material is charged with 1-MCP to form the matrix.

In embodiments where the matrices are in contact with, embedded on, embedded within, or incorporated into a structure, the structure can be sized appropriately to control release of the active ingredient. Discrete structures, for example, pellets, flakes, and powders are advantageous for use in applications requiring a measurable or controllable dosage of the active ingredient. Pellets and flakes may be advantageous for various dispersal methods, for example, where the pellets or flakes are scattered throughout a field during planting or prior to harvesting. Films and sheets, for example, may also provide measurable and controllable dosage due to the ability of the user to select a desired length of film or sheet. In other embodiments a smaller area or smaller volume of the structure may be selected for smaller release amounts of active ingredient. In other embodiments, the rate of release may be influenced based upon the rate in which the hygroscopic components used in forming the structure dissolve or swell in water. In other embodiments, the rate of release may be affected by the rate at which water diffuses through the structure and the location of the matrix within the structure.

Various applications for which the active ingredients disclosed herein may be used may require different amounts of active ingredient dosing. As described above, structures described herein may advantageously provide for selective dosing. Other applications may require different doses of active ingredient to be delivered at various times. Structures and compositions described herein may provide for various modes of degradation, allowing for multiple releases or multiple release rates. For example in a non-limiting embodiment, structures may provide for an initial release of active ingredient upon exposure to air, and a second release of active ingredient upon contact with moisture or humidity. In some embodiments, compositions and structures disclosed herein may provide an initial burst or high-concentration release of active ingredient, followed by a lower-concentration release over time. In other embodiments, compositions and structures disclosed herein may provide an initial low-concentration release over time, followed by a high-concentration release at a given time or condition.

These and other aspects will be further appreciated upon consideration of the following Examples, which are intended to illustrate certain particular embodiments of the invention but are not intended to limit its scope, as defined by the claims.

EXAMPLES

1-Methylcyclopropene (1-MCP)

While the examples described below are related to the storage of the active ingredient 1-MCP in and its release from the delivery materials described herein, a person skilled in the art would appreciate that the same or similar charging methods can be effective, for example, for cyclopropene, other cyclopropene derivatives, cyclopentadiene, diazocyclopentadiene, their derivatives, and other active ingredients to arrive at the matrices described herein. These examples use 1-MCP because it is one of the most active derivatives of cyclopropene that binds to the ethylene receptor site of plants.

Synthesis and Generation of 1-MCP

Synthesis methods for generating 1-MCP are known in the art. Herein described are three examples of known methods for generating 1-MCP, appreciating that other methods for generating 1-MCP may also be employed.

Generation of 1-MCP: Example 1

1-MCP is purchased in powder form as ETHYLBLOC™ (FLORALIFE®; Walterboro, S.C.), which contains 0.14% 1-MCP by weight. Depending on the concentration of 1-MCP gas desired, the ETHYLBLOC™ powder is weighed and placed in a glass flask holding distilled water as a solvent. The solution is then mixed and held at room temperature, for example, over time to develop the desired concentration of 1-MCP gas. The glass flask holding the 1-MCP gas has a gas inlet and outlet port to allow continuous flow. 1-MCP generation as extracted from ETHYLBLOC™ has been described in the art. For example, see "Development of a 1-Methylcyclopropene (1-MCP) Sachet Release System," *Journal of Food Science*, 2006, Vol. 71, Nr. 1; p. C1-C6, which is incorporated herein by reference.

Generation of 1-MCP: Example 2

1-MCP is generated from a 1-MCP-Li suspension in mineral oil, which is prepared by reacting lithium diisopropylamide (LDA) with 3-chloro-2-methylpropene under a nitrogen environment which is described in "Kinetics of Molecular Encapsulation of 1-Methylcyclopropene into α-Cyclodextrin," *Journal of Agricultural and Food Chemistry*, 2007, 55(26): p. 11020-11026, which is incorporated herein by reference in its entirety. Table 1 summarizes the reaction conditions that can be used to synthesize 1-MCP in this manner.

TABLE 1

Reaction conditions to synthesize 1-MCP

| | |
|---|---|
| Reaction mixture component | LDA:3-chloro-2-methylpropene = 4:1 (molar ratio) |
| Reaction temperature | Ambient temperature (23° C.) |
| Reaction time | 1.5 hours |
| Yield (based on 1 mol of 3-chloro-2-methylpropene) | 60% (0.6 mol of 1-MCP) |

Generation of 1-MCP: Example 3

At room temperature, nitrogen gas (99.95% pure) is pumped into a nitrogen vessel (35½"×28"×32") containing either sodium amide powder (90%-$NaNH_2$) or lithium diisopropylamide powder (97%-$[(CH_3)_2CH]_2NLi$). A separate powder addition vessel is also purged with the same nitrogen gas. Purging with nitrogen is necessary because of the reactivity of the above-mentioned Lewis bases with air, and to eliminate any contamination before conducting the synthesis reaction. In the powder addition vessel containing the inert atmosphere, the sodium amide (or an equivalent molar concentration of lithium diisopropylamide) is added in an amount ranging from 365-1100 grams, with the larger amount being preferred. To weigh the proper amount of the Lewis base, all weighing is performed in a nitrogen box with nitrogen purging to eliminate oxygen and the threat of spontaneous ignition of the base. Special care is important when working with such bases for proper safety.

Once the Lewis base in powder form is completely added, the openings in the powder addition vessel that were used for purging are sealed off to exclude air. The powder addition vessel is attached to the main system. The reaction vessel, which already has been purged with nitrogen and has been partially evacuated, is opened to the powder addition vessel to allow the powder to fall into the reaction vessel with the aid of nitrogen flow. Nitrogen enters the powder addition vessel during transfer of the Lewis base.

After the powder is transferred into the reaction vessel, the ball valve is closed. After the powder is added, a light mineral oil (dried with molecular sieves) or another equivalent solvent is added by opening the connecting ball valve and allowing it to pour into the reaction vessel with the aid of nitrogen flow. The amount of oil added during the reaction can vary from 1-47 liters, with the higher amount 47 liters being preferred. The reaction vessel is then purged and closed. The reaction vessel temperature is adjusted to a temperature anywhere from 0° C. to 75° C., and preferably about 20° C. to start the reaction. The temperature can be raised or lowered by heating or chilling the jacket using a circulating pump. Should the holding capacity of the vessel be exceeded, the procedure is repeated.

During the addition of ingredients, the contents of the reaction vessel are stirred with a propeller mixer, but splashing of the contents should be avoided. After mixing for 1-60 minutes, and preferably for about 20 minutes, 3-chloro-2-methylpropene is added to the reaction vessel in an amount ranging from 0.15-1.0 liters. During the addition of the 3-chloro-2-methylpropene, there is continuous purging with nitrogen gas. The liquid reactant 3-chloro-2-methylpropene is added slowly over a period of 20 minutes. During this addition, the temperature of the reaction vessel is monitored and kept at less than 40° C. Once the 3-chloro-2-methylpropene is completely added, the vessel should be agitated for an additional 1-30 minutes, and preferably for 15 minutes, using the propeller mixer discussed above. A reaction vessel pressure of about two atmospheres is used in this example.

After all the 3-chloro-2-methylpropene has been reacted, the desired end-product, methylcyclopropene, exists as a sodium salt. To react the remainder of the Lewis base and facilitate liberation of the methylcyclopropene product, the nitrogen purge is stopped and water is added ranging from 0.00-1.47 liters by adding the water under positive pressure over a period of 1 hour. Once all the water has been added, a ball valve connecting the vessel with the condenser is opened and the headspace 1-MCP gas can be utilized. 1-MCP generation in this fashion is described in U.S. Pat. No. 6,017,819, which is incorporated herein by reference in its entirety.

Charging Process

In a non-limiting embodiment, in order to form the compositions described herein, a stream of gaseous (or liquid) active ingredient at a known concentration is flowed through a tube of delivery material using an inert air stream (such as $N_2$) at a sufficient rate and duration to exhaust the desired amount of active ingredient into the tube of delivery material. Depending on the purity of active ingredient, the temperature of the vessel containing the active ingredient may be adjusted to reduce impurities from loading into the delivery material. For example, if the active ingredient has a lower boiling point than impurities also contained in the vessel, the vessel containing the active ingredient (and impurities) may be chilled to a temperature below the boiling point of the active ingredient.

Manufacture of Matrix Comprising 1-MCP

One non-limiting example of an illustrative process for manufacturing matrices comprising 1-MCP is described. A chilled vessel (0° C. or less, for example) placed in an ice bath containing a desired amount of 1-MCP is connected to a packed bed column containing a desired amount delivery, for example, activated charcoal (available as DARCO® or other commercial charcoals). Under inert air stream (for example, $N_2$), a known concentration of 1-MCP vapor is forced through the packed bed column until a desired amount of 1-MCP has been exposed to the packed bed column in order to arrive at the desired weight loading. The delivery materials described herein are efficient adsorbers of 1-MCP. Therefore, a skilled artisan will appreciate that the desired weight percent of 1-MCP in the matrix may be achieved, for example, by controlling the system variables such as the concentration of 1-MCP in the inert air stream and the mass of delivery material in the packed bed column.

Material weight gain may be measured after the charging process to assess the ultimate weight loading of 1-MCP in the matrix. If a lower weight loading is desired, diluent material (in the form of uncharged delivery material, for example) may be added. The resulting matrix material may be packaged in form factors such as sachets or injection molded "pods" for example, for sales dress. In order to delay release or prevent release of 1-MCP from the matrix (and/or form factors holding the material), the resulting composition may be stored at cold temperatures (0° C. or less, for example) until release is desired.

Some non-limiting specific examples various compositions are provided below.

SAMPLE 1: A commercial carbon material (NORIT A®, Fisher Scientific) was obtained as an extrudate of 0.8 mm pellets. The carbon had a surface area of 1146 $m^2/g$ as determined by $N_2$ physisorption and BET analysis. The delivery material was charged with 1-MCP (e.g. available in the form of ETHYLBLOC™, from FloraLife®) in the vapor phase by slowly flowing a mixture of nitrogen and gaseous 1-MCP through a packed tube of the powder for 30 minutes. Thermogravimetric analysis of this matrix recovered a total of 14.7 wt % 1-MCP per gram of matrix (147 mg 1-MCP/g matrix).

SAMPLE 2: A commercial carbon material (NORIT A®, Fisher Scientific) was obtained as an extrudate of 0.8 mm pellets. The carbon had a surface area of 1146 $m^2/g$ as determined by $N_2$ physisorption and BET analysis. The carbon was modified with 70% nitric acid by refluxing 10 g of carbon in 100 mL of 70% nitric acid for 18 hours, then isolating the solid by filtration and washing with water until the pH was neutral. The surface area of the carbon after this treatment was 1001 $m^2/g$. The delivery material was charged with 1-MCP (e.g. available in the form of EthylBloc™, from FloraLife®) in the vapor phase by slowly flowing a mixture of nitrogen and gaseous 1-MCP through a packed tube of the powder for 30 minutes. Thermogravimetric analysis of this matrix recovered a total of 10.0 wt % 1-MCP per gram of matrix (100 mg 1-MCP/g matrix).

SAMPLE 3: A commercial carbon material (DARCO®, Sigma-Aldrich) was obtained as a powder with a particle size of 100 mesh. The carbon had a surface area of 843 $m^2/g$ as determined by $N_2$ physisorption and BET analysis. The delivery material was charged with 1-MCP (e.g. available in the form of EthylBloc™, from FloraLife®) in the vapor phase by slowly flowing a mixture of nitrogen and gaseous 1-MCP through a packed tube of the powder for 30 minutes. Thermogravimetric analysis of this sample recovered a total of 1.0 wt % of 1-MCP (10 mg 1-MCP/g matrix).

SAMPLE 4: A commercial carbon material (DARCO®, Sigma-Aldrich) was obtained as a powder with a particle size of 100 mesh. The carbon had a surface area of 843 $m^2/g$ as determined by $N_2$ physisorption and BET analysis. The carbon was modified with 70% nitric acid by refluxing 10 g of carbon in 100 mL of 70% nitric acid for 18 hours, then isolating the solid by filtration and washing with water until the pH was neutral. The surface area of the carbon after this treatment was 846 m$^2$/g. The delivery material was charged with 1-MCP (e.g. available in the form of EthylBloc™, from FloraLife®) in the vapor phase by slowly flowing a mixture of nitrogen and gaseous 1-MCP through a packed tube of the powder for 30 minutes. Thermogravimetric analysis of this sample recovered 23.8 wt % 1-MCP (238 mg 1-MCP/g matrix).

SAMPLE 5: A silicate material with the overall chemical formula SiO$_2$ was prepared according to the procedure previously described for Delivery Material A from tetraethylorthosilicate (TEOS, Acros Organics). Cetyltrimethylammonium bromide (CTAB, Acros Organics) was used as the surfactant and was not extracted from the silicate once the material was formed. The resulting delivery material had a specific surface area of 99 m$^2$/g, a d-spacing of 4.08 Å, and 0 mol % embedded complexing agent. The delivery material was charged with 1-MCP (e.g. available in the form of EthylBloc™, from FloraLife®) in the vapor phase by slowly flowing a mixture of nitrogen and gaseous 1-MCP through a packed tube of the power for 30 minutes. This matrix contained 3 wt % 1-MCP (30 mg 1-MCP/g matrix).

SAMPLE 6: A silicate material with the overall chemical formula SiO$_2$ was prepared according to the procedure previously described for Delivery Material A from tetraethylorthosilicate (TEOS, Acros Organics). Cetyltrimethylammonium bromide (CTAB, Acros Organics) was used as the surfactant and was extracted from the silicate once the material was formed by refluxing in methanol and concentrated hydrochloric acid for 48 hours. The resulting delivery material had a specific surface area of 1022 m$^2$/g, a d-spacing of 4.02 Å, and 0 mol % embedded complexing agent. The sample was charged with 1-MCP (e.g. available in the form of EthylBloc™, from FloraLife®) in the vapor phase by slowing flowing a mixture of nitrogen and gaseous 1-MCP through a packed tube of the power for 30 minutes. This matrix contained 7.9 wt % 1-MCP (79 mg 1-MCP/g matrix).

SAMPLE 7: A silicate material with the overall chemical formula SiO2 was prepared according to the procedure previously described for Delivery Material A from tetraethylorthosilicate (TEOS, Acros Organics). Cetyltrimethylammonium bromide (CTAB, Acros Organics) was used as the surfactant and was extracted from the silicate once the material was formed by refluxing in methanol and concentrated hydrochloric acid for 48 hours. The resulting delivery material had a specific surface area of 1022 m2/g, a d-spacing of 4.02 Å, and 0 mol % embedded complexing agent. The delivery material was charged with 1-MCP (e.g. available in the form of ETHYLBLOC™) in the vapor phase by slowing flowing a mixture of nitrogen and gaseous 1-MCP through a packed tube of the power for 30 minutes. This matrix contained 9.2 wt % 1-MCP (92 mg 1-MCP/g matrix).

SAMPLE 8: A silicate material with the overall chemical formula SiO$_2$ was prepared according to the procedure as described for Delivery Material B from tetraethylorthosilicate (TEOS, Acros Organics). Cetyltrimethylammonium bromide (CTAB, Acros Organics) was used as the surfactant and was removed via calcination of the material at 600° C. in static air. The resulting delivery material had a specific surface area of 846 m$^2$/g, a d-spacing of 4.02 Å, and 0 wt % embedded adsorption-modifying functionalities or complexing agents. The delivery material was charged with carvacrol (Sigma-Aldrich, 98%) in a solution in acetone via incipient wetness impregnation. The acetone was evaporated from the sample first under dynamic vacuum in a conventional rotovap apparatus at 20° C. for 30 minutes, then by heating in an oven at 150° C. for 30 minutes. This matrix contained 10 wt % of carvacrol per gram of matrix.

SAMPLE 9: A silicate delivery material with the overall chemical formula SiO$_2$ was prepared according to the procedure as described for Delivery Material B from tetraethylorthosilicate (TEOS, Acros Organics). Cetyltrimethylammonium bromide (CTAB, Acros Organics) was used as the surfactant and was removed via calcination of the material at 600° C. in static air. The resulting delivery material had a specific surface area of 846 m$^2$/g, a d-spacing of 4.02 Å, and 0 wt % embedded adsorption-modifying functionalities or complexing agents. The delivery material was charged with thyme oil (Sigma-Aldrich, white, FCC, FG) in a solution in acetone via incipient wetness impregnation. The acetone was evaporated from the sample first under dynamic vacuum in a conventional rotovap apparatus at 20° C. for 30 minutes, then by heating in an oven at 150° C. for 30 minutes. This matrix contained 10 wt % of thyme oil per gram of matrix.

SAMPLE 10: A matrix material was prepared by mechanically mixing 1 g of Sample 8 with 1 g of Sample 9 to give a 1:1 ratio of the active ingredients. The final composition of the matrix had the chemical formula SiO$_2$ and contained 0.050 g of carvacrol and 0.050 g of thyme oil per gram of matrix.

SAMPLE 11: A silicate delivery material with the overall chemical formula SiO$_2$ was prepared according to the procedure described for Delivery Material A from tetraethylorthosilicate (TEOS, Acros Organics). Cetyltrimethylammonium bromide (CTAB, Acros Organics) was used as the surfactant and was extracted from the silicate once the material was formed by refluxing in methanol and concentrated hydrochloric acid for 48 hours. The resulting delivery material had a specific surface area of 1022 m$^2$/g, a d-spacing of 4.02 Å, and 0 mol % embedded complexing agent. The delivery material was impregnated with D(+)-carvone (Acros Organics, 96%) in a methanol solution. For a 100 mg sample, 5 mg of carvone was dissolved in 1.5 mg methanol and added to the powder with stirring for 30 min. The sample was then dried on a rotational evaporator for 30 mins and the sample further dried in the oven at 100° C. This matrix contained 5 wt % of carvone per gram of matrix.

SAMPLE 12: A silicate delivery material with a composition ratio of 10 mol % complexing agent to 90 mol % SiO$_2$ was prepared according to the procedure described for Delivery Material C from a mixture of tetraethylorthosilicate (TEOS, Acros Organics) and β-cyclodextrin (Alfa-Aesar) modified with silyl groups. As a molar ratio of Si, the mixture contained 10 mol % Si from silyl-modified β-cyclodextrin and 90% Si from TEOS. Cetyltrimethylammonium bromide (CTAB, Acros Organics) was used as the surfactant and was extracted from the silicate after it was formed by refluxing in methanol and concentrated hydrochloric acid for 48 hours. The resulting delivery material had a specific surface area of 670 m$^2$/g, a d-spacing of 3.85 Å, and 10 mol % embedded complexing agent. The delivery material was impregnated with D(+)-carvone (Acros Organics, 96%) in a methanol solution. For a 100 mg sample, 5 mg of carvone was dissolved in 1.5 mg methanol and added to the powder with stirring for 30 min. The sample was then dried on a rotational evaporator for 30 mins and the sample further dried in the oven at 100° C. This matrix contained 5 wt % of carvone per gram of matrix.

SAMPLE 13: A silicate material with the overall chemical formula SiO$_2$ was prepared according to the procedure described for Delivery Material A from tetraethylorthosilicate (TEOS, Acros Organics). Cetyltrimethylammonium bromide (CTAB, Acros Organics) was used as the surfactant and was extracted from the silicate once the material was formed by refluxing in methanol and concentrated hydrochloric acid for 48 hours. The resulting delivery material had a specific surface area of 1022 m$^2$/g, a d-spacing of 4.02 Å, and 0 mol % complexing agent. The delivery material was impregnated with thymol (Acros Organics, 99%) in a methanol solution. For a 100 mg sample, 5 mg of thymol was dissolved in 1.5 mg methanol and added to the powder with stirring for 30 min. The sample was then dried on a rotational evaporator for 30 mins and the sample further dried in the oven at 100° C. This matrix contained 5 wt % thymol per gram of matrix.

SAMPLE 14: A silicate delivery material with a composition ratio of 10 mol % complexing agent to 90 mol % SiO$_2$ was prepared according to the procedure described for Delivery Material C from a mixture of tetraethylorthosilicate (TEOS, Acros Organics) and β-cyclodextrin (Alfa-Aesar) modified with silyl groups. As a molar ratio of Si, the mixture contained 10 mol % Si from silyl-modified β-cyclodextrin and 90% Si from TEOS. Cetyltrimethylammonium bromide (CTAB, Acros Organics) was used as the surfactant and was extracted from the silicate after it was formed by refluxing in methanol and concentrated hydrochloric acid for 48 hours. The resulting delivery material had a specific surface area of 670 m$^2$/g, a d-spacing of 3.85 Å, and 10 mol % embedded complexing agent. The delivery material was impregnated with thymol (Acros Organics, 99%) in a methanol solution. For a 100 mg sample, 5 mg of thymol was dissolved in 1.5 mg methanol and added to the powder with stirring for 30 min. The sample was then dried on a rotational evaporator for 30 mins and the sample further dried in the oven at 100° C. This matrix contained 5 wt % thymol per gram of matrix.

SAMPLE 15: A silicate delivery material with the overall chemical formula SiO$_2$ was prepared according to the procedure described for Delivery Material A from tetraethylorthosilicate (TEOS, Acros Organics). Cetyltrimethylammonium bromide (CTAB, Acros Organics) was used as the surfactant and was extracted from the silicate once the material was formed by refluxing in methanol and concentrated hydrochloric acid for 48 hours. The resulting delivery material had a specific surface area of 1022 m$^2$/g, a d-spacing of 4.02 Å, and 0 mol % complexing agent. The delivery material was impregnated with hexanal (Acros Organics, 99%) in a hexanes solution. A 20 mg sample of powder was suspended in 1 mL of a 10 w/v % solution of hexanal in hexanes overnight. The sample was then left to dry in open air for 10 hours until all hexanes had evaporated. This matrix contained 5 wt % hexanal per gram of matrix.

SAMPLE 16: A silicate material with a composition ratio of 2.5 mol % molecular complexing agent to 97.5% SiO$_2$ was prepared according to the procedure described for Delivery Material C from a mixture of tetraethylorthosilicate (TEOS, Acros Organics) and β-cyclodextrin (Alfa-Aesar) modified with silyl groups. As a molar ratio of Si, the mixture contained 2.5 mol % Si from silyl-modified β-cyclodextrin and 97.5% Si from TEOS. Cetyltrimethylammonium bromide (CTAB, Acros Organics) was used as the surfactant and was extracted from the silicate after it was formed by refluxing in methanol and concentrated hydrochloric acid for 48 hours. The resulting delivery material had a specific surface area of 988 m$^2$/g, a d-spacing of 4.07 Å, and 2.5 mol % embedded complexing agent. The delivery material was impregnated with hexanal (Acros Organics, 99%) in a hexanes solution. A 20 mg sample of powder was suspended in 1 mL of a 10 w/v % solution of hexanal in hexanes overnight. The sample was then left to dry in open air for 10 hours until all hexanes had evaporated. This matrix contained 5 wt % hexanal per gram of matrix.

Sample Characteristics

Surface areas of Samples 1-9 and 11-16 above were measured using a commercial nitrogen physisorption and BET analyzer apparatus. The samples were outgassed at 120° C. for 24 h prior to physisorption measurements. The d-spacings of Samples 5-7 were measured using a sample packed onto a glass sample holder in a conventional powder X-ray diffraction apparatus equipped with a Cu K-α X-ray source.

Thermogravimetric analysis of Samples 1-4 was determined from one of two complementary methods. In the first method, the delivery material was loaded with 1-MCP as described, then ca. 1 g of the matrix was loaded into a glass vessel. The exact mass of matrix was recorded to 0.1 mg accuracy, and the overall weight of the vessel was recorded to 0.1 mg accuracy. The vessel was then subjected to vacuum at 50° C. in a conventional rotovap apparatus attached to an oil vacuum pump with a rotational speed of 250 RPM. Care was taken so that the sample did not dislodge into the rotovap. The sample was thus evacuated for 30 minutes and the mass of the vessel taken again. The difference in mass in the two samples is attributed to the loss of 1-MCP from the matrix and was normalized to a mass of 1-MCP per unit mass of matrix. In the second method, a ca. 1 g of matrix loaded with 1-MCP was placed in a tared vial. The total mass of the vial plus the sample was then recorded. The sample was placed overnight in an oven at 150° C. and left open to drive off any adsorbed volatiles. After 18 h, the sample was removed from the oven, cooled, and reweighed. The difference in sample mass is attributed to the loss of 1-MCP from the matrix and was normalized to a mass of 1-MCP per unit mass of matrix.

The thermogravimetric analysis results are summarized in Table 2 below.

TABLE 2

1-MCP Weight Loadings of Samples 1-4

| Delivery Material | Sample | Surface Area | 1-MCP Wt. Loading (mg 1-MCP/g matrix) |
|---|---|---|---|
| NORIT A ® | 1 | 1146 m$^2$/g | 147 |
| Modified NORIT A ® | 2 | 1146 m$^2$/g | 100 |
| DARCO ® | 3 | 843 m$^2$/g | 10 |
| Modified DARCO ® | 4 | 843 m$^2$/g | 238 |

The mass uptake of 1-MCP was determined for Samples 5-7 by first loading 250 mg of the appropriate delivery material into a plastic tube atop a bed of quartz wool. A plug of quartz wool was packed over the top of the sample to keep the sample in place. The tube was then weighed on a precision balance and attached to a vapor-flow apparatus through tubing. A mixture of nitrogen and 1-MCP was flowed through the bed of delivery material for 30 minutes, then the tube was disengaged from the vapor-flow apparatus and reweighed. The mass difference is attributed to uptake of gaseous 1-MCP by the delivery material and represents the weight content of 1-MCP present in the matrix.

The mass uptake analysis results for Samples 5-7 are summarized in Table 3 below.

TABLE 3

1-MCP Weight Loadings of Samples 5-7.

| Material | Sample | Surface Area | d-Spacing | Mol % Complexing Agent | 1-MCP Wt. Loading (mg 1-MCP/g matrix) |
|---|---|---|---|---|---|
| Unextracted silicate | 5 | 99 m²/g | 4.08 Å | — | 30 |
| Extracted silicate | 6 | 1022 m²/g | 4.02 Å | — | 79 |
| Extracted silicate | 7 | 1022 m²/g | 4.07 Å | — | 92 |

Mass difference methods were also used to determine the weight loading of various active ingredients in Samples 8, 9, and 11-16. The mass difference before and after loading is attributed to uptake of the active ingredient by the delivery material and represents the weight content of the active ingredient present in the matrix. The mass uptake analysis results for Samples 8, 9, and 11-16 are summarized in Table 4, below.

TABLE 4

Weight Loadings of Samples 8, 9, and 11-16.

| Active Ingredient | Sample | Surface Area | d-Spacing | Mol % Complexing Agent | Wt. Loading (mg active ingredient/g matrix) |
|---|---|---|---|---|---|
| Carvacrol | 8 | 846 m²/g | 4.02 Å | — | 100 |
| Thyme Oil | 9 | 846 m²/g | 4.02 Å | — | 100 |
| Carvone | 11 | 1022 m²/g | 4.02 Å | — | 50 |
| Carvone | 12 | 670 m²/g | 3.85 Å | 10.0% | 50 |
| Thymol | 13 | 1022 m²/g | 4.02 Å | — | 50 |
| Thymol | 14 | 670 m²/g | 3.85 Å | 10.0% | 50 |
| Hexanal | 15 | 1022 m²/g | 4.02 Å | — | 50 |
| Hexanal | 16 | 988 m²/g | 4.07 Å | 2.5% | 50 |

Release Tests from Samples—Release Reported as a Rate

The release of active ingredient from Samples 1-4 and 8 and 9 was determined using headspace analysis of sealed vials containing 50 mg of the sample, as measured with a gas chromatograph equipped with a flame ionization detector. Active ingredient released out of Samples 1-4 was measured based on 1-MCP released from the composition. Active ingredient released out of Sample 8 was measured based on carvacrol release from the composition. Active ingredient released out of Sample 9 was measured based on thymol release from the composition, as thymol is the principal active terpene compound in in thyme oil. The vials were 45 mm tall and 20 mm wide with a mouth of 15 mm, for a total internal volume of 8 mL. To seal the vials, a screw-cap with a TEFLON™ liner was screwed onto the vial and the vial sealed with paraffin wax to prevent leakage. To eliminate the effects of equilibrium adsorption of active ingredients, vials were left open to allow the active ingredients to escape freely. At the appropriate timepoint (e.g. sixty (60) minutes prior to the sample time), the vial was sealed for 1 hour to allow gas to build up in the headspace of the vial, and a volume (e.g. 200 μL) was sampled from the headspace. In this way the rate of release at a given timepoint could be measured. The GC oven temperature was set to 200° C. The area of the GC peak was calibrated by comparison to known quantities of 1-MCP released from ETHYLBLOC™. The procedure was to place a quantity of ETHYLBLOC™ corresponding to the desired number of moles of 1-MCP in a sealed chromatograph vial, then inject 1 mL of the ETH-YLBLOC™ buffer solution into the vial. The vial was shaken to promote complete release of 1-MCP and a sample of the headspace injected in the gas chromatograph. By varying the amount of 1-MCP in each vial, a linear calibration for GC peak area could be determined. For carvacrol and thymol, the location of the GC peaks were determined via comparison to authentic samples in the same GC. The peak area was adjusted to the specific response factor of carvacrol and thymol using an Effective Carbon Number (ECN) adjustment. The calculated response factor for both carvacrol and thymol was determined to be 1.12. During the release experiments, the samples were stored at 25° C. at atmospheric pressure.

The release rate results over 72-336 hours (depending on the sample) for Samples 1-4 from the release experiments detailed above are summarized in Tables 5-8 below. The results below are not reported cumulatively and are reported as rate values in the unit of μL 1-MCP/g matrix/hr. Equivalent to the unit μL 1-MCP/g matrix/hr is the unit μL 1-MCP/g composition/hr. As a person skilled in the art would appreciate, the release values below in μL 1-MCP/g matrix/hr can be converted to μg 1-MCP/g matrix/hr by dividing the values given below by 0.452, which is the number of μL of 1-MCP in one μg of 1-MCP at 25° C. at atmospheric pressure.

TABLE 5

Rate of Release of 1-MCP from Sample 1 over 120 hours.

| Time (hrs) | Rate of 1-MCP Release (μL 1-MCP/g matrix/hr) |
|---|---|
| 1 | 189.9 |
| 22 | 22.1 |
| 48 | 4.3 |
| 72 | 1.7 |
| 96 | 1.2 |
| 120 | 0.8 |

TABLE 6

Rate of Release of 1-MCP from Sample 2 over 120 hours.

| Time (hrs) | Rate of 1-MCP Release (μL 1-MCP/g matrix/hr) |
|---|---|
| 1 | 1228.7 |
| 22 | 3.5 |
| 48 | 0.3 |
| 72 | 0.0 |
| 96 | 0.0 |
| 120 | 0.0 |

TABLE 7

Release of 1-MCP from Sample 3 over 336 hours.

| Time (hrs) | Amount of 1-MCP Release (μL 1-MCP/g matrix/hr) |
|---|---|
| 1 | 33.3 |
| 22 | 6.7 |
| 48 | 3.8 |
| 72 | 3.6 |
| 96 | 2.0 |
| 120 | 1.4 |
| 168 | 0.6 |
| 216 | 0.7 |
| 240 | 0.6 |
| 264 | 0.4 |

TABLE 7-continued

Release of 1-MCP from Sample 3 over 336 hours.

| Time (hrs) | Amount of 1-MCP Release (µL 1-MCP/g matrix/hr) |
|---|---|
| 288 | 0.5 |
| 336 | 0.4 |

TABLE 8

Release of 1-MCP from Sample 4 over 72 hours.

| Time (hrs) | Amount of 1-MCP Release (µL 1-MCP/g matrix/hr) |
|---|---|
| 1 | 701.9 |
| 22 | 0.9 |
| 48 | 0.2 |
| 72 | 0.6 |

At least from the results presented above, it can be concluded at least that modification of hydrophobic carbon, via oxidation, hydrolysis, acidification, basification, steaming, or other methods, results in a modification of the unique storage capacity and rate of release of the active ingredient 1-MCP from a carbon material. Less aggressive chemical oxidation conditions, as with a shorter reaction time or lower acid concentration, can also be employed.

The release results over a period of 240 hours from Sample 8 and Sample 9 above are summarized in Tables 9 and 10 below. These release results can be used to approximate the rate of release of active ingredients from Sample 10. The results below are not reported cumulatively and are reported as rate values in the unit of µL active ingredient/g matrix/hr. Equivalent to the unit µL active ingredient/g matrix/hr is the unit µL active ingredient/g composition/hr. As a person skilled in the art would appreciate, the release values below in µL active ingredient/g matrix/hr may be converted to µg active ingredient/g matrix/hr by dividing the values given below by 0.489, which is the conversion factor for both carvacrol and thymol at 25° C. at atmospheric pressure.

TABLE 9

Rate of Release of Carvacrol from Sample 8.

| Time (hr) | Rate of Release (µL Carvacrol/g matrix/hr) |
|---|---|
| 1 | 4053.0 |
| 24 | 35.7 |
| 48 | 27.9 |
| 72 | 12.2 |
| 168 | 13.4 |
| 216 | 13.4 |
| 240 | 1.0 |

TABLE 10

Rate of Release of Thymol from Sample 9.

| Time (hr) | Rate of Release (µL Thymol/g matrix/hr) |
|---|---|
| 1 | 3745.2 |
| 24 | 26.6 |
| 48 | 25.8 |

TABLE 10-continued

Rate of Release of Thymol from Sample 9.

| Time (hr) | Rate of Release (µL Thymol/g matrix/hr) |
|---|---|
| 72 | 17.3 |
| 168 | 2.7 |
| 216 | 2.1 |
| 240 | 1.6 |

Other Release Tests—Release Reported in Mg/g Matrix

The release of 1-MCP from Samples 5-7 calculated in the unit of mg 1-MCP/g matrix was determined using an alternative headspace analysis method than the method discussed above, which was used to determine the release rate of 1-MCP (e.g. µL 1-MCP ingredient/g matrix/hr). Sealed vials containing 50 mg of the sample, as measured with a gas chromatograph equipped with a flame ionization detector. The vials were 45 mm tall and 20 mm wide with a mouth of 15 mm, for a total internal volume of 8 mL. To seal the vials, a screw-cap with a TEFLON™ liner was screwed onto the vial and the vial sealed with paraffin wax to prevent leakage. The GC oven temperature was set to 200° C. The area of the GC peak was calibrated by comparison to known quantities of 1-MCP released from ETHYLBLOC™. The procedure was to place a quantity of ETHYLBLOC™ corresponding to the desired number of moles of 1-MCP in a sealed chromatograph vial, then inject 1 mL of the ETHYLBLOC™ buffer solution into the vial. A vial was shaken to promote complete release of 1-MCP and a sample of the headspace injected in the gas chromatograph. By varying the amount of 1-MCP in each vial, a linear calibration for GC peak area could be determined. During the release experiments, the samples were stored at 25° C. at atmospheric pressure.

The release results over 72-336 hours (depending on the sample) for Samples 5-7 from the release experiments detailed above are summarized in Tables 11-13 below. The results below are not reported cumulatively.

TABLE 11

Release of 1-MCP over 72 hours from Sample 5.

| Time (h) | Release (mg 1-MCP/g matrix) |
|---|---|
| 24 | 2.0 |
| 48 | 1.3 |
| 72 | 0.0 |

TABLE 12

Release of 1-MCP over 72 hours from Sample 6.

| Time (h) | Release (mg 1-MCP/g matrix) |
|---|---|
| 24 | 20.8 |
| 48 | 14.1 |
| 72 | 13.0 |

TABLE 13

Release of 1-MCP over 336 hours from Sample 7.

| Time (h) | Release (mg 1-MCP/g matrix) |
|---|---|
| 30 | 8.36 |
| 48 | 8.26 |
| 72 | 10.99 |
| 96 | 7.80 |
| 120 | 3.30 |
| 144 | 4.14 |
| 192 | 5.56 |
| 216 | 3.55 |
| 264 | 4.79 |
| 312 | 4.97 |
| 336 | 3.85 |

Although these results are not reported cumulatively, the cumulative amount of active ingredient released over the test period can be measured and reported as a percentage of the total amount (e.g. as a mass) of active ingredient present in the sample initially. For example, based on the weight loading (e.g. 9.2 wt. %), the total amount of 1-MCP released over a period of 336 hours, and the initial mass of the sample tested, it was found that Sample 7 released 24.5% of its 1-MCP over the two (2) week test period.

In another experiment, Samples 11-16 were tested for the release of active ingredients. Specifically, D(+)-carvone (Samples 11 and 12), thymol (Samples 13 and 14), hexanal (Samples 15 and 16) were tested. Vials containing 20-50 mg of each sample were loosely sealed with a screw cap with a TEFLON™ liner so that air could flow in and out of them. The vials were 45 mm tall and 20 mm wide with a mouth of 15 mm, for a total internal volume of 8 mL. Each sample was tested by sampling the static headspace in the vial and injecting into a gas chromatograph with a flame ionization detector. The GC peak areas were calibrated using an effective carbon number (ECN) calculation relative to the 1-MCP calibration as discussed previously. The calculated response factor for the active ingredients for Samples 11-16 follow: carvone 1.23 thymol 1.12, and hexanal 1.44.

The release results of Samples 11-16 are summarized in Tables 14-19 below. The release results below are not reported cumulatively.

TABLE 14

Carvone Release from Sample 11.

| Time (h) | Release (mg Carvone/g matrix) |
|---|---|
| 144 | 21.9 |
| 480 | 22.2 |

TABLE 15

Carvone Release from Sample 12.

| Time (h) | Release (mg Carvone/g matrix) |
|---|---|
| 144 | 0.0 |
| 480 | 18.7 |

TABLE 16

Thymol Release from Sample 13.

| Time (h) | Release (mg Thymol/g matrix) |
|---|---|
| 144 | 51.4 |
| 480 | 4.3 |

TABLE 17

Thymol Release from Sample 14.

| Time (h) | Release (mg Thymol/g matrix) |
|---|---|
| 144 | 42.6 |
| 480 | 1.8 |

TABLE 18

Hexanal Release from Sample 15.

| Time (h) | Release (mg Hexanal/g matrix) |
|---|---|
| 96 | 4.4 |
| 144 | 14.8 |

TABLE 19

Hexanal Release from Sample 16.

| Time (h) | Release (mg Hexanal/g matrix) |
|---|---|
| 96 | 10.6 |
| 144 | 12.1 |

In another experiment, the advantages of physicochemical interactions provided by the delivery material to provide storage and controlled release of active ingredients was studied. In this experiment, 120 g of a silica material with 811 m/g surface were suspended in 3 L of water and refluxed for 72 hours. During this time, the action of hot water caused the surface area of the silica walls to collapse. The resulting delivery material was charged with 1-MCP (available in the form of ETHYLBLOC™, from FLORALIFE®) in the vapor phase by slowing flowing a mixture of nitrogen and gaseous 1-MCP through a packed tube of the power for 30 minutes.

After charging, less than 1% 1-MCP was retained by the material. GC analysis of the headspace of samples containing 50 mg of material indicated no release of 1-MCP. This confirms the advantages of the physicochemical interactions between the porous and/or high surface area delivery material and active ingredients that enable the storage and controlled release of active ingredients, not limited to cyclopropenes and various terpenes and terpenoids.

Figure 7:
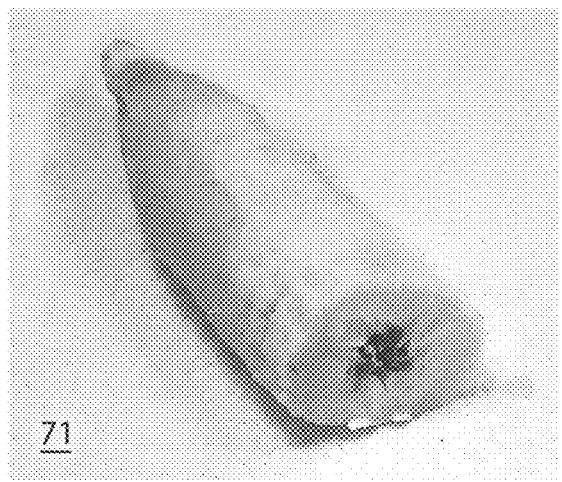
FIG. 7 is a photograph of example results of a banana test using a composition of a non-limiting embodiment.
Figure 7:
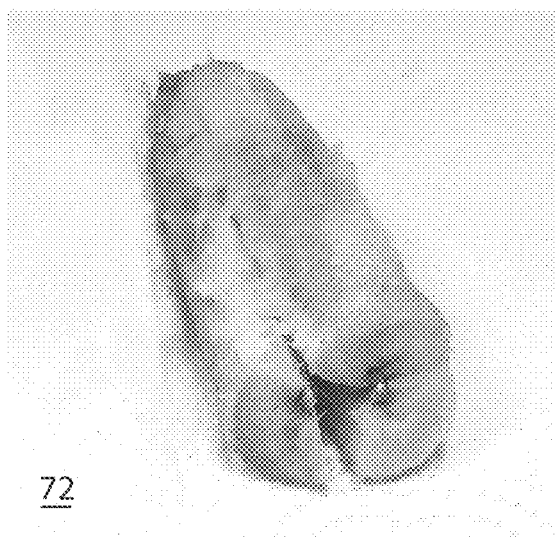

While the matrices disclosed herein are suitable to treat a wide variety of produce species, one technical advantage is that the matrices configured for controlled release are efficacious on produce with high respiration rates (for example, 20-40 mg $CO_2$ mg $kg^{-1}$ $h^{-1}$ or higher or as categorized in Wilson, L. G., M. D. Boyette, E. A. Estes. 1999. *Postharvest handling and cooling of fresh fruit vegetables, and flowers for small farms*. North Carolina Cooperative Extension Service.). Currently available 1-MCP release technologies, especially those operating in the absence of other treatments (for example 1-MCP technologies employed without the assistance of modified atmosphere packaging), have only limited efficacy on these varieties of produce. Bananas were treated with matrices comprising 1-MCP as described herein. An example result of the banana test is shown in FIG. 7. FIG. 7 illustrates a treated banana 71 versus an untreated banana 72. FIG. 7 displays at least the firmness retention in the treated banana 71 after 10 days of treatment, versus the untreated banana 72 after 10 days at ambient room temperature. After ten (10) days of treatment, the treated bananas displayed improved firmness retention and color as compared to the untreated bananas.

Broccoli was also treated with compositions as described herein comprising 1-MCP. Ten (10) broccoli cartons, approximately 20.1 lbs (~9.1 kg) each were studied. 0.5 g of matrix sealed in a TYVEK™ sachet was placed in each of five (5) treated cartons. No treatment was used in the untreated cartons of broccoli. During the study, the treated and untreated broccoli were kept as close to 0° C. as possible. Temperatures measured in cold storage at days T=0, 5, 10, and 15 ranged from 0° C.-4° C. (32° F.-39.2° F.). Relative humidity (RH) was approximately 95% for the duration of the study. After 15 days, white mold was present on approximately 70% of the untreated broccoli, on both the stems and florets. Mold was not present on any of the broccoli exposed to the matrices. Moreover, broccoli treated with the matrices was observed to have reduced yellowing and reduced odor as compared to the untreated broccoli.

Matrices comprising 1-MCP as described herein have also been studied on other produce commodities, for example, honeydew and Donnie avocados. Turning to the honeydew study, twenty-four (24) 30 lb cartons containing six honeydew melons each were studied. 0.5 g of matrix sealed in a TYVEK™ sachet was placed in each of twelve (12) treated cartons. No treatment was used in the untreated cartons of honeydew. The estimated brix of all melons in the sample size was 12-14 at time of packing. The honeydew were stored for 28 days at 7.2° C. (45° F.) and 85% RH. Results of the study showed that the matrices used increased the treated honeydew shelf-life by least a 30% as compared to the untreated honeydew.

Turning to the Donnie avocado study, Donnie avocados are known as an early variety that ripens quickly and often gets basal dark decay. In the test, six (6) boxes each containing ten (10) Donnie avocados were studied. The treated and untreated Donnie avocados were also treated with Scholar fungicide prior to packing. 0.5 g of matrix sealed in a TYVEK™ sachet was placed in each of three (3) treated cartons. The results of the study showed that the matrices used increased the treated Donnie shelf-life by six (6) to nine (9) days as compared to the untreated avocados. These non-limiting examples of produce tests indicate that the matrices described herein are effective at varying temperatures, varying humidities, and can improve the quality and shelf-life of a plethora of produce commodities.

In an embodiment, compositions described herein are effective in extending the shelf-life of berries. Compositions comprising terpenes as described herein were evaluated on cultivated microbes from strawberries. The diseases cultivated included, for example, *Botrytis* (gray mold), Leak, Leather Rot, and Anthracnose. These diseases were cultivated in a single batch by macerating 8 oz. of affected strawberries and agitating them in 0.5 L of previously sterilized water for 3 hours. The resulting slurry was then filtered and placed in distinct individual drops upon sterilized, previously-prepared agar plates. The agar plates were spherical with a 5.5 cm diameter, affording enough space for three distinct, non-contiguous sample spots approximately 0.5 cm in diameter apiece.

Figure 8:
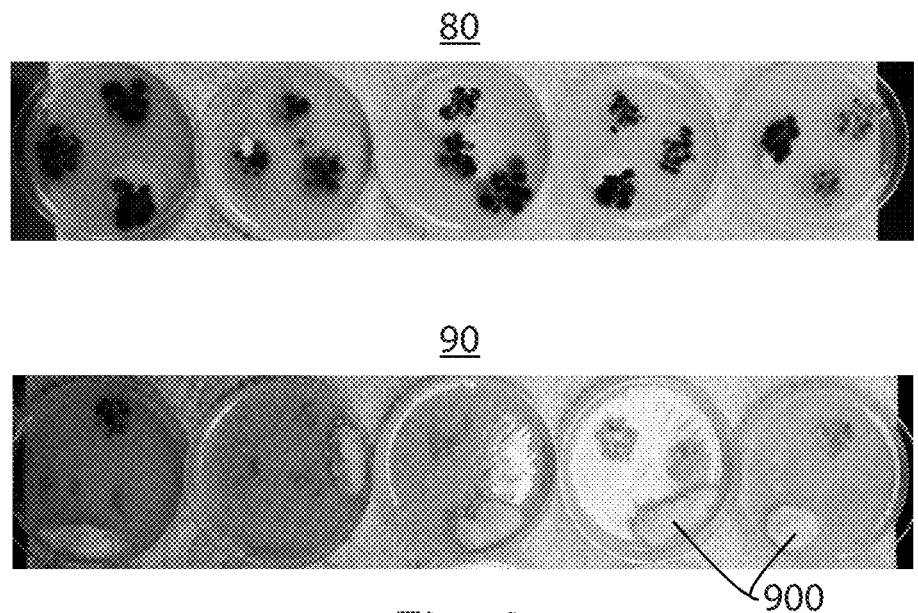
FIG. 8 is a photograph of example results of a test on strawberry pathogens using a composition of a non-limiting embodiment.
Figure 9:
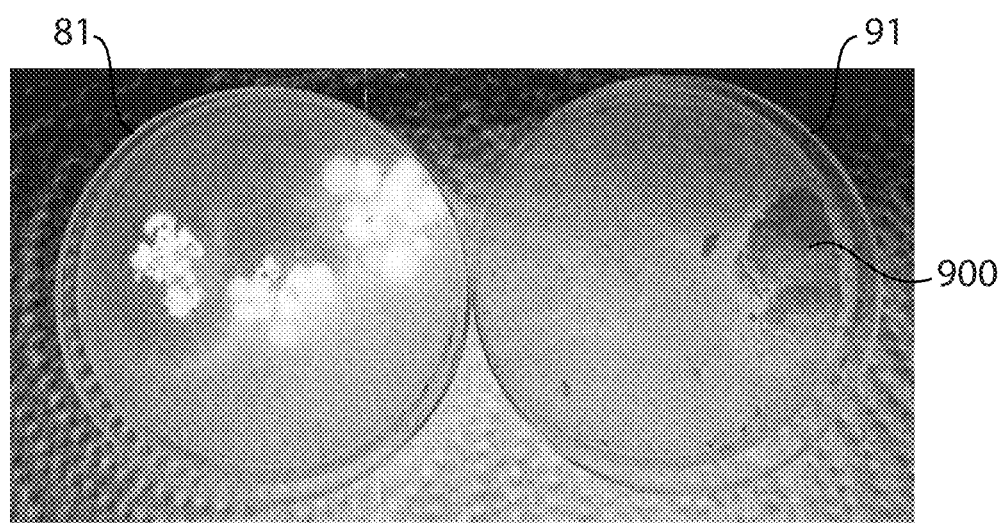
FIG. 9 is another photograph of example results from FIG. 8 from the test on strawberry pathogens using a composition of a non-limiting embodiment.

Ten plates were divided into two groups of 5. One group of 5 served as control plates 80 (FIG. 8). To the second group of 5 served as active plates 90. For further emphasis, one control plate 81 and one active plate 91 from the experiment are placed side by side in FIG. 9. To the active plates 90 was added 100 mg of matrix powder 900 (not labeled in every active plate), placed in a such a way as to avoid direct contact with any of the microbe colonies. The progress of the colony growth was then followed over time, noting that in control plates 80, growth of pathogen colonies was observed within 48 hours. The plates were left at room temperature and ambient conditions for 27 days to develop. Illustrative results of this experiment data are shown in FIG. 8 and FIG. 9.

From at least the experiments provided herein, it can be at least determined that the compositions described herein slowly release active ingredients over time. Furthermore, the release of these active ingredients has a statistically relevant impact in reducing the growth and development of multiple native diseases found in berries. Use of the compositions described herein on berries may result in a statistical improvement in the shelf life of berries.

In an experiment, the shelf-life extension effects of compositions described herein on commercial strawberries was examined. Eight 16-oz. clamshells of strawberries were purchased at commercial maturity. As received, the strawberries were in ripe/overripe condition. Prior to application of a composition comprising at least one terpene active ingredient, the strawberries were aggregated from their individual clamshells. All "bad" berries were removed from the lot, including any berries with soft spots, physical damage, and any developing the characteristics of *Botrytis*, Leather Rot, and Anthracnose. Fewer than 5% of the berries were discarded. The berries were randomly reassigned to the eight 16-oz. clamshells.

1 gram of matrix material comprising at least one terpene was sealed in each of four TYVEK® paper sachets (Dupont, 1073B) 6×6 cm in size. The four sachets were placed in the bottom of each of four clamshells of treated strawberries so that each treated clamshell box contained 1 gram of matrix. The "control" group of four clamshells of strawberries had no treatment applied to them.

The berries were left under ambient conditions at room temperature for 4 days, at which point they were removed from their clamshells and sorted according to visible pathogenic development. Visible signs of infection were denoted as visible discoloration (*Botrytis*), soft spots (Leak and Anthracnose), the development of brown flesh (Leather Rot), and collapse/loss of berry juice (Leak). Any strawberries visibly affected by pathogens were counted as "infected" whereas any strawberries displaying no visible symptoms were considered "uninfected." Under the test conditions, the application of the composition comprising at least one terpene prevented 18% more strawberries from developing visible symptoms of natural strawberry diseases in comparison to the control sample strawberries. No impact on the odor or taste on the treated strawberries was observable, implying that the matrices described herein can be employed without introducing undesirable organoleptic effects.

Moreover, because the strawberries of the experiment described above were purchased at commercial maturity, the test above indicates that the matrices described herein reduce real infections in berries even at the end of the berry lifespan. Because advanced age increases the likelihood of pathogenic infection, the margin of infection reduction will likely be further increased by introducing the compositions described herein at an earlier point in the fruit's life cycle.

The strawberry test results are summarized in Table 20 below.

TABLE 20

Treated Strawberries versus Untreated Strawberries after 96 hours.

|  | Control Sample | Treated Sample |
| --- | --- | --- |
| Number of Strawberries | 80 | 75 |
| Number Infected | 72 | 54 |
| Number Uninfected | 8 | 21 |
| Percentage Infected | 90% | 72% |
| Percentage Uninfected | 10% | 28% |

Several advantages arise from the use the matrices described herein in delivering active ingredients. For example, the use of a high surface area material enhances the vapor pressure of otherwise high-boiling antimicrobial agents (e.g. active ingredients not limited to carvacrol, which has a boiling point of 236° C.). Additionally, the loading of the active ingredient in the delivery material can be modified as desired using techniques, such as for example, incipient wetness impregnation as described herein. Furthermore, the high surface area of the delivery material may reduce the physical volume and weight of matrix needed to deliver an effective concentration of the active ingredient. Moreover, compositions comprising powder or granular solid delivery materials permit the mechanical mixing of matrices comprising different active ingredients for precise combinations of active ingredients. The use of combinations of active ingredients may permit the ability to lower the concentration of any particular volatile active. Additionally, delivery of the active ingredient(s) in the vapor phase using the compositions described herein may reduce or prevent the presence of off-flavors and/or residue on food or produce, as opposed to dips, sprays, coatings, films, waxes, and other contact systems.

Another advantage of the compositions disclosed herein is they enable and/or can be configured for extended, slow, or controlled release of active ingredients in the vapor phase. This is advantageous because direct contact of certain active ingredients with produce, for example, may adversely impact the flavor, texture, or aromatic qualities of the produce. Controlled delivery of a vapor phase active ingredient may help the commercial salability of the produce during and after treatment while extending the shelf life of the produce.

Another advantage of the matrices described herein is that the release of an active ingredient from the matrix can be accomplished passively, that is, without the addition of external wetting, hydrating, or chemically reactive agents in order to affect the release of the active ingredient from the delivery material. In an alternative embodiment, however, a matrix may release an active ingredient upon exposure to moisture. Another advantage of the matrices disclosed herein is that they enable and/or can be configured for extended, accelerated, or controlled release of active ingredients in contrast to currently available technologies that cannot offer gradual, extended, or controlled release of active ingredients as can be provided by the matrices described herein. Another advantage of the matrices described herein is that the matrix (in powder form, for example) does not need to be in direct contact with produce to be effective. For example, the matrix may release the active ingredient in the gaseous or vapor phase from the delivery material, wherein the produce is exposed to the active ingredient in the gaseous or vapor phase, and wherein the delivery material does not contact the produce. Furthermore, the matrix does not need to be sprayed onto produce to be effective. In an embodiment, a composition comprising a delivery material and an active ingredient is configured to extend the shelf life of produce without direct contact between the composition and the produce.

Moreover, the delivery material of the matrix is recyclable (whereas competing cyclodextrin (CD) based polymers are not), which means that the matrix permits re-charging and re-use. Additional advantages of the matrix disclosed herein are that the matrix is capable of high loading capacity (for example, 1-MCP loading of up to 25% by weight of the overall matrix), and the matrix is tunable across a range of parameters. The tunable parameters, including, but not limited to, pore-size, surface hydrophobicity, and the surface density of functional groups, surfactant extraction, affect the release kinetics of active ingredients stored in the matrix. The ability to tune the parameters of the matrix permits tailoring of the matrix to be appropriate and possibly even optimized for a wide range of applications, such as different container sizes or different target produce, for example. This short list of advantages provided by the matrix disclosed herein is not exhaustive.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
 releasing a cyclopropene from a delivery material, without the addition of external wetting, wherein:
  the delivery material comprises a carbon material,
  the delivery material is a porous and solid material, and
  the cyclopropene is present in the delivery material in at least about 0.05 wt % versus the total weight of the delivery material and the cyclopropene.

2. The method of claim 1, wherein the cyclopropene is present in the delivery material in an amount of at least about 0.1 wt % versus the total weight of the delivery material and the cyclopropene.

3. The method of claim 1, wherein the cyclopropene is 1-methylcyclopropene (1-MCP).

4. The method of claim 3, wherein the delivery material comprises activated carbon.

5. The method of claim 1, wherein the delivery material comprises activated carbon.

6. The method of claim 1, wherein the delivery material is activated carbon.

7. The method of claim 1, wherein the delivery material further comprises at least one adsorption-modifying functionality.

8. The method of claim 1, wherein the delivery material has an internal void volume greater than about 0.1 cm$^3$/g.

9. The method of claim 1, wherein the delivery material is part of a composition further comprising a diluent material.

10. The method of claim 1, wherein the delivery material is a recyclable material.

11. The method of claim 1, wherein the delivery material is incorporated into a structure or form factor.

12. The method of claim 11, wherein the structure or form factor comprises one or more of a sachet, an insert, a gel, a coating, a powder, a pellet, a film, a sheet, a flake, a non-woven material, a woven material, a knitted material, a paint, a coating, a paper, a cardboard, a paper derivative, a fabric, a fiber, a film, a cloth, a wood, a clay, a pulp, or a plastic.

13. The method of claim 1, wherein the delivery material is contained in hermetically sealed or gas impermeable packaging.

14. The method of claim 1, wherein the delivery material is in at least one of powder, pellet, granule, film, and extrudate form.

15. The method of claim 1, wherein the delivery material comprises a monolithic carbon material, an extruded or pelletized carbon material, a steam-activated carbon material, an oxidized carbon material, a heat treated carbon material, an acid-treated carbon material, a base-treated carbon material, ash, char, biochar, and/or soot.

16. The method of claim 1, wherein the delivery material has a surface area between about 1 to about 3000 m$^2$/g.

17. The method of claim 1, wherein the delivery material comprises a high-surface area material comprising a total chemical surface area, internal and external, greater than 1 m$^2$/g.

18. The method of claim 1, wherein the delivery material has a density in the range of 0.1-3 g/cm$^3$; a pore volume in the range of 0.1-1.5 cm$^3$/g; a surface area in the range of 500-4000 m$^2$/g; moisture content in the range of 0-30%; and an iodine number in the range of 0-1500 mg/g.

19. The method of claim 1, wherein the releasing the cyclopropene is performed over a period of between about 5 days to about 30 days.

20. The method of claim 1, wherein produce is exposed to the released cyclopropene in the gaseous or vapor phase.

21. A method, comprising:
 releasing a cyclopropene from a delivery material, without the addition of external wetting, wherein:
  the delivery material comprises a carbon material, and
  the delivery material is a porous and solid material.

22. The method of claim 21, wherein the cyclopropene is 1-methylcyclopropene (1-MCP).

23. The method of claim 22, wherein the delivery material comprises activated carbon.

24. The method of claim 21, wherein the delivery material comprises activated carbon.

25. The method of claim 21, wherein the delivery material is incorporated into a structure or form factor.

26. The method of claim 21, wherein the delivery material comprises a high-surface area material comprising a total chemical surface area, internal and external, greater than 1 $m^2/g$.

27. The method of claim 21, wherein the delivery material has a density in the range of 0.1-3 $g/cm^3$; a pore volume in the range of 0.1-1.5 $cm^3/g$; a surface area in the range of 500-4000 $m^2/g$; moisture content in the range of 0-30%; and an iodine number in the range of 0-1500 mg/g.

28. The method of claim 21, wherein the cyclopropene is present in the delivery material in an amount of at least about 0.1 wt % versus the total weight of the delivery material and the cyclopropene.

29. The method of claim 21, wherein the releasing the cyclopropene is performed over a period of between about 5 days to about 30 days.

30. The method of claim 21, wherein produce is exposed to the released cyclopropene in the gaseous or vapor phase.

* * * * *